(12) United States Patent
Hayman et al.

(10) Patent No.: US 9,736,902 B2
(45) Date of Patent: Aug. 15, 2017

(54) LIGHTING SYSTEM AND METHOD TO CONTROL A LIGHTING SYSTEM

(71) Applicant: J2 Light Inc., St. Albert (CA)

(72) Inventors: Jeff Hayman, St. Albert (CA); Jeremy MacGillivray, St. Albert (CA); Kevin Bailey, Ottawa (CA); John Kim, Ottawa (CA)

(73) Assignee: J2 LIGHT INC., St. Albert (CA)

( * ) Notice: Subject to any disclaimer, the term of this patent is extended or adjusted under 35 U.S.C. 154(b) by 0 days.

(21) Appl. No.: 14/979,973

(22) Filed: Dec. 28, 2015

(65) Prior Publication Data

US 2016/0113088 A1 Apr. 21, 2016

Related U.S. Application Data

(63) Continuation of application No. 14/312,198, filed on Jun. 23, 2014, now Pat. No. 9,253,848.
(Continued)

(51) Int. Cl.
*H05B 37/02* (2006.01)
*H05B 33/08* (2006.01)
(Continued)

(52) U.S. Cl.
CPC ......... *H05B 33/0854* (2013.01); *F21V 7/005* (2013.01); *F21V 29/763* (2015.01);
(Continued)

(58) Field of Classification Search
CPC ............ H05B 37/0227; H05B 37/0281; H05B 37/0218; H05B 33/0803; H05B 33/0854; H05B 33/0845; H05B 33/086; H05B 33/089; H05B 37/02; H05B 37/0245; H05B 37/03; H05B 33/0842; H05B 37/0272; H05B 37/028105; H05B 37/0254; H05B 39/042; F21Y 2103/003; F21Y 23/0442; F21Y 23/00; F21Y 23/0464;
(Continued)

(56) References Cited

U.S. PATENT DOCUMENTS 6,583,573 B2 * 6/2003 Bierman ............... H05B 39/042
250/214 AL
6,909,921 B1 * 6/2005 Bilger .................... G05B 15/02
700/14
(Continued)

*Primary Examiner* — Vibol Tan
(74) *Attorney, Agent, or Firm* — Loza & Loza, LLP; Razmig H. Messerian

(57) ABSTRACT

An LED lighting system is disclosed, which generally consists of an enclosure, one or more LED modules, one or more transformers, and one or more drivers. A lamp assembly is disclosed, which generally consists of one or more vertically oriented LED chips, thermally conductive shells, and a thermally dissipating means positioned at the back of the LED chips. An LED module is disclosed, which generally consists of a lamp assembly, one or more reflectors and modules caps. A method of controlling light intensities is disclosed, which generally consists of method of decreasing light intensities in areas with little occupancy while minimizing user annoyance resulting from drastic light intensity fluctuations. A universal mounting bracket is disclosed, which generally consists of a fixture plate, mounting plate, and an adjustable means.

20 Claims, 89 Drawing Sheets

Related U.S. Application Data

(60) Provisional application No. 61/838,183, filed on Jun. 21, 2013.

(51) Int. Cl.

| | | |
|---|---|---|
| *F21V 7/00* | (2006.01) | |
| *F21V 29/76* | (2015.01) | |
| *F21S 2/00* | (2016.01) | |
| *F21V 15/015* | (2006.01) | |
| *F21V 29/83* | (2015.01) | |
| *F21K 9/60* | (2016.01) | |
| *F21Y 103/10* | (2016.01) | |
| *F21Y 115/10* | (2016.01) | |

(52) U.S. Cl.
CPC ..... H05B 33/0803 (2013.01); H05B 37/0218 (2013.01); H05B 37/0272 (2013.01); *F21K 9/60* (2016.08); *F21S 2/00* (2013.01); *F21V 15/015* (2013.01); *F21V 29/83* (2015.01); *F21Y 2103/10* (2016.08); *F21Y 2115/10* (2016.08)

(58) Field of Classification Search
CPC .... F21Y 23/0471; F21Y 29/763; F21Y 7/005; F21Y 2115/10; Y02B 20/46; Y02B 20/48
See application file for complete search history.

(56) References Cited

U.S. PATENT DOCUMENTS

| | | | | |
|---|---|---|---|---|
| 7,190,126 | B1* | 3/2007 | Paton | H05B 37/0272 315/308 |
| 7,298,871 | B2* | 11/2007 | Lee | G06K 9/00221 382/115 |
| 7,948,189 | B2* | 5/2011 | Ahmed | H05B 37/0218 315/291 |
| 8,009,042 | B2* | 8/2011 | Steiner | H05B 37/0227 315/159 |
| 8,729,833 | B2* | 5/2014 | Chemel | H05B 33/0854 315/308 |
| 8,950,898 | B2* | 2/2015 | Catalano | F21S 8/02 362/249.02 |
| 9,148,937 | B2* | 9/2015 | Steiner | H05B 37/0272 |
| 2008/0074059 | A1* | 3/2008 | Ahmed | H05B 37/0218 315/291 |
| 2015/0181662 | A1* | 6/2015 | Ghoshal | G01J 1/4204 315/149 |
| 2015/0286948 | A1* | 10/2015 | Luca | G05B 15/02 706/48 |

* cited by examiner

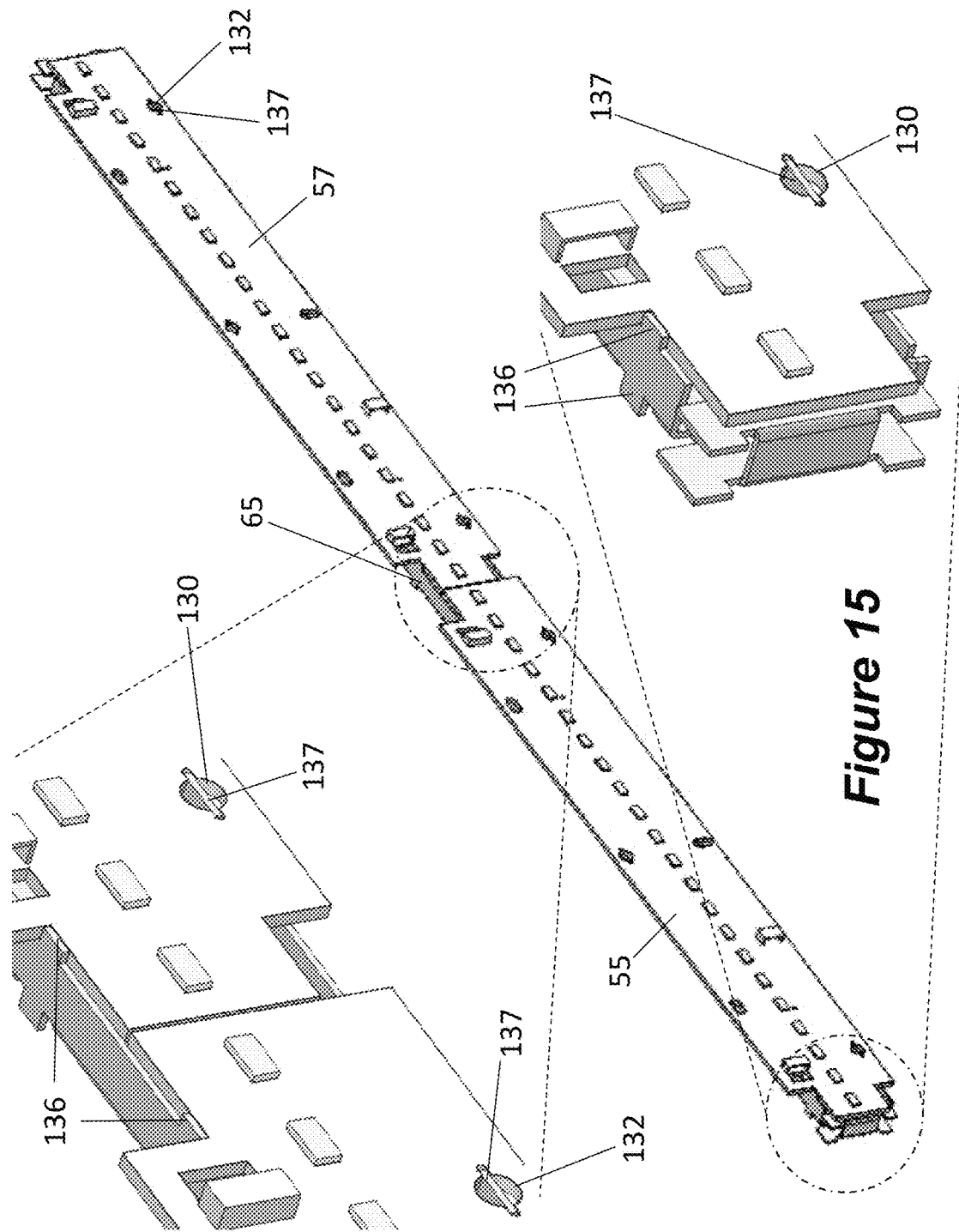

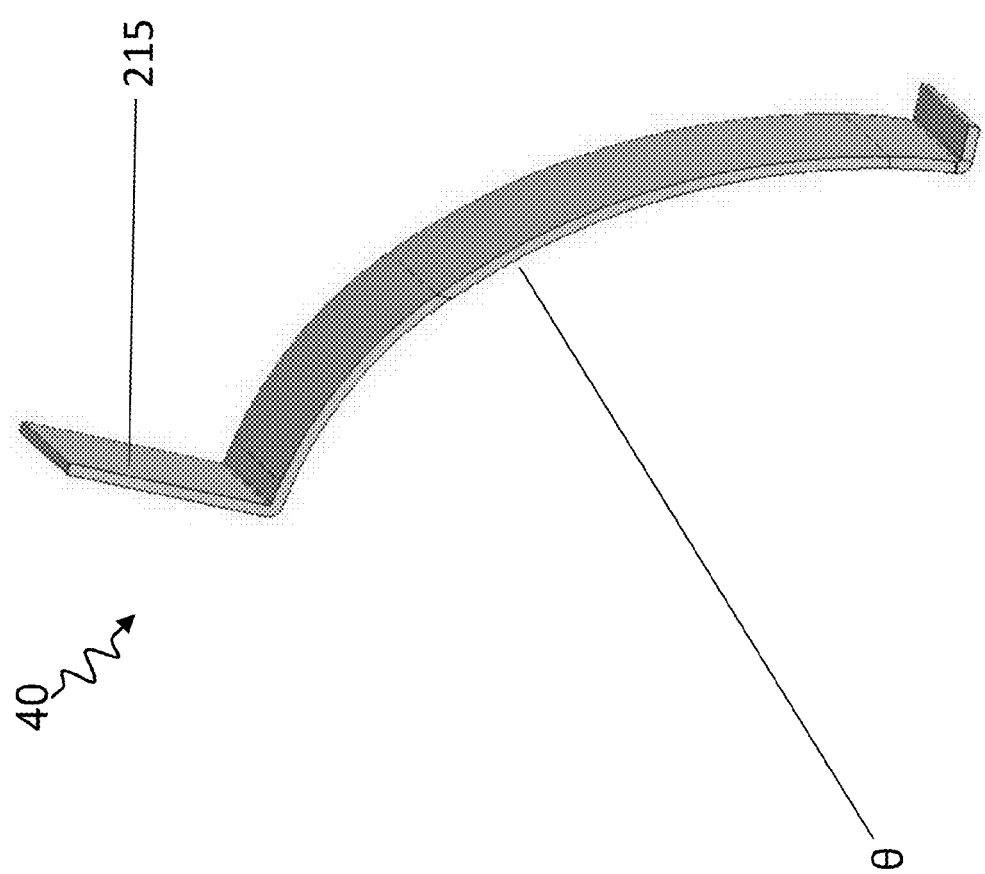

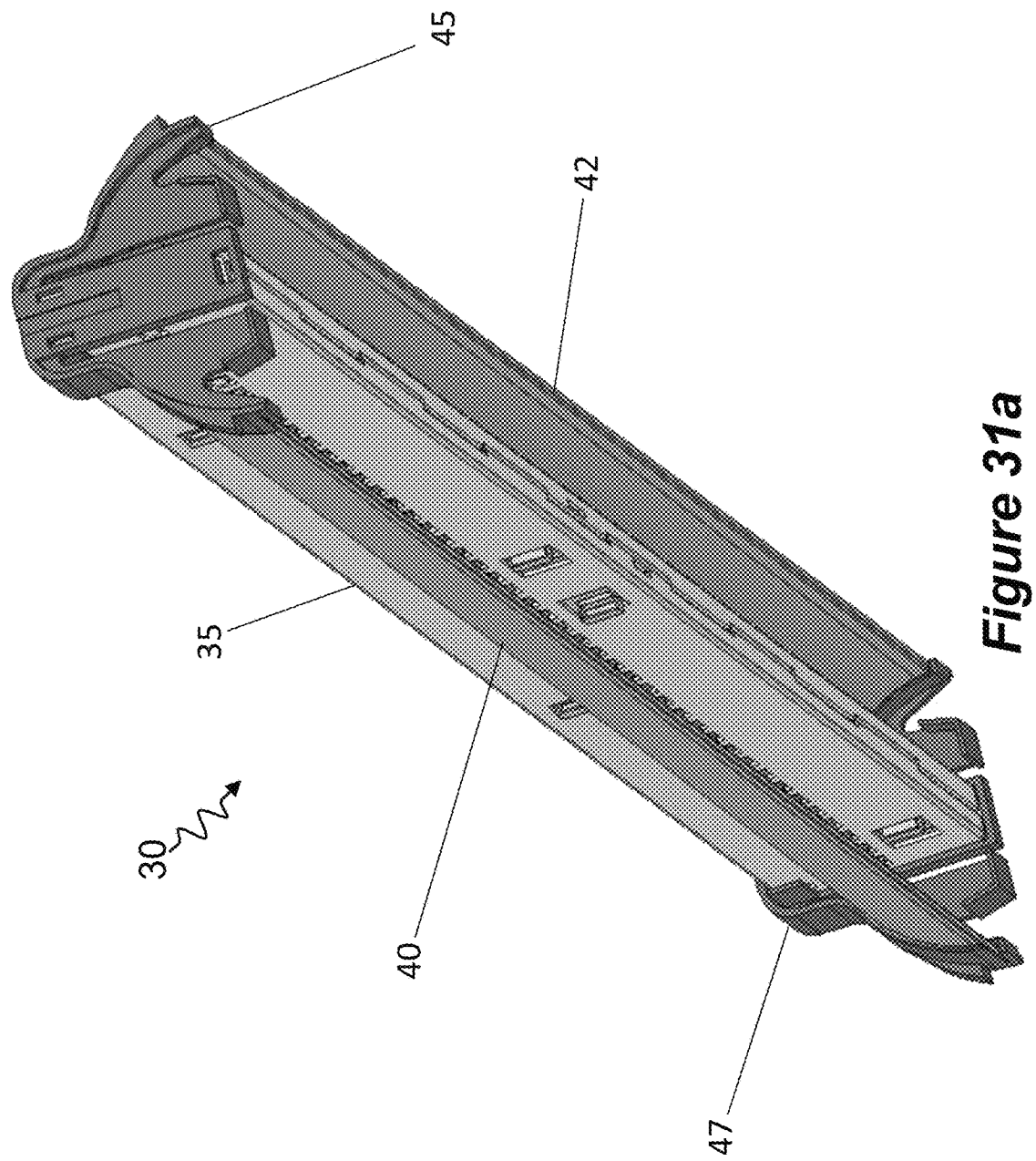

LIGHTING SYSTEM AND METHOD TO CONTROL A LIGHTING SYSTEM

CLAIM OF PRIORITY

The present application for patent is a continuation of U.S. patent application Ser. No. 14/312,198 entitled "Lighting System and Method to Control a Lighting System" filed Jun. 23, 2014, which claims priority to U.S. Provisional Application No. 61/838,183 entitled "System and Method for Controlling LED Lights" filed Jun. 21, 2013. Each of the above mentioned applications are incorporated by reference.

BACKGROUND

Field

The present invention pertains to the field of LED lights and more specifically to a LED lighting fixture and components, universal mounting bracket and a method to control a lighting system.

Background

The ambient LED market is growing rapidly due to the promise of low power consumption and long life versus conventional lighting sources such as incandescent, fluorescent, and high intensity discharge. The new LED paradigm presents a challenge for all conventional lighting fixture manufacturers that are used to buying pre-manufactured lamps and ballasts (power conditioners) as a system.

Many entered the world of electronics and developed proprietary printed circuit boards to support the light emitting diodes that they purchased separately along with custom made LED drivers (power conditioners). This requires a level of expertise that is unfamiliar to most fixture manufacturers who are used to building housings and opticals around lamps and ballasts purchased from others. For success in the LED world, a level of competence must be gained in the critical areas of electronics design & thermal engineering. Even the optical output (lambertian distribution) of the LEDs is very different from the conventional light sources listed above. Introducing more complexity to fixture design represents a higher risk of failure unless handled properly. Some have done this well and some have not.

Recently, a number of tier 1 light emitting diode manufacturers have come out with complete systems which are similar to conventional models. You can purchase pre-manufactured printed circuit boards (PCB's) that already have the LED's mounted along with the requisite drivers and cabling to operate them within specifications given. Design guides are provided to facilitate successful implementation. This greatly reduces the risk and barrier to entry for conventional lighting fixture manufacturers to offer LED based product.

One such product is the Fortimo® system that is offered by Philips®. This is a family of products that comprise LED PCB's of varying length and lumen output as well as various drivers and cable sets that allow connection from driver to PCB and between PCB to PCB. The Fortimo design guide provides recommended installation methods to insure that the product performs according to specifications.

The suggested method of installing the LED PCB modules in the design guide and sales literature is to affix the PCB back onto a horizontal metal substrate (either steel or aluminum) with LEDs facing down using miniature screws. It is also recommended to apply thermal paste to the back of the PCB prior to fastening to the substrate in order to facilitate heat dissipation. In the world of LEDs, overcoming heat buildup at the diode is paramount to success. The prospect of affixing thousands of miniature screws and applying messy thermal paste represents significant assembly line time.

We decided to approach this technology from a fresh perspective. The first order was to determine exactly what thermal properties the LED PCB modules present. Our study revealed that the lowest thermal resistance occurs on the front face of the PCB that supports the LEDs as opposed to the back. We also discovered that if we oriented the boards vertically as opposed to horizontally we enjoy a significant thermal advantage. Further, since the heat transfer from the PCB backing is limited, the opportunity to position boards back to back became a good option.

Our next goal was to create a method to affix the boards without the requirement of miniature screws and thermal paste. Ideally, we wanted a way to eliminate the need for tools that could significantly increase assembly line speed. The result of our design efforts is the Vertikuhl™ system. This method creates a sandwich where the back to back PCB's are separated by a metal bracket and are also secured in place by metal snap on skins. The center bracket has features that allow for precision placement of the PCB's prior to the snap on application of the thermal skins. The assembler can now easily and consistently place the LED PCB modules on top of the center bracket which lay horizontally on the work table. Once in place, a metal skin snaps over the module face by means of punch outs on the skin and correlated lances that are located on the center bracket. Note that the skin also has punch outs that correspond to LED and other electronic part locations that are raised off of the PCB face. After complete, the assembly is turned over and the process repeated for the opposing side.

Background for Semble™ LED Lamp Assembly

Lighting based LED products are proliferating the market for every conceivable lighting application. Some products are being offered as direct conventional lamp (bulb) replacements such as LED lamps to replace incandescent spin-ins for downlighting (potlights) or track lighting. Others have been made to replace fluorescent lamps. Most of these forms have been targeted towards lower lumen output applications. In the case of lower wattage fluorescent replacements, the LED lamp manufacturers place LED PCB strips in a linear fashion within a recognizable fluorescent tube shape and use regular fluorescent lamp sockets. The thermal and directional nature of these lamps present some performance challenges in terms of limits to lumen output vs. MTBF.

For higher lumen applications such as parking lots and warehouses, lighting manufacturers have trended towards the creation of proprietary LED PCB arrays. The manufacturer purchases individual LEDs and has them placed on a custom PCB. Sometimes these are modular, others are more or less permanent.

Our desire was to create a universal lamp platform (Semble™) that would incorporate our Vertikuhl™ technology and requisite optical elements while allowing for toolless replacement and optional adjustability. Vertikuhl™ creates unitized high or low lumen packages that can be correlated to existing lamp technologies. Vertikuhl™ light output is directionally driven (lambertian distribution) at 90 and 270 degrees from nadir. By itself, it does not fit many applications, but coupled with an efficient light delivery optical system, it can become extremely useful in a wide variety of applications.

Conventional light source technologies have allowed for lamps to be either screwed in or plugged in without the need for tools. This is what consumers are used to. While LED promises long life, the reality is that sometimes long life will not be experienced. Many factors can lead to significantly shortened MTBF such as high thermal environments, defective components or product assemblies, site specific power problems, etc. Besides being familiar, it is desirable for LED light sources to be replaceable without the requirement for tools.

As opposed to conventional light sources that provide 360 degree light dispersion, LEDs send light directionally in a lambertian distribution pattern. This means that either the LED array physically face the task area directly or a means of collecting and sending light to desired areas is required. A number of options can be used for this purpose such as reflective or refractive media. For an optimal degree of flexibility it is desirable to further allow for rotation of the Semble™ lamps whereby they can be aimed at the specific task area requiring light.

End caps were created to snap and lock onto the Vertikuhl™ ends without the need for tools. Further, chamfered recesses were created to fit over optical elements such as highly reflective polished aluminum reflectors or formed/injection molded/extruded plastic refractors. Specific arms were designed to allow for the end caps to be snapped into place within formed metal (or other) structures that serve to hold the whole assembly in place within a fixture body or to a building surface. The arms may also be squeezed together by hand to allow for easy removal. Formed processes within the end caps were created to support axles that would allow rotation of the complete assembly.

Background for AIOS Dimming™—Method to Control a Lighting System

Ideally, the most efficient lighting system would deliver the right type, quality, and amount of light, only when it is needed. This discussion considers the "amount" of light and "when" it is needed which is the domain of lighting controls.

In an effort to curtail power consumption from lighting systems, scientists have developed new light sources such as LED as well as a myriad of lighting controls that turn OFF or DIM down light intensity to save power. The following provides features and benefits of each control strategy along with limitations.

Occupancy Sensors are used to detect human presence within a space. They incorporate single or multiple technologies (ie. Passive Infra-red or Ultrasonic) to sense motion and turn ON lights when a space is occupied. Some have sensitivity adjustments and most have an adjustable time delay (ie. 30 seconds to 30 minutes). Every time the sensor sees someone it resets an internal timer. When no motion is detected and the timer runs out, the lights are turned OFF. Some sensors are independent and some control single or multiple circuits of lighting while others are mounted to light fixtures directly. There are some sensors that offer photo sensing and allow for lights to be turned OFF or ON at a measured threshold of natural day light. Other options may allow for separate 2 circuit control (ie. Both circuits sensed vs. one sensed and one bypassed), alternating circuit control (ie. To allow even burn times for multiple ballast/lamp fluorescent fixtures), and cold room use. Sensors are available for a wide variety of space dimensions such as offices, classrooms, and warehouses, to name a few. Occupancy sensors simply and affordably control lights, but they are limited to an ON/OFF function unless they are used within a larger lighting control system with light fixtures that are dimmable. Many applications cannot have lighting turned completely OFF such as retail, public spaces, and fabrication areas with dangerous equipment. Unfortunately when dimming is desired or required the systems become cost prohibitive and complex.

Photo Sensors are used to turn artificial lighting OFF or to DIM down and up based on how much natural light is present. The successful incorporation of this technology has been a challenge. For common area street lighting and parking it is accepted that when the sun comes up the lights go OFF and when the sun goes down the lights go ON. However, when you are controlling personal spaces, not everyone wishes to have their lights turn OFF and ON automatically when they are in the space. This has led to a lot of disconnections after installation. Control systems have been created to allow lighting to DIM down and up gradually which has seen more success, but as with occupancy sensing, this becomes much more expensive and complex which limits adoption.

Lighting control systems or centralized control systems incorporate multiple control strategies and use computers to turn ON, OFF, or DIM lighting fixtures based on programming inputs. These systems may hold intelligence within one computer or may broadly distribute intelligence via programmable chipsets that reside in smart switching panels or ballasts which receive instructions from the computer and keep memory of the instructions to be performed independently. By programming you can set outputs based on schedules that must be created or on inputs that are received from occupancy sensors, photo sensors, manual switches, personal computers, or even from another control system such as HVAC or security. Outputs may go to one light fixture or could go to every light fixture in the building. There is a lot of flexibility to this approach but there is also a lot of complexity and cost. These systems must be engineered, commissioned, and maintained by skilled people in order to achieve the potential savings. These systems have the capacity to save the most power but in order to be realized, significant investment must be made at the design, installation, and commissioning stages. Not to mention ongoing maintenance as these systems require continuous adjustment by skilled people.

AIOS Dimming™ fills the void between single strategy controls and complex lighting control systems. AIOS Dimming™ monitors human traffic patterns and automatically adjusts light levels to suit usage within a space without the need for ongoing maintenance. It is a simple economical control technology that marries artificial intelligence with occupancy sensing, photo sensing, thermal sensing, and dimming. Each sensor has a specific function that gets combined with an algorithm to provide a light level output. Programming is designed to efficiently deliver light based on human traffic patterns and or specific area or individual needs.

AIOS Dimming™ is designed to be used per light fixture or optionally may also be used to control groups of light fixtures. It incorporates a microcontroller that takes inputs from an onboard clock, infrared sensor, occupancy sensor, photo sensor, and thermal sensor. *Alternatively, it could take inputs from independent sensors. Using a software program and an algorithm, the microcontroller decides what light level output to deliver based on inputs it receives from all of the sensors and the duration it takes to adjust from one light level to another.

Programming of the microcontroller occurs through a USB port or through an infrared or radio frequency sensor that receives information from a smart hand held infrared or radio frequency remote control.

Background for the UNIMPO™ Universal Mounting Bracket

Light fixtures are commonly used in a wide variety of indoor applications. These fixtures may be formed from steel or aluminum and house a plurality of linear fluorescent lamps or light emitting diodes. For aesthetic and/or functional reasons, light fixtures may be directly mounted to ceiling and wall surfaces, or suspended down below the ceiling surface. Sometimes it is also desirable to have the fixture angled towards an application area. Examples of this are mechanic workshops where fixtures are angled from the wall towards the engine compartments and swimming pools where lights are angled towards the middle of the pool from the perimeter deck where they can be accessed easily.

To accommodate varying mounting requirements, lighting manufacturers may offer a range of accessories that allow generic products to be installed in multiple applications or they may build specific products that have limited application usage. Lighting installers may also find their own creative means for mounting fixtures when fixtures do not come with specific accessories or are not specifically built for the intended application.

The results of conventional approaches to light fixture mounting are often added cost, lead time, and/or complexity. Customers are often required to pay more and wait longer to accessorize generic products. Installers may also have to endure added cost through on-site modifications, either taking fixtures apart, assembling accessories, or creating an external means of fixation. Therefore, the need exists in the art for a mounting bracket that is economical and allows usage in many applications.

The present invention can satisfy the above-described need by providing a small economical accessory that is easy to use and has many different applications. The UNIMO™ provides an accessory that takes up very little space on the shelf thereby reducing shipping and inventory costs. The product allows usage in many applications: A. Surface Ceiling Mount, B. Surface Ceiling with Adjustable Angle, C. Surface Wall Mount, D. Surface Wall Mount with Adjustable Angle, E. Single Point Pendent Mount from Conduit (with common electrical box), and F. Single Point Pendent Mount with Adjustable Angle.

The universal mounting bracket allows simple installation for one person. The mounting plate gets affixed first and the installer then simply applies screws through the fixture plate and into threaded inserts that are located on the top of the fixture. As the fixture plate is hinged to the mounting plate, the installer can set an angle by adjusting a captive aircraft cable through a tool-less adjustable cable gripper that is mounted to the fixture plate.

The mounting plate has a punch out template that allows mating with common electrical boxes. The installer may secure a box to electrical conduit, or he may secure a hook or a loop to the box which is common in the industry. Power wiring or cabling is routed through the conduit/hook/loop and into the box. The electrical box provides space for wire splicing and the UNIMO™ mounting plate has a common knockout located in the center for fixture power cabling to enter the box. Once the mounting plate is secured to the box, the fixture may be fastened to the fixture plate. Fixture splicing may be applied while the bracket is in the open position. After splicing is completed, the fixture plate is secured to the mounting plate or may be angled if desired.

SUMMARY

In a first aspect, the present invention provides an LED lighting system comprising of an enclosure for receiving one or more LED modules, one or more transformers connected to an electrical source and to one or more LED modules, and one or more drivers modulating the electrical input to the LED modules from the transformer.

In a second aspect, the present invention provides a lamp assembly comprising of one or more vertically oriented LED chips, thermally conductive shells that interact with the LED chips to conduct thermal heat from the LED chip, and a thermally dissipating means positioned at the back of the LED chips.

In a third aspect, the present invention provides an LED module comprising of a lamp assembly, one or more reflectors interconnected to the lamp assembly to reflect light emitted from the lamp assembly, and module caps interconnected to the lamp assembly and one or more reflectors to enclose the lamp assembly and the one or more reflectors.

In a fourth aspect, the present invention provides for a method of controlling light intensities. The method is comprised of the following steps: initial power on of light system at standby intensity level; detecting occupancy; determining light intensity based on detection of occupant; incrementally decrease standby intensity of lights with continued non-occupancy; detect occupancy, increase light intensity to maximum while occupant present, incrementally increase standby intensity of lights upon the departure of occupant; repeat steps until end of work day; and, end of work day locks standby light intensity and operates as a simple set user described pattern.

In a fifth aspect, the present invention provides a universal mounting bracket comprising of a fixture plate for mounting to a light fixture, a mounting plate for mounting to a surface said mounting plate being interconnected to the fixture plate, and an adjustable means interconnected to the mounting plate and fixture plate for setting an angle between the fixture plate and the mounting plate.

BRIEF DESCRIPTION OF THE DRAWINGS

It will now be convenient to describe the invention with particular reference to one embodiment of the present invention. It will be appreciated that the drawings relate to one embodiment of the present invention only and are not to be taken as limiting the invention.

FIG. 15 is a perspective view of the first and second LED chips secured onto the chip bracket, according to one embodiment of the present invention.

FIGS. 22 and 23 are perspective views of the Reflector, according to one embodiment of the present invention.

FIGS. 31 and 31a are perspective views of the Lamp Assembly unit, according to one embodiment of the present invention.

Figure 1:
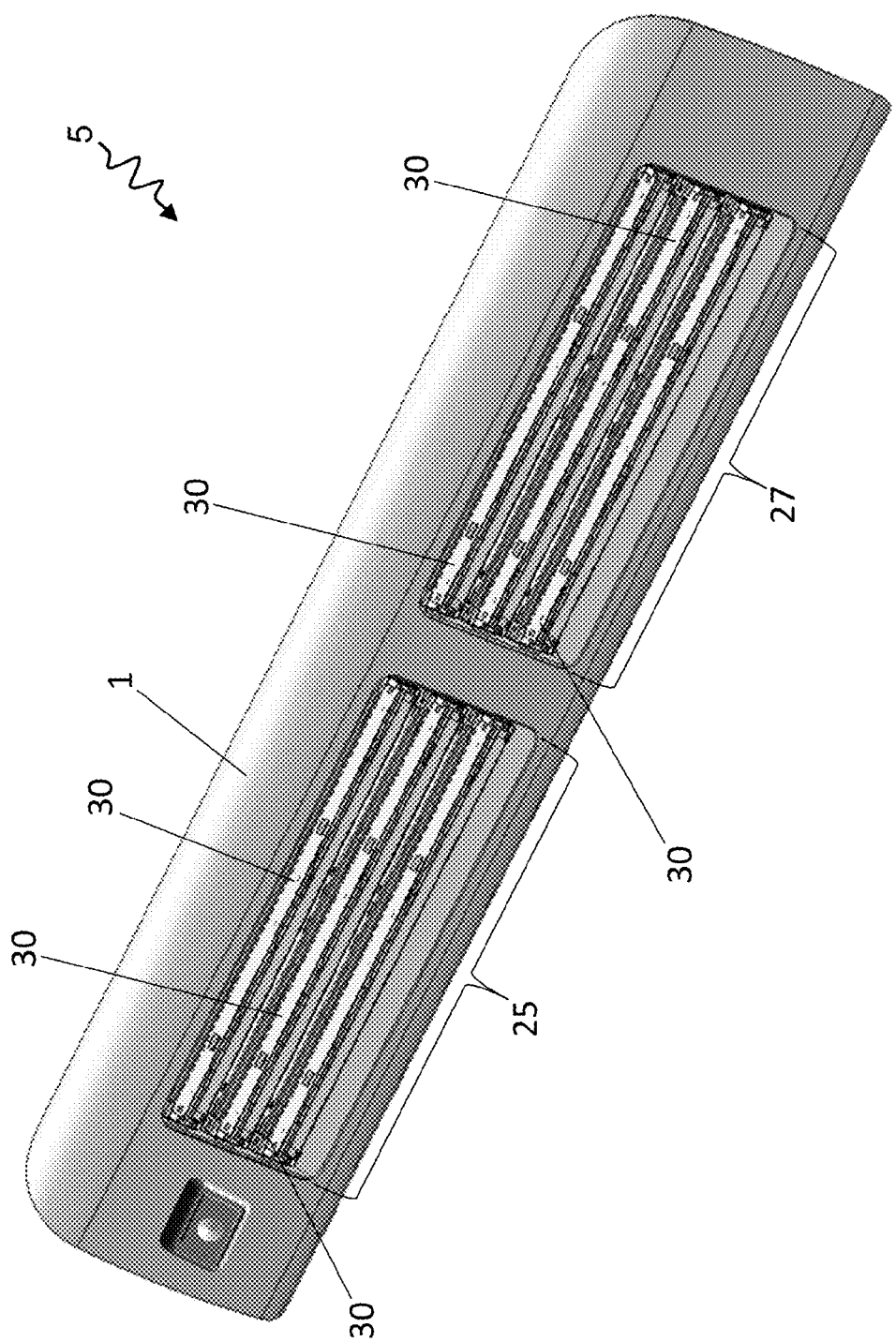
FIG. 1 is a perspective view of a LED lighting system, according to one embodiment of the present invention.

The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention.

DETAILED DESCRIPTION

The present invention will now be described more fully hereinafter with reference to the accompanying drawings, in which preferred and other embodiments of the invention are shown. No embodiment described below limits any claimed invention and any claimed invention may cover processes or apparatuses that are not described below. The claimed inventions are not limited to apparatuses or processes having all the features of any one apparatus or process described below or to features common to multiple or all of the apparatuses described below. It is possible that an apparatus or process described below is not an embodiment of any claimed invention. The applicants, inventors or owners reserve all rights that they may have in any invention claimed in this document, for example the right to claim such an invention in a continuing application and do not intend to abandon, disclaim or dedicate to the public any such invention by its disclosure in this document.

The terms "coupled" and "connected," along with their derivatives, may be used herein. It should be understood that these terms are not intended as synonyms for each other. Rather, in particular embodiments, "connected" may be used to indicate that two or more elements are in direct physical or electrical contact with each other. "Coupled" may be used to indicated that two or more elements are in either direct or indirect (with other intervening elements between them) physical or electrical contact with each other, or that the two or more elements co-operate or interact with each other (e.g. as in a cause and effect relationship).

Overview

An LED lighting system is disclosed, which generally consists of an enclosure, one or more LED modules, one or more transformers, and one or more drivers. The LED modules, transformers and drivers are fitted within the enclosure. An electrical current is passed from the electrical source to the transformers then to the drivers where it is modulated. The modulated electrical current is passed to the LED module.

A lamp assembly is disclosed, which generally consists of one or more vertically oriented LED chips, thermally conductive shells, and a thermally dissipating means positioned at the back of the LED chips. Once vertically positioned within the thermally conductive shell, the LED chips make contact with the thermally conductive shells. The contact between the LED chips and the thermally conductive shells allows heat formed on the LED chips to conduct onto the thermally conductive shells. The heat is subsequently dissipated off of the shells. In addition, the positioning of the LED chips within the shells allows for a thermally conducting means to be situated on the back of the LED chips. The thermally conductive means further dissipates the heat formed on the LED chips.

An LED module is disclosed, which generally consists of a lamp assembly, one or more reflectors and modules caps. The lamp assembly is interconnected to the reflectors. Based on the vertical positioning of the LED chips within the LED module, light emitted from the LED module is horizontal. The reflectors reflect the horizontal light emitted from the lamp assembly. The module caps are interconnected to the lamp assembly and to the reflectors.

A method of controlling light intensities is disclosed, which generally consists of method of decreasing light intensities in areas with little occupancy while minimizing user annoyance resulting from drastic light intensity fluctuations. Decreasing standby intensity level decreases the electrical consumption without altering occupant visibility level. As an occupant enters an area, the light intensity is changed from standby intensity to the highest intensity level, thus allowing the occupant full visibility. Standby light intensities are varied depending on user occupancy. The higher the occupancy level, the higher the standby light intensity. A higher standby intensity level in high occupancy areas minimizes user annoyance as the light intensity fluctuation is minimal. End of day parameters lock the standby light intensity levels and operates with simple set user described pattern.

A universal mounting bracket is disclosed, which generally consists of a fixture plate, mounting plate, and an adjustable means. The fixture plate and the mounting plate are connected. A light fixture is mounted on the fixture plate. The mounting plate is affixed to a surface, thereby setting the light fixture onto a surface. The angle between mounting plate and fixture plate can be adjusted through the adjustable means. By altering the angle between the fixture plate and the mounting plate alters the angle between the light fixture and the surface.

Lighting System and Methods for Controlling the Same

With reference to FIG. 1 and according to one embodiment of the present invention the LED lighting system 5 is shown. The lighting system is shown attached to a cosmetic plate 1.

Figure 1A:
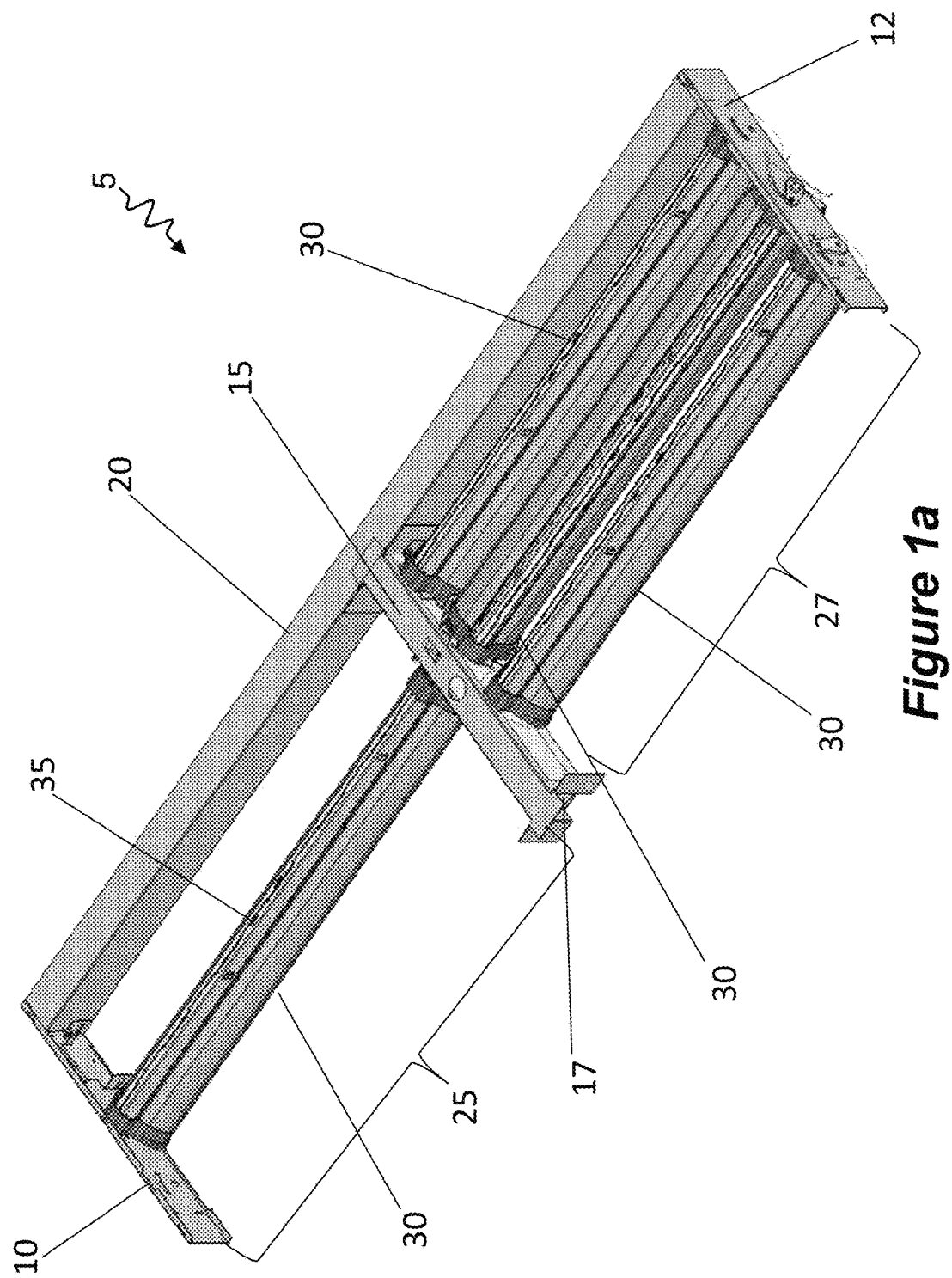
FIG. 1a is a perspective view of a LED lighting system, according to one embodiment of the present invention.

With reference to FIG. 1a and according to one embodiment of the present invention the LED lighting system 5 is shown. The LED lighting system 5 is primarily comprised of first and second end plates 10, 12, a hollow bridge 15, and first and second driver channel 20, 22 (not shown).

With further reference to FIG. 1a and according to one embodiment of the present invention, first and second openings 25, 27 are shown within LED Lighting System 5 with first opening 25 defined as an opening between the end plate 10, channel driver 20, and hollow bridge 15 and the second opening 27 defined as the opening between end plate 12, channel driver 20, and hollow bridge 15. The first and second openings 25, 27 are capable of housing multiple parallel lamp assembly units 30. Parallel lamp assembly units 30 can be fitted into first or second openings 25, 27. For illustrative purposes, FIG. 1a describes first opening 25 containing a single lamp assembly 30 and second opening 27 containing three lamp assembly units 30. A worker skilled in the relevant art would appreciate the various combinations of lamp assembly units 30 that can be fitted onto the first and second opening 25, 27. Once fitted, the lamp assembly unit 30 can rotate axially to a fixed angle in order to direct or focus light to specific, user requested regions.

Figure 1B:
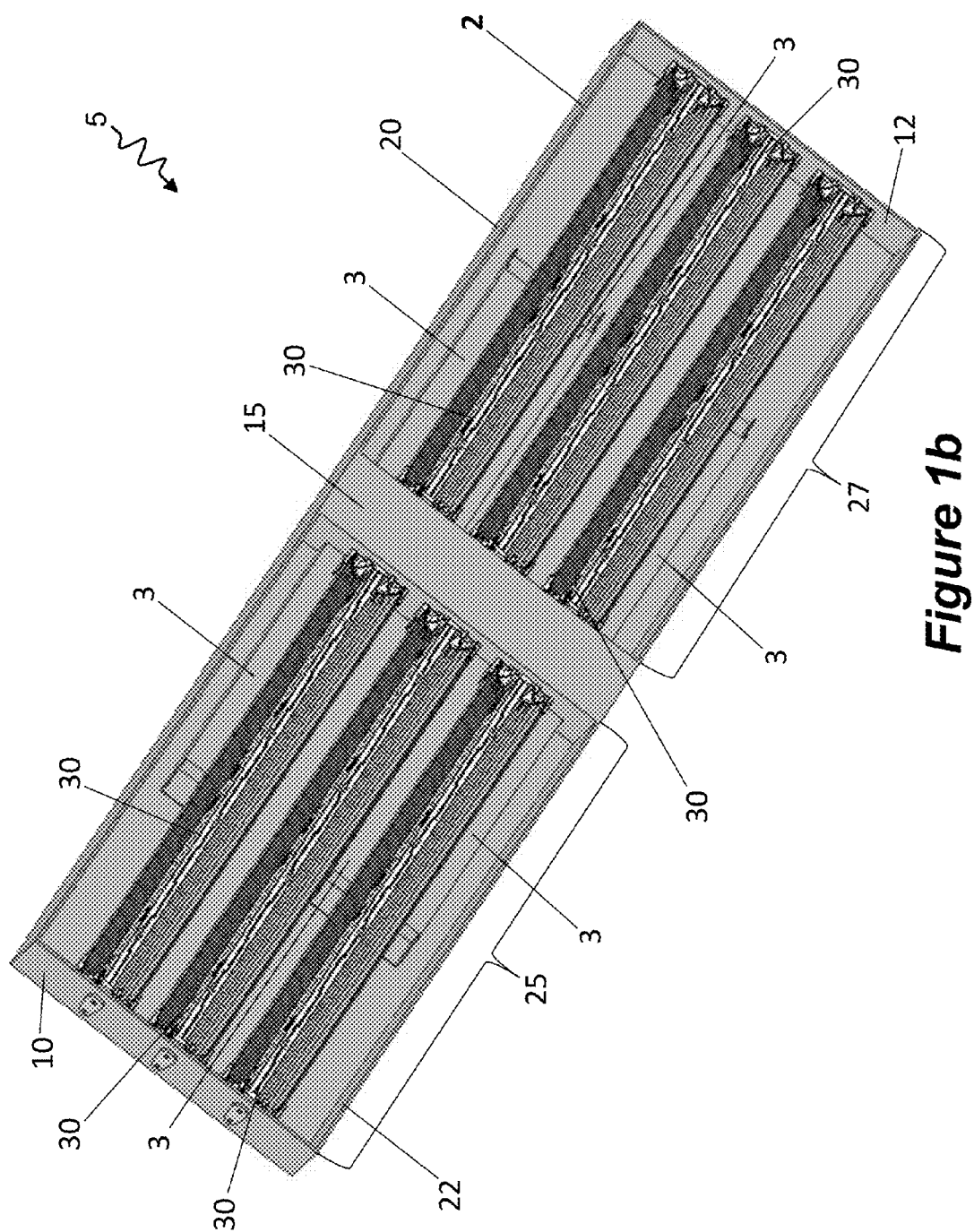
FIG. 1b is a perspective view of a LED lighting system, according to another embodiment of the present invention.

With reference to FIG. 1b and according to another embodiment of the present invention the LED lighting system is shown. In this configuration, the lighting system is housed within enclosure 2. The hollow bridge 15, the first and second driver channel 20, 22, and the first and second end plates 10, 12 form the structural elements of the enclosure 2. The present invention has three distinct components: 1. The LED module 35; 2. The Lamp Assembly 30; and 3. The LED lighting system 5. Each will be further described separately below based on the knowledge of a worker skilled in the relevant art. The terms "LED lighting system" and "light fixture" are used interchangeably and refer to a similar system and/or fixture.

1. LED Module

Figure 2:
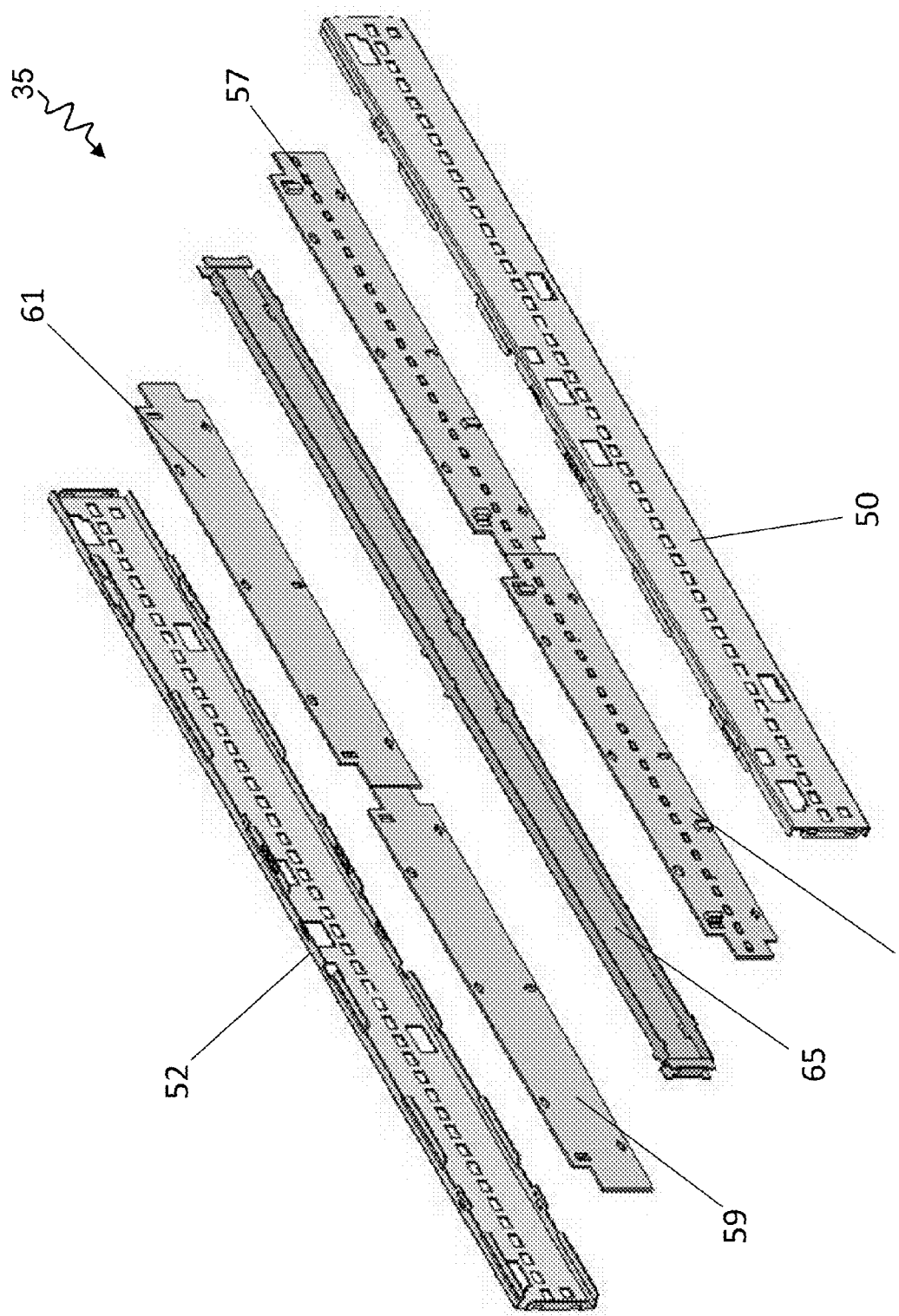
FIG. 2 is a perspective exploded view of a LED module, according to one embodiment of the present invention.

With reference to FIG. 2 and according to one embodiment of the present invention the components of the LED module 35 are described in greater detail. The LED module 35 consists of first and second thermally conductive shells 50, 52, LED chips 55, 57, 59, 61, and a chip bracket 65. The first and second thermally conductive shells 50, 52 are axially mirrored and clasp together to form the housing of the LED module 35. LED chips 55 and 57 are vertically positioned side by side with at least one extremity of said LED chips 55 and 57 in close proximity to one another. In one embodiment of the present invention, the extremities of LED chips 55 and 57 touch one another. LED chips 59, 61 positioned similarly as LED chips 55, 57 but are axially rotated 180 degrees. The vertical positioning of the LED chips 55, 57, 59, and 61 can be positioned anywhere from 45° to 90° with respect to the top or bottom plane of the chip bracket 65, with an optimal placement at 90°. The chip bracket 65 functions to hold LED chips 55, 57, 59, 61 and to dissipate heat from the core of the LED module 35.

Figure 2A:
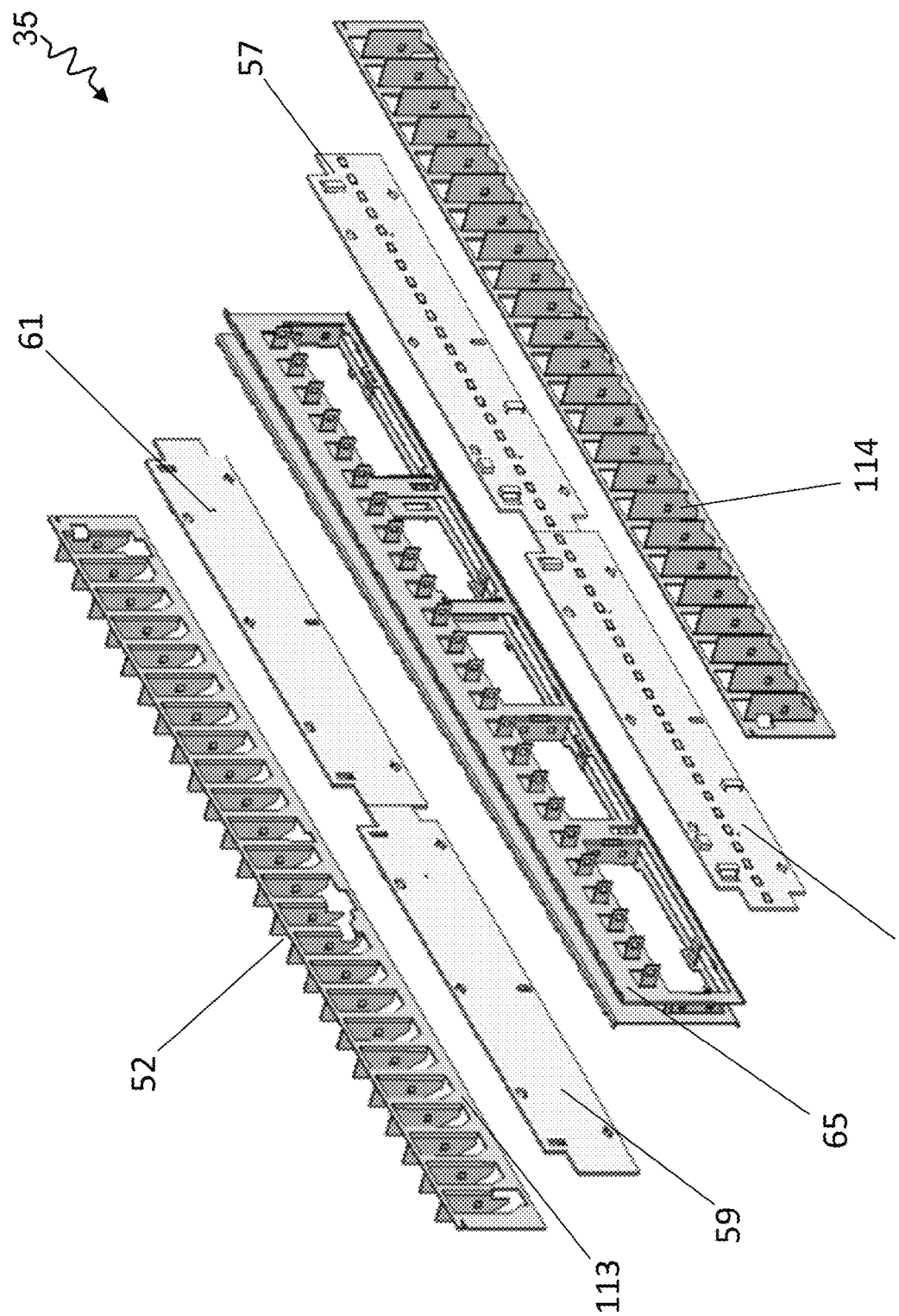
FIG. 2a is a perspective exploded view of a LED module, according to another embodiment of the present invention.

With reference to FIG. 2a and according to another embodiment of the present invention the components of the LED module 35 are described in greater detail. The LED module 35 outlined in FIG. 2a is intended for use with high density LED lamp fixtures. The high density LED lamp fixtures emit a large amount of heat. In order to use the high density LED chips, the LED module 35 requires a greater ability to dissipate the heat in order to further decrease the chips thermal signature. The first and second thermally conductive shells 50 and 52 under this embodiment have a thermal conducting line 113 that touches the PCB just above the LEDs. The thermal conducting line 113 transfers heat emitted from the face of the PCB to a large surface area of heat within the radiating fins 114. The fins 114 increase the amount of area that is exposed to convective cooling. Additionally, chip bracket 65 further facilitates dissipation of heat. The chip bracket 65 permits air flow between the LED boards thereby further dissipating the heat emitted by the LED chips.

The vertical orientation of LED chips yields a number of benefits as compared to conventional horizontal orientation, with LED's facing down. Vertical orientation along with heat sinking elements affixed to front and back faces of the LED chips significantly reduces heat buildup in the LED. Reducing LED thermals results in higher light output per watt and an increased life span of the LEDs. Cool air from below is allowed to convect up across the front and back face of the LED chips and the associated heat sinking elements. To increase light output density, LED chips may be positioned back to back, separated by a specific air gap that allows for adequate air to flow between the LED chips. Alternatively, the specific air gap can be supplanted with heat sink elements of specific width. The heat sink elements increase the total surface area from which heat dissipation can occur at the back of the LED chips. A worker skilled in the relevant art would appreciate the various heat sink materials and perforated shapes that would permit optimal heat dissipation from the back of the PCB. In addition, the vertical orientation prevents particulates, such as dirt and dust, from accumulating on the LEDs and the heat sinking elements. Dust accumulation acts like an insulative blanket making horizontal PCB's less effective and less efficient. Vertical orientation provides the least amount of surface area for particulates to rest upon. Further, convective flows serve to provide a cleaning effect.

Vertical orientation of the LEDs provides the flexibility to shape light distribution while improving visual comfort and total fixture efficiency. Conventional horizontal orientation of the LED provides a general wide pattern of light distribution. Methods that shape light mainly focus on lenses that mount directly over each individual LED or a single lens that that mounts to the fixture below the LED chips. Either method substantially increases costs and decreases fixture light output efficiency. Vertical orientation of the LED chips positions the LEDs perpendicular to the ground. The perpendicular orientation of the LEDs permits shaping and distribution of light without affecting thermal performance. A reflector (not shown) may be shaped to efficiently push the LED light towards the ground directly below the fixture. Conversely, the reflector (not shown) may be shaped in a fashion that reduces light below the fixture while increasing the light at high angles. The reflectors may extend below the plane of the LEDs, thereby minimizing user contact with direct light. Reflectors may be produced from a wide assortment of surface types, from diffused to specular with many variations in between. A worker skilled in the relevant would appreciate the various methods of shaping the LED light using reflectors of various shapes and reflective properties.

Figure 3:
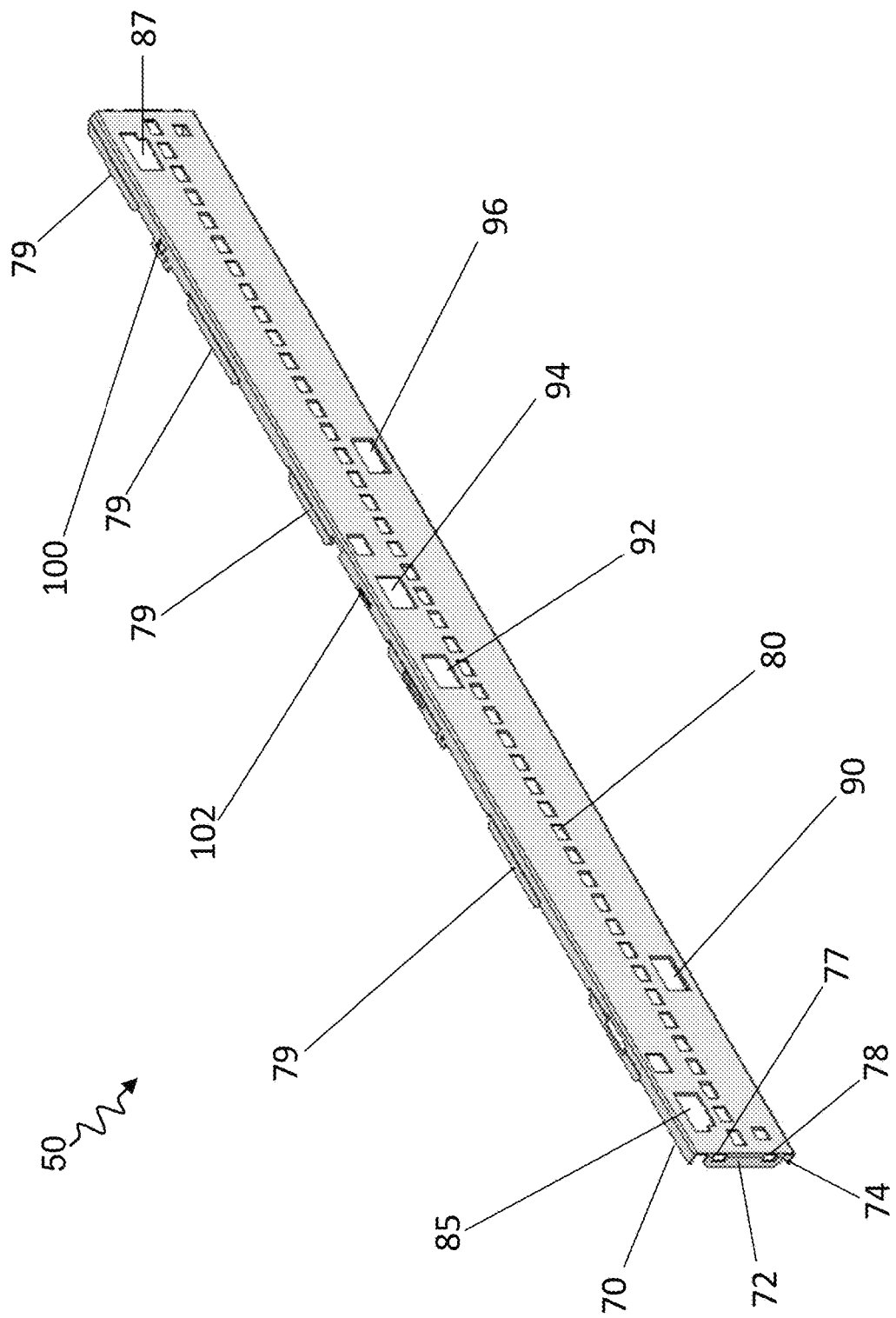
FIG. 3 is a perspective view of shell, according to one embodiment of the present invention.

With reference to FIG. 3 and according to one embodiment of the present invention, the first thermally conductive shell 50 is shown in greater detail. The edges of the first thermally conductive shell 50 are bevelled 70, 72 and 74 in order to encapsulate the inner portions of the LED module 35. The vertically opposed bevel 72 contains an upper and lower aperture 77, 78. A corresponding vertical bevel positioned on the opposite end of bevel 72 is present but not shown. The horizontally opposed bevels 70, 74 include additional depressed protrusions 79 which are dispersed throughout the length of the first thermally conductive shell 50 in order to interact with second shell (not shown) upon formation of the LED module 35. The length of bevelled edges 70, 72, 74 and 76 (not shown) along with the associated depressed and clasping protrusions 79 and 102 is dependent on the width of the chip bracket 65 (not shown). In another embodiment of the present invention the horizontally opposed bevels 70, 74 along with the depressed protrusions 79 are perforated. The perforated nature of the horizontally opposed bevels 70, 74, along with the corresponding depressed protrusion 79 and clasping protrusion 102 permit air to flow between the first and second thermally conductive shell 50, 52 when connected. Rectangular slots 80 adorn the central region of the first thermally conductive shell 50. Each slot 80 is uniformly shaped and is positioned equidistantly throughout the first thermally conductive shell 50 to receive the LED lights (not shown). First and second receiving apertures 85, 87 reside on the upper corners of the first thermally conductive shell 50. Additional openings 90, 92, 94, 96 are located throughout the first thermally conductive shell 50. Interlocking clasp protrusions 100, 102 are located on the upper beveled region of the first thermally conductive shell 50. In another embodiment the thermally conductive shell 50 contains vertical fins (not shown) on the upper front surface. The height of the fins (not shown) varies from a minimum of 1 mm to a maximum of 75 mm. The second shell (not shown) has identical features of the first thermally conductive shell 50.

Figure 4:
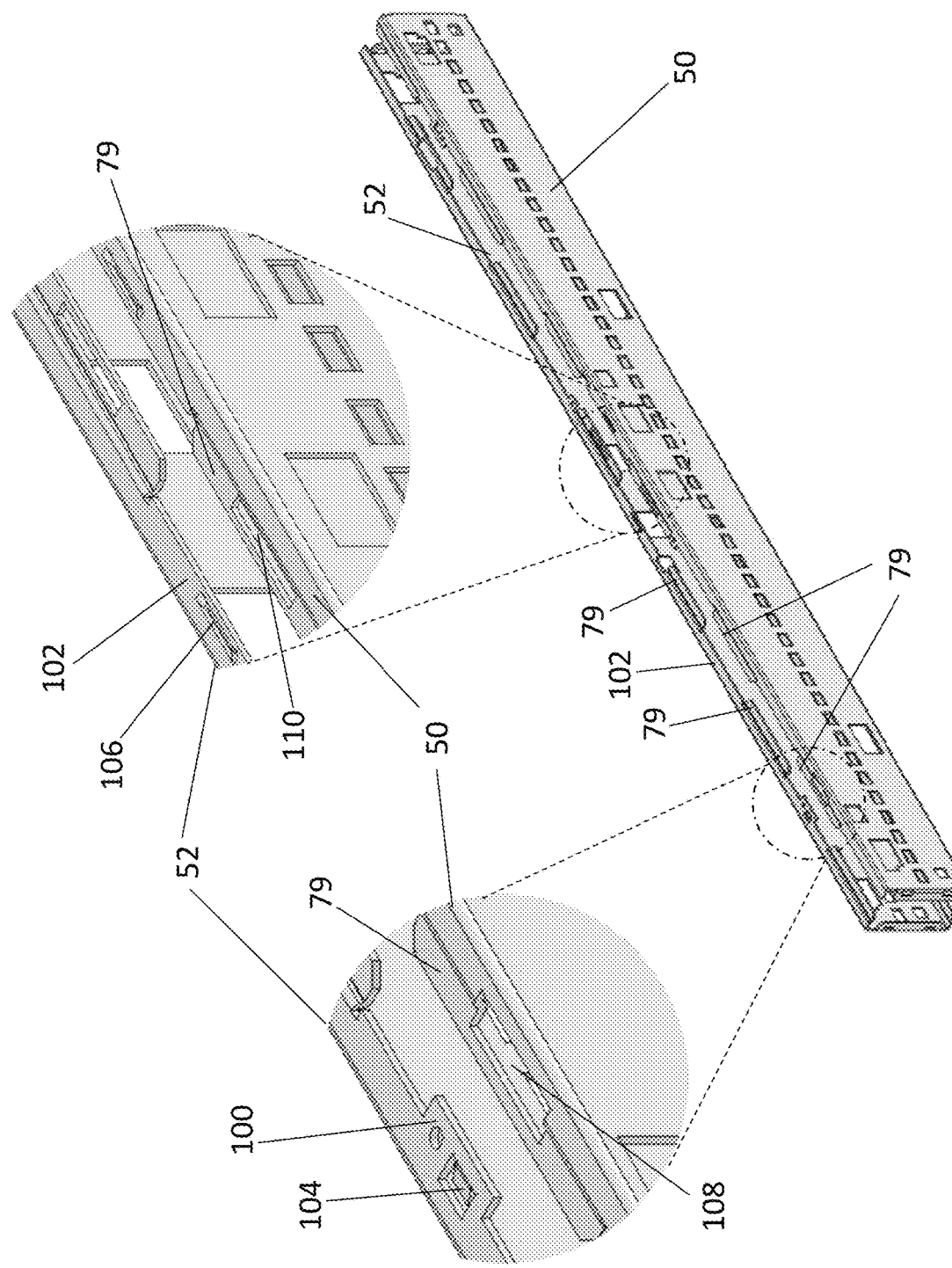
FIG. 4 is a perspective view of the shell-shell interaction, including outer shell and inner shell linking mechanisms, according to one embodiment of the present invention.

With reference to FIG. 4 and according to one embodiment of the present invention, the first and second thermally conductive shells 50, 52 are shown in greater detail. Second shell 52 is a duplicate of the first thermally conductive shell 50 rotated 180 degrees on the vertical axis. As the first and second thermally conductive shells 50, 52 align for coupling; the depressed protrusions 79 are offset with clasping protrusions 102 allowing the first and second thermally conductive shell 50, 52 to connect. In another embodiment of the present invention the horizontally opposed bevels 70, 74 along with the depressed protrusions 79 are perforated. The perforated nature of the horizontally opposed bevels 70, 74, along with the corresponding depressed protrusion 79 and clasping protrusion 102 permit air to flow between the first and second thermally conductive shell 50, 52 when connected.

With further reference to FIG. 4 a shell latching mechanism is shown in greater detail according to one embodiment of the present invention. Interlocking clasp protrusions 100, 102 of first and second thermally conductive shells 50, 52 align with a depressed protrusion 79 of the opposite shell. Consequently, when the first and second thermally conductive shells 50, 52 are secured together, the beveled latches 104, and 106 clip into the first and second Protrusion Holes 108, 110 respectively.

Figure 5:
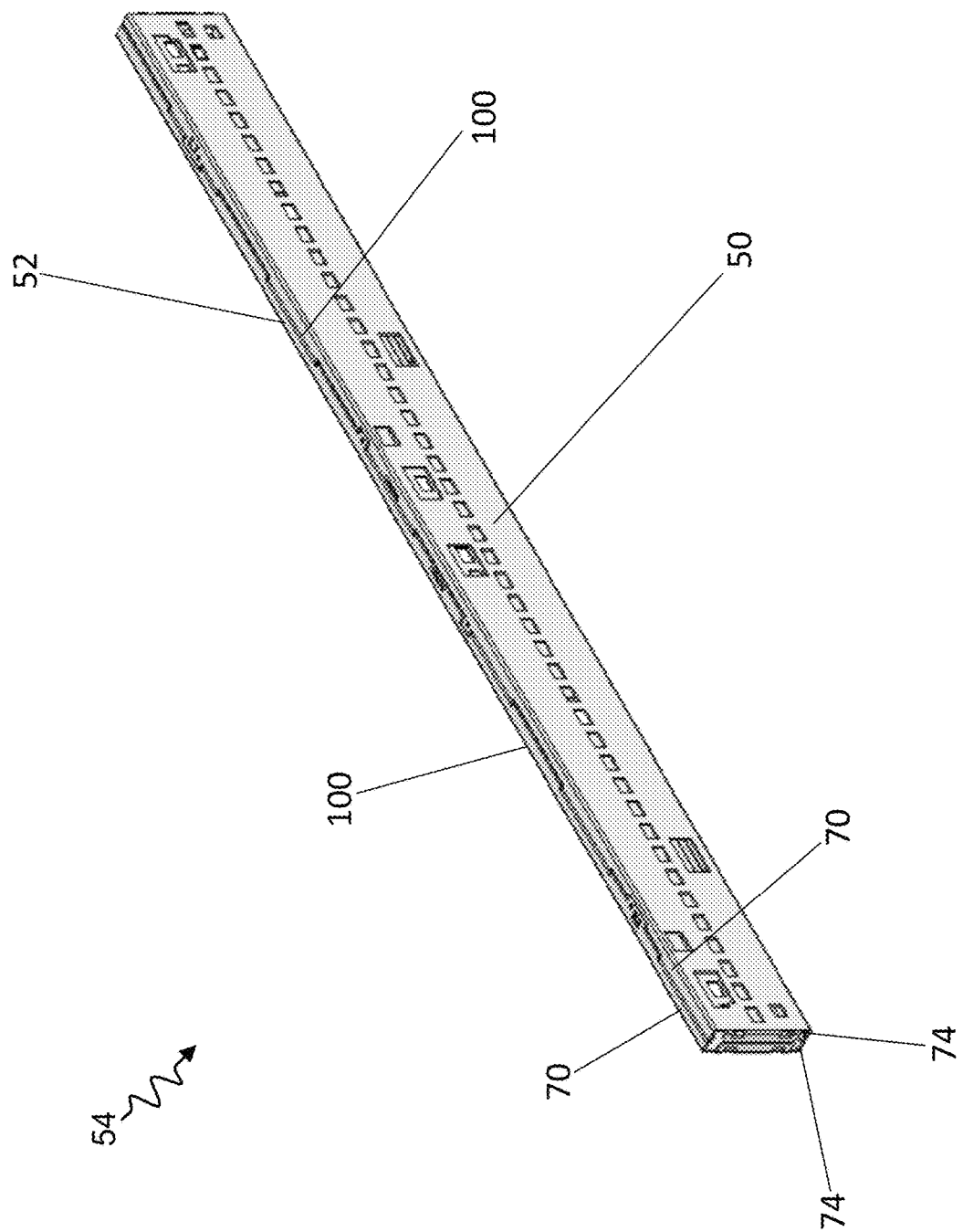
FIG. 5 is a perspective view of the connected shells, according to one embodiment of the present invention.

With reference to FIG. 5 and according to one embodiment of the present invention, first and second thermally conductive shells 50, 52 are represented in a secured configuration forming the LED module shell 54. The first thermally conductive shell 50 is able to engage with the second shell 52 through interlocking beveled edges 70 and 74 as present on shells 50 and 52. The Interlocking clasp protrusion 100 of the first and second thermally conductive shell 50, 52 interlock with its associated depressed beveled protrusions (not shown).

Figure 6:
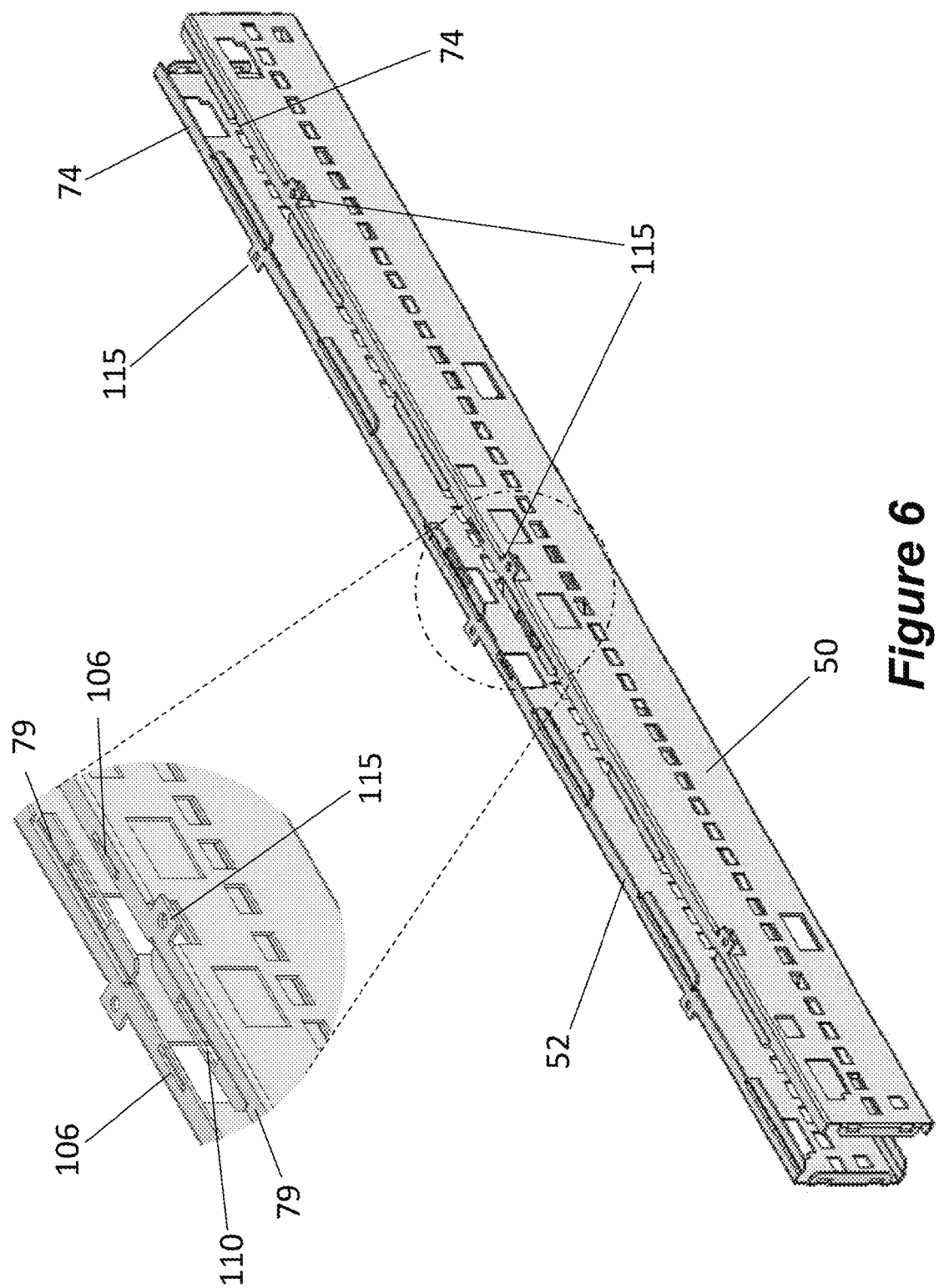
FIG. 6 is a perspective view of the shell-shell interaction, according to another embodiment of the present invention.
Figure 7:
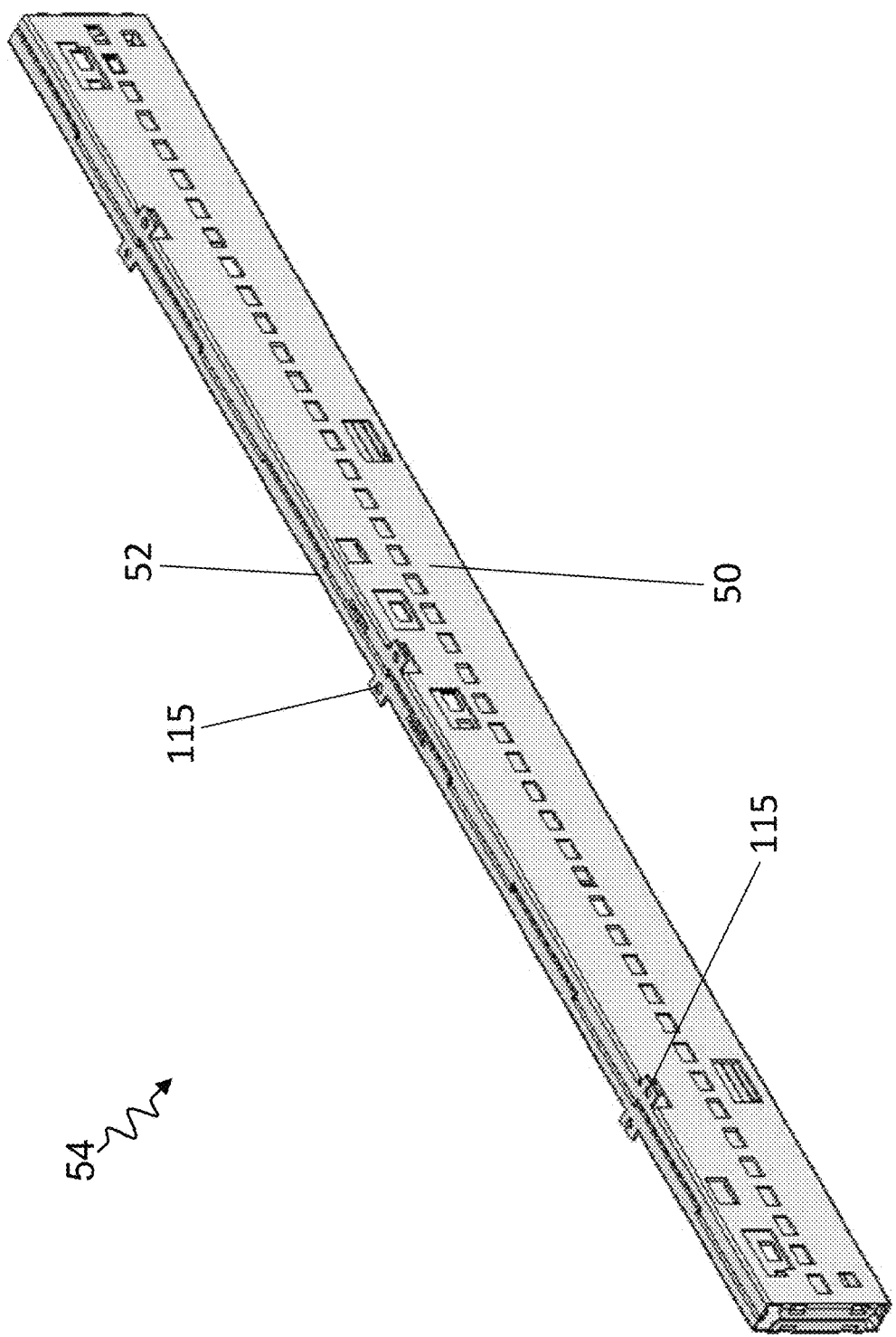
FIG. 7 is a perspective view of the connected shells, according to another embodiment of the present invention.

With reference to FIG. 6, and according to another embodiment of the present invention, the first and second thermally conductive shells 50, 52 are shown. A worker skilled in the relevant art would appreciate the various alternative latching and fastening mechanisms that can be employed to secure first and second thermally conductive shells 50, 52 together. The first and second thermally conductive shells 50, 52 contain bolt supporting members 115 protruding from the beveled surfaces 74 as present on thermally conductive shells 50 and 52. As clearly shown in FIG. 6 in greater detail, the first and second thermally conductive shells 50, 52 maintain the beveled latch 106 and protrusion hole 110 within the depressed beveled protrusion 79 while incorporating the bolt supporting member 115. With reference to FIG. 7, the first and second modified thermally conductive shells 50, 52 are represented in a closed confirmation forming the LED module shell 54.

Figure 8:
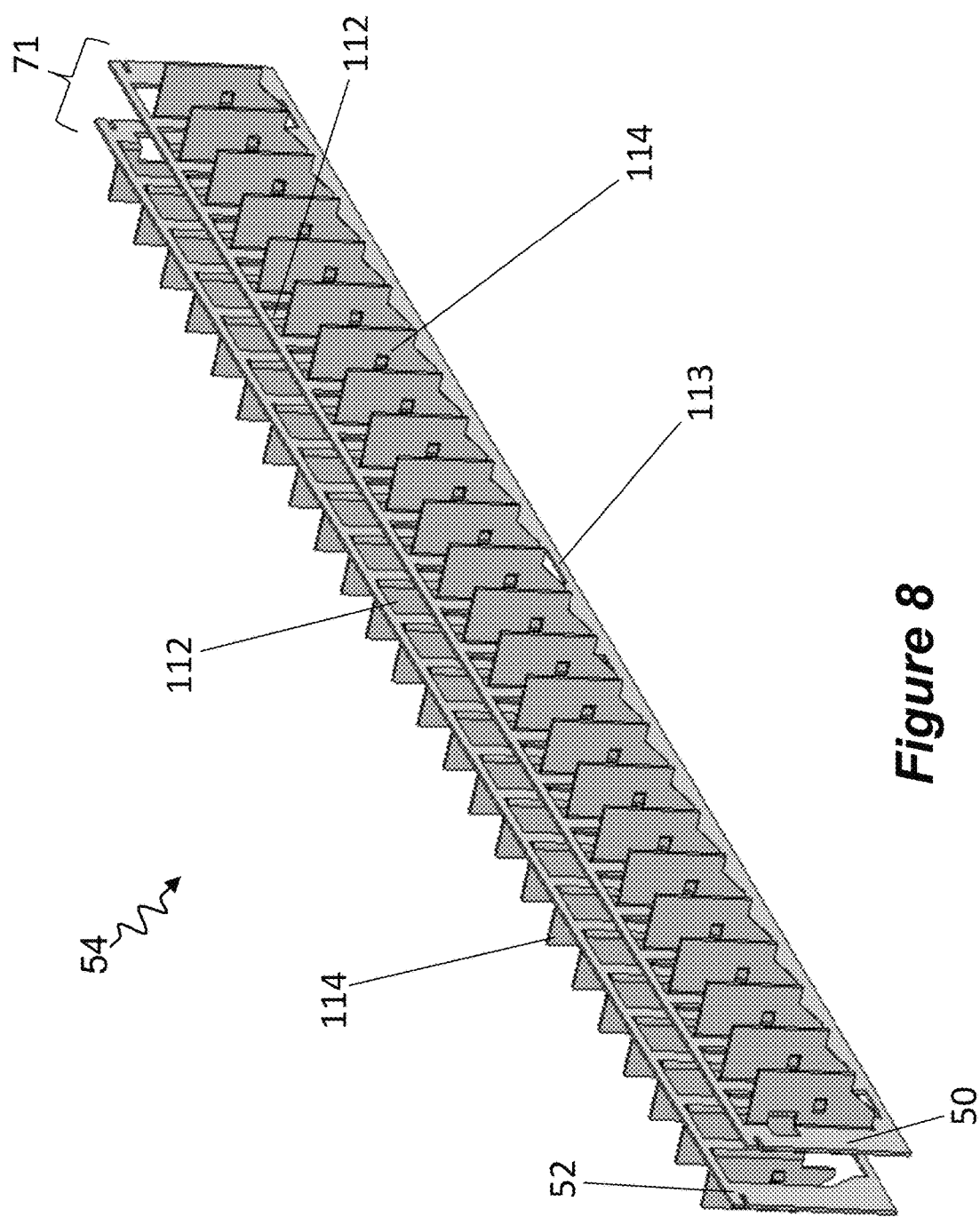
FIG. 8 is a perspective view of the shells, according to another embodiment of the present invention.

With reference to FIG. 8 and according to another embodiment of the present invention, the first and second thermally conductive shells 50, 52 are shown. In this embodiment, the first and second thermally conductive shells 50 and 52 do not interact with each other. Rather, the first and second thermally conductive shells 50 and 52 are connected through interaction with other components of the LED module (not shown). A worker skilled in the relevant art would appreciate the various alternative latching and fastening mechanisms that can be employed to secure the first and second thermally conductive shells 50 and 52 onto the LED module. The first and second thermally conductive shells 50 and 52 are separated by gap 71. The gap 71 permits air to flow between the first and second thermally conductive shells 50 and 52. To facilitate heat dissipation by air flow on the outer region of the LED module (not shown), vertical fins 114 adorn the outer surface of the first and second thermally conductive shells 50 and 52. The height of the fins varies from a minimum of 1 mm to a maximum of 75 mm. The optimal spacing between each fin 114 is shown. A worker skilled in the relevant art would appreciate that the number of and distance between each fin 114 is dependent on the size of the LED module 35 and the thermal output of the LED chip boards (not shown). The thermal conducting line 113 transfers heat emitted from the face of the PCB to a large surface area of heat within the radiating fins 114. The fins 114 increase the amount of area that is exposed to convective cooling.

Figure 9:
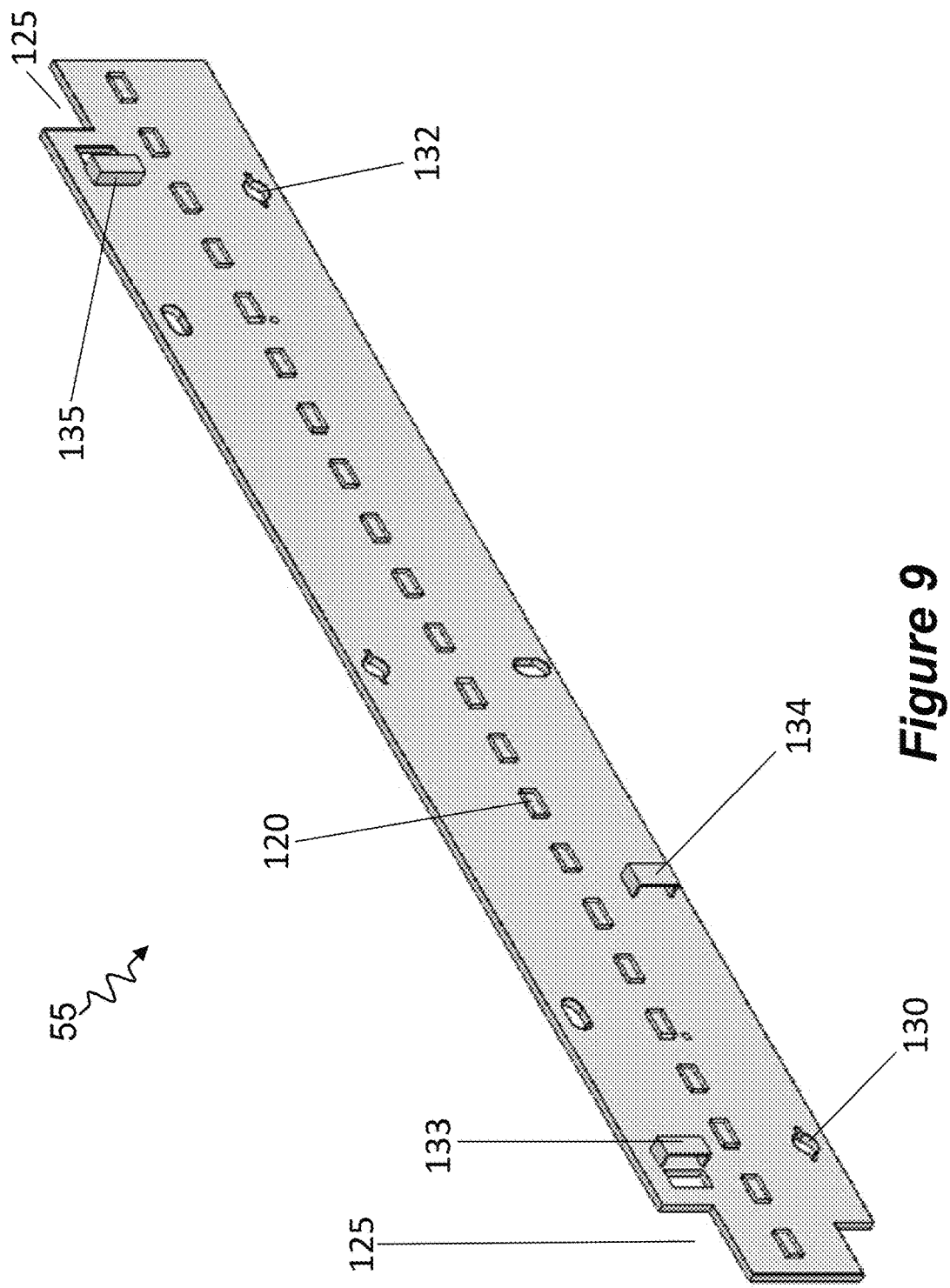
FIG. 9 is a perspective view of the Philips® brand Fortimo® LED chip, according to one embodiment of the present invention.

With reference to FIG. 9 and according to one embodiment of the present invention, the first LED chip 55 is shown in greater detail. The first LED chip 55 is a commercially available Philips® brand Fortimo® LED line system (1100 lm 765 1R LV1). Twenty-two LED lights 120 adorn the face of the first LED chip 55. The LED lights 120 are distributed horizontally and aligned along the face of the LED chip 55. Three electrical connectors 133, 134, 135 are positioned along the face of the first LED chip 55. The upper corners of the LED chip 55 are notched with rectangular grooves 125. First and second securing members 130, 132 are located on the lower regions of the LED chip 55. The LED chips used in the present invention have identical features.

Figure 10:
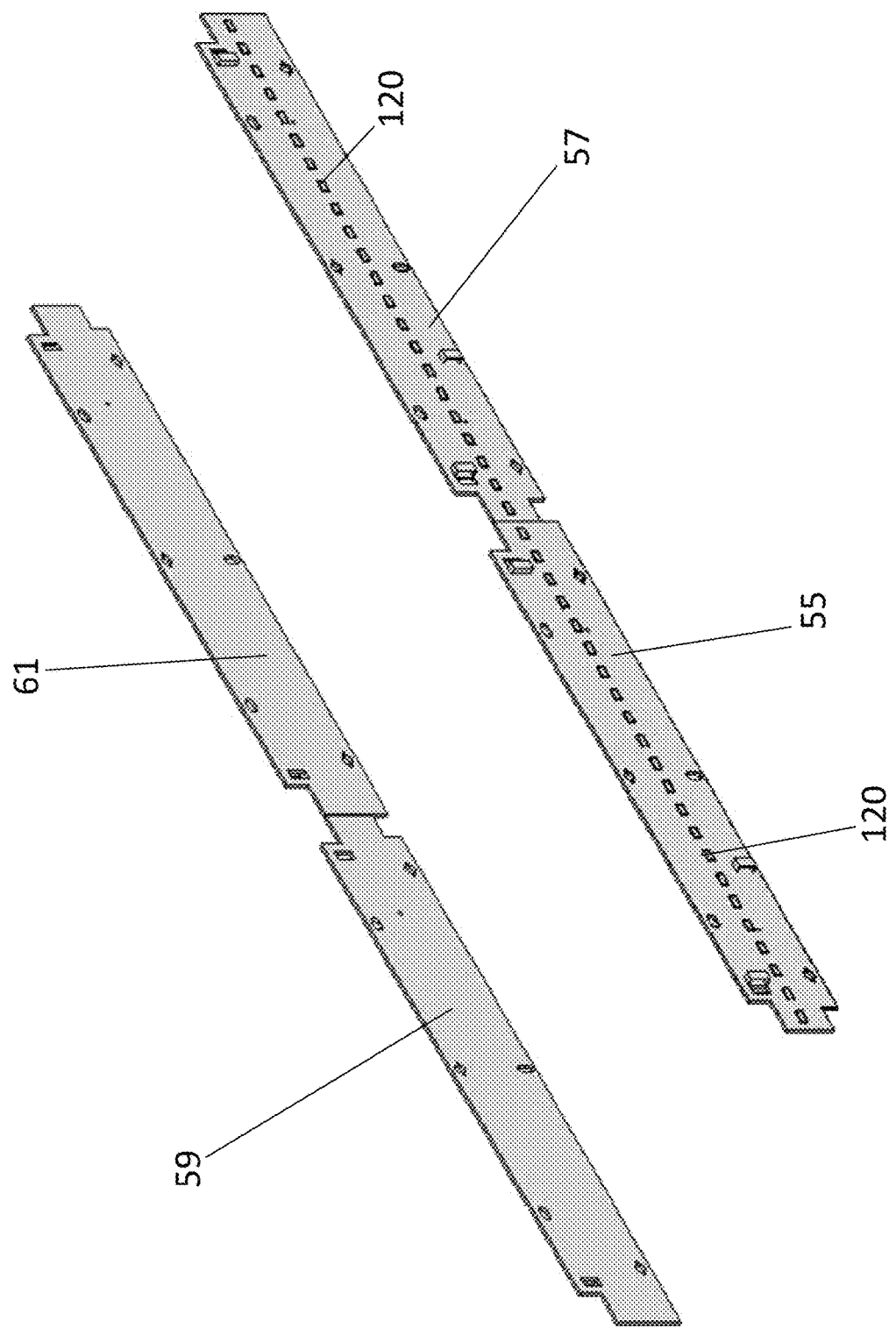
FIG. 10 is a perspective view of the LED chip orientation, according to one embodiment of the present invention.

With reference to FIG. 10 and according to one embodiment of the present invention, LED chips 55, 57, 59, 61 are shown in a configuration. LED chips 55 and 57 are positioned adjacent to one another and in a manner as to have the LED lights 120 facing the same direction. LED lights 59 and 61 are arranged in the same manner but are rotated 180 degrees axially.

Figure 11:
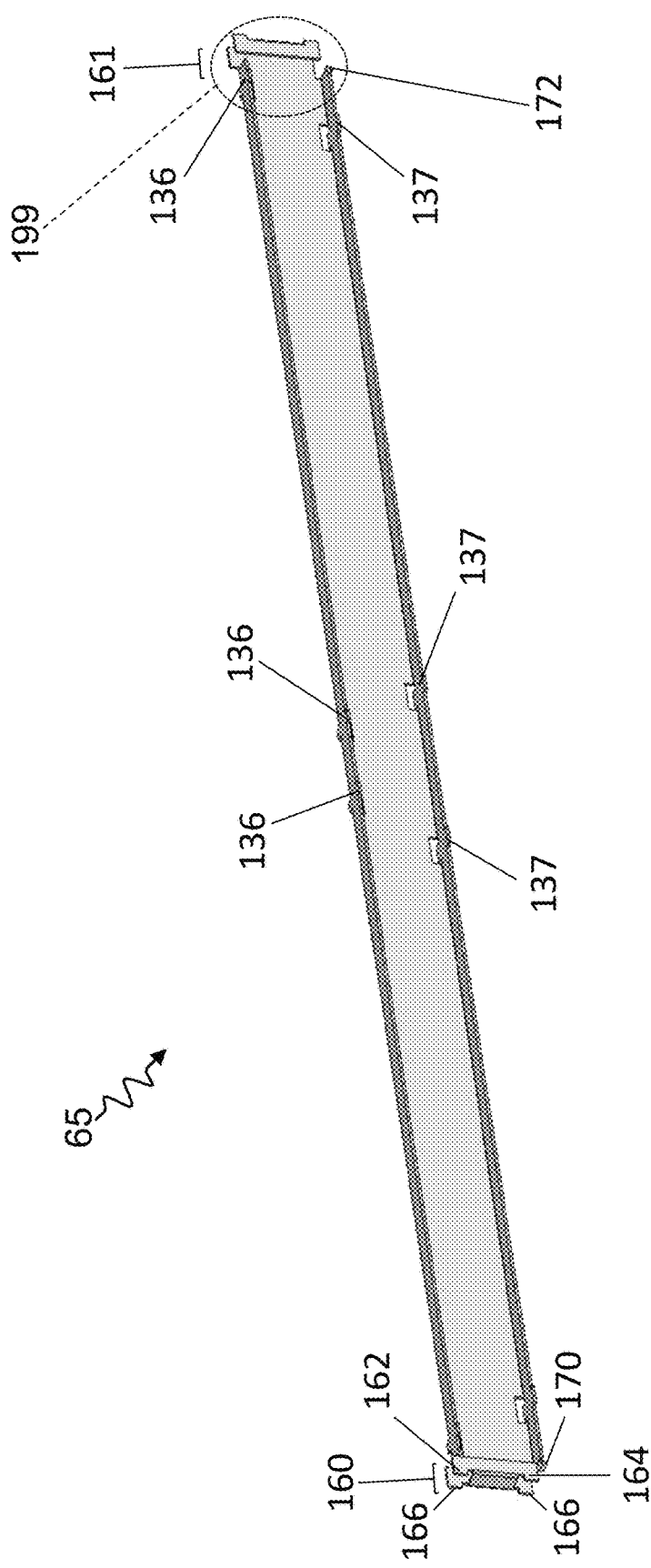
FIG. 11 is a perspective view of the chip bracket, according to one embodiment of the present invention.
Figure 12:
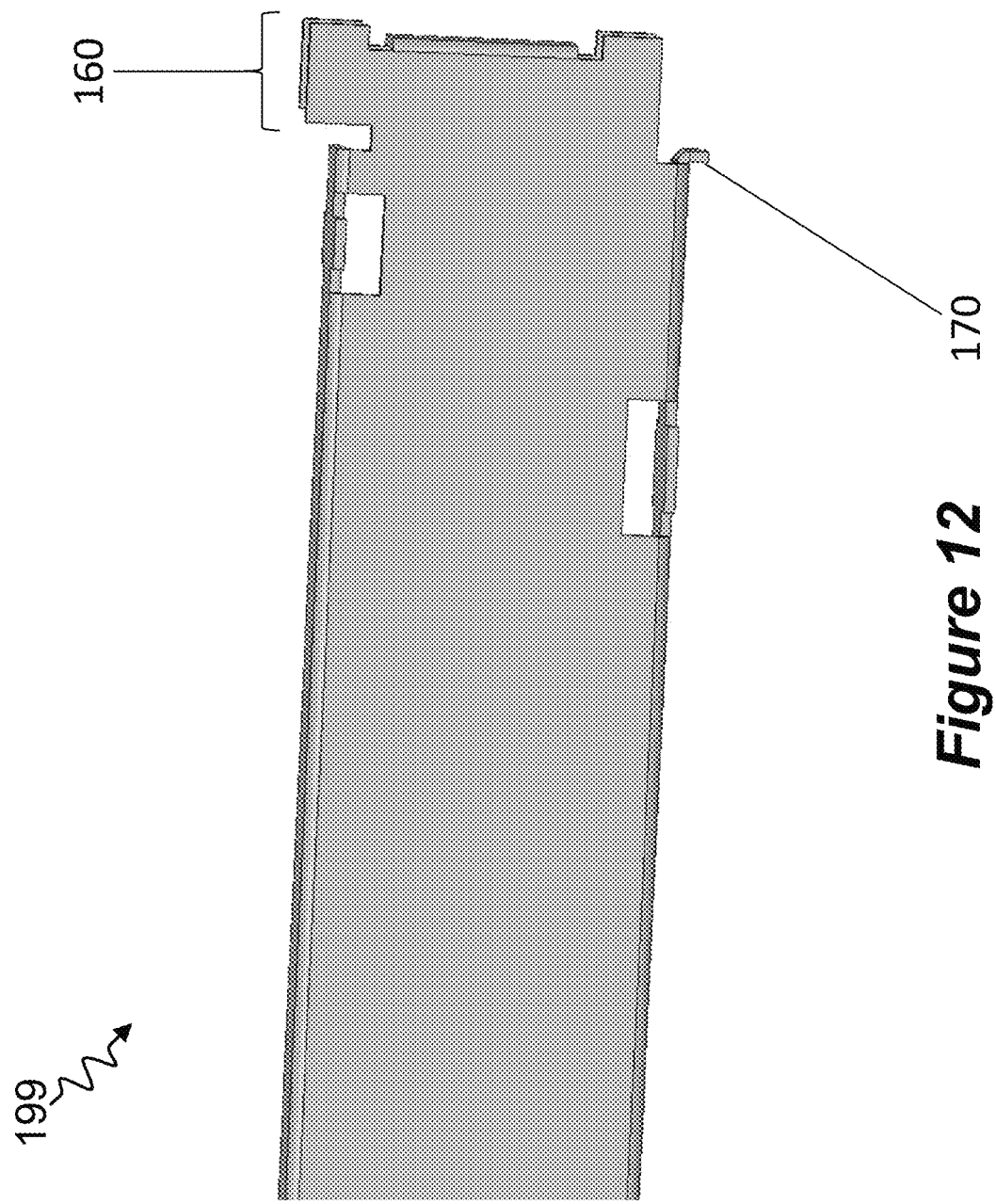
FIG. 12 is a perspective view of an outer region of the chip bracket, according to one embodiment of the present invention.

With reference to FIGS. 11 and 12 and according to one embodiment of the present invention, the chip bracket 65 is shown in greater detail. The chip bracket 65 is comprised of folded beveled edges that give rise to the first and second positioning braces 160, 161. The folded beveled edges can vary in length from 2 mm to 75 mm. The positioning braces 160, 161 contain brace latches 162, 164, 166, 168 protruding from positioning braces 160 and 161. The chip bracket 65 also has upper and lower chip mounts arms 136, 137, located on the upper and lower periphery of the chip bracket 65.

First and second connecting members 170, 172 are located on the lower extremity of the chip bracket 65. In another embodiment of the present invention the chip bracket 65 can be constructed as a solid, or a heavily woven thermally conductive material. The solid chip bracket 65 will be used in conjunction with metal core LED chip boards. The metal core LED chip boards have a decreased thermal resistance to heat transfer at the back of the board. The thermally conductive chip bracket 65 conducts heat quickly from the surface of the metal core LED chip board. The woven chip bracket 65 with increased surface area dissipates heat as air passed through the weave. A worker skilled in the relevant art would appreciate the various weave patterns that would increase surface area while permitting air to pass through the chip bracket. A solid, thermally conductive chip bracket 65 conducts heat from the surface of the metal core LED chip boards. A solid core chip bracket 65 can also conduct the heat away from the metal core LED boards and transfer the heat to the shells (not shown), where the heat is subsequently dissipated by natural air flow. With specific reference to FIG. 11 the first connecting member 170 is located on the dorsal portion of the chip bracket 65 but recessed behind the positioning brace 160.

Figure 13:
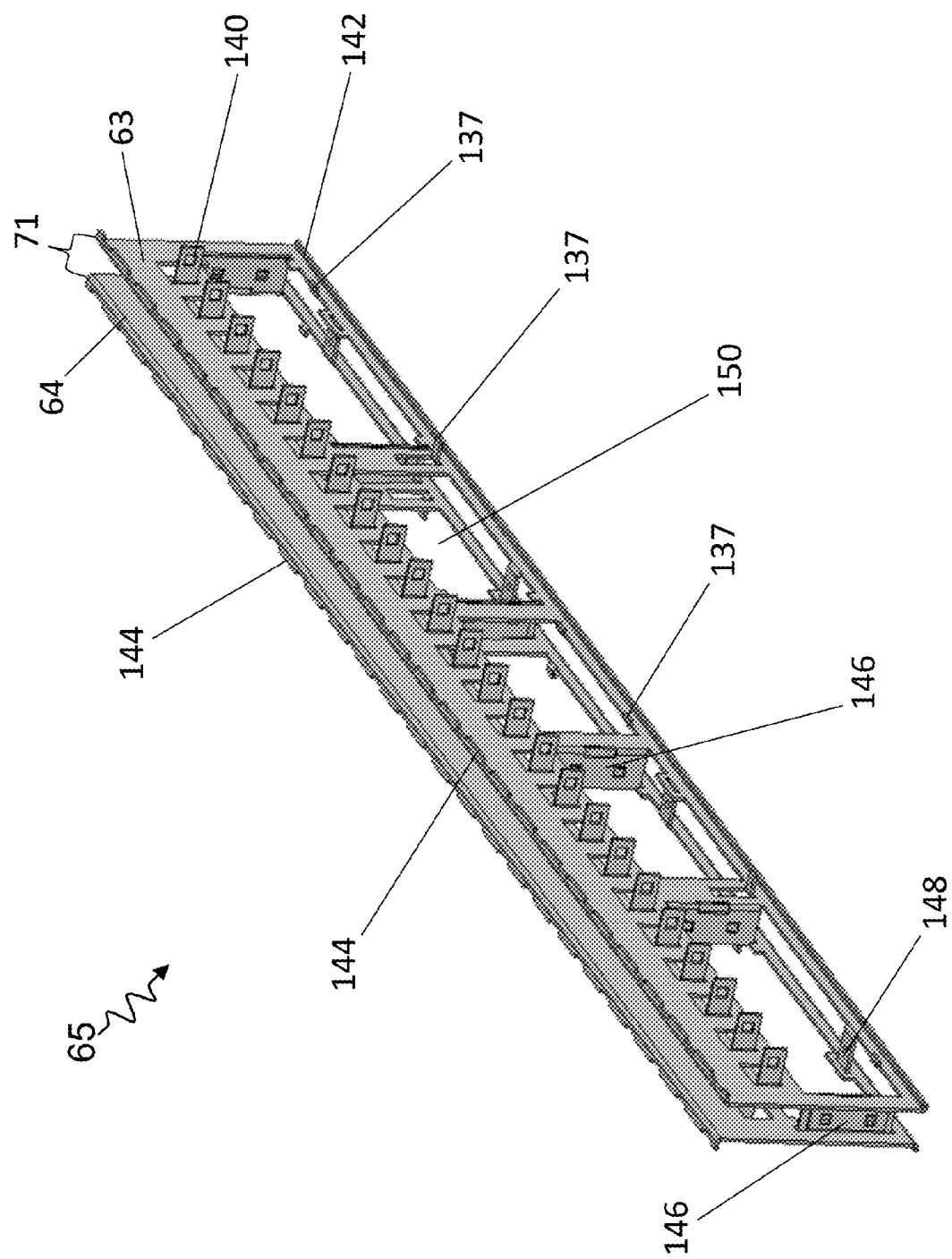
FIG. 13 is a perspective view of the chip bracket, according to another embodiment of the present invention.

With reference to FIG. 13 and according to another embodiment of the present invention, the chip bracket 65 is shown in greater detail. The chip bracket 65 is comprised of two center walls 63 and 64 connected by strut 146 and link 148. The struts 146 and links 148 allow air to pass through the center of the chip bracket 65, through gap 71. A worker skilled in the relevant art would appreciate the various connecting mechanisms that interconnect the center walls 63 and 64 while maintaining gap 71. The width of the gap 71 is determined by the density and heat emission of the LED chips (not shown). Variation in gap width 71 will be described in subsequent sections. The center walls of the chip bracket 64 contain large openings 150 that are partitioned by the struts 146. Beveled teeth 144 and lower lip 142 adorn the upper and lower region of the chip bracket 65, respectively. Lower chip mounts 137 remain in the same respective regions, along the lower portion of the chip bracket 65. Fin latches 140 extrude from the surface of the chip bracket 65.

Figure 14:
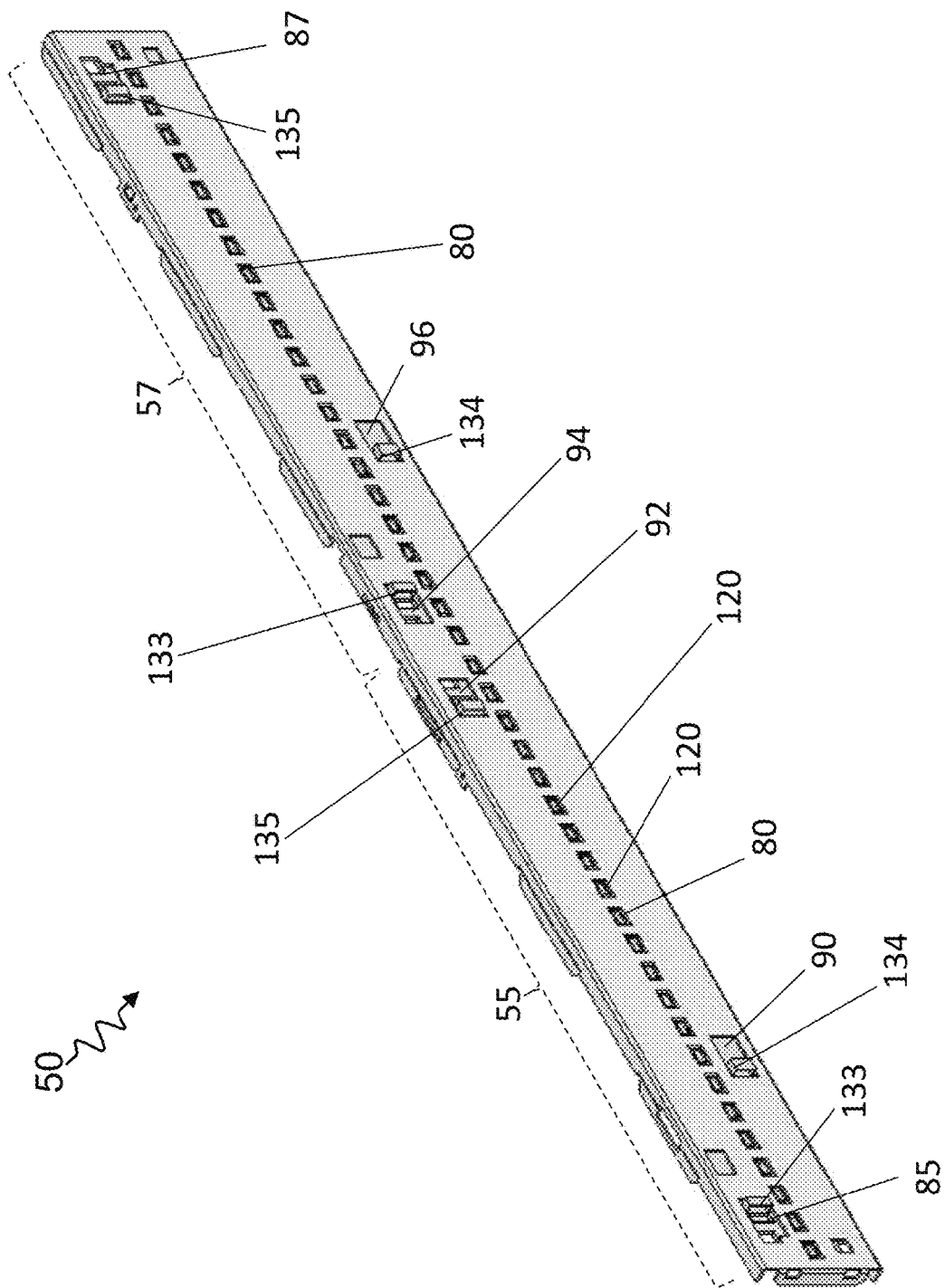
FIG. 14 is a perspective view of shell mounted over first and second LED chips, according to one embodiment of the present invention.

With reference to FIG. 14 and according to one embodiment of the present invention, the first thermally conductive shell 50 is shown with LED chips 55, 57 locked into place. Electrical connectors 133, 134, 135 of the first chip 55 interact with receiving apertures 85, 90, 92. Similarly, electrical connectors 133, 134, 135 of the second chip 57 interact with receiving apertures 87, 94, 96. The interaction between the electrical connectors and the receiving apertures align the rectangular slots 80 with the LED lights 120 from the first and second LED chip. The face of the LED chips 55, 57 come into direct contact with the thermally conductive shell 50. The heat emitted from the face of the LED chips 55, 57 is transferred onto the thermally conductive shell 50 where it is dissipated with the aid of natural air flow. The interaction between the second shell 52 and LED chips 59 and 61 (not shown) is identical to the interaction described above for first thermally conductive shell 50.

Figure 14A:
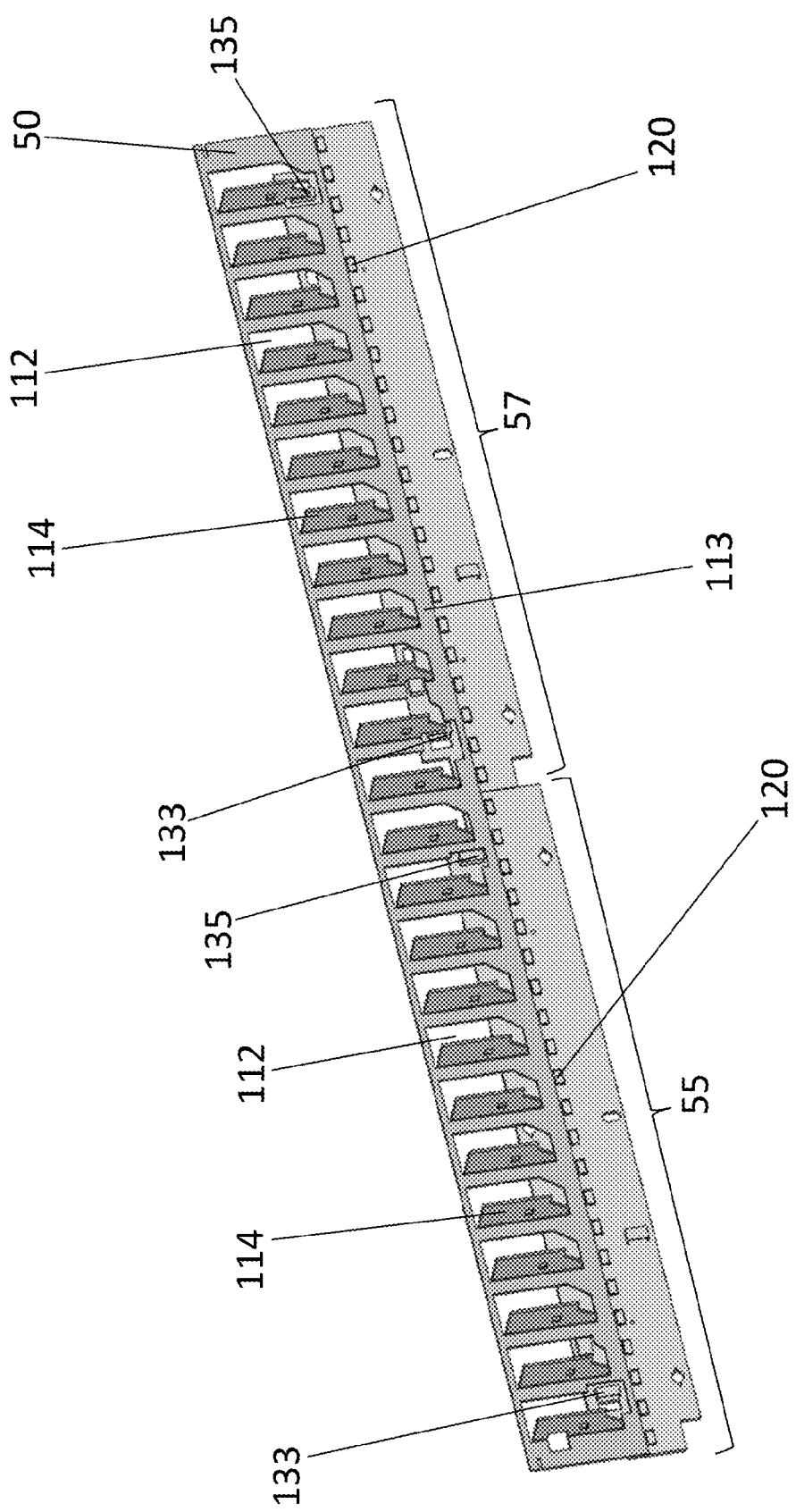
FIG. 14a is perspective view of shell mounted over first and second LED chips, according to another embodiment of the present invention.

With reference to FIG. 14a and according to another embodiment of the present invention, the first thermally conductive shell 50 is shown with the LED chips 55, and 57 set into place. The first thermally conductive shell 50 rests on the LED chips 55 and 57. Locking the LED chips into place requires other components of the LED module (not shown), and will be described in greater detail in subsequent sections. Cut outs on the first thermally conductive shell 50 align with the electrical connectors 133 and 135 in order to ensure proper positioning of the LED chips 55 and 57 within the first thermally conductive shell 50. Once positioned, the first thermally conductive shell 50 covers only the upper regions of the LED chips 55 and 57. The thermal conducting line 113 of first thermally conductive shell 50 is positioned right above the LED lights 120 of the LED chips 55 and 57. As such the thermal conducting line 113 is positioned where heat is most dense, where it can conduct the heat emanating from LED lights 120. Heat is conducted efficiently from the LED chips 55 and 57 onto the thermal conducting line 113, where it is diffused throughout the surface of the thermally conductive shell 50, and subsequently dissipated by air flow from the fins 114. In addition, majority of LED chips 55 and 57 upper region is exposed as rectangular slots 112 perforate the first thermally conductive shell 50.

With reference to FIG. 15 and according to one embodiment of the present invention, the first and second LED chips 55, 57 are shown with chip bracket 65 secured into place. The first and second LED chips 55, 57 mount onto the chip bracket 65 and lock into place. The first LED chip 55 is secured onto the chip bracket 65 by positioning it between the upper chip mounts 136. Once positioned, the first LED chip 55 is fastened onto the chip bracket 65 by coupling the lower chip mounts 137 through the first and second securing members 130, 132. Mounting of the second LED chip 57 onto the chip bracket 65 works in a similar fashion. The second LED chip 57 is fastened onto the chip bracket 65 by positioning between the upper chip mounts 136. The positioned second LED chip 57 is fastened onto the chip bracket 65 by coupling the lower chip mounts 137 through the first and second securing members 130, 132. The interaction between chip bracket 65 and LED chips 59, 61 is identical to the interaction described above. The back of the LED chips 55 and 57 only come into contact with the chip bracket 65 at the periphery. In another embodiment of the present invention where the chip bracket 65 is constructed as a solid or woven thermal conductive material, the entire back surface area of the metal core LED chips 55 and 57 comes into contact with the chip bracket 65. The metal core LED chips 55 and 57 have a decreased thermal resistance to heat transfer at the back to the board. The thermally conductive chip bracket 65 would conduct heat quickly from the surface of the metal core LED chips 55 and 57.

Figure 15A:
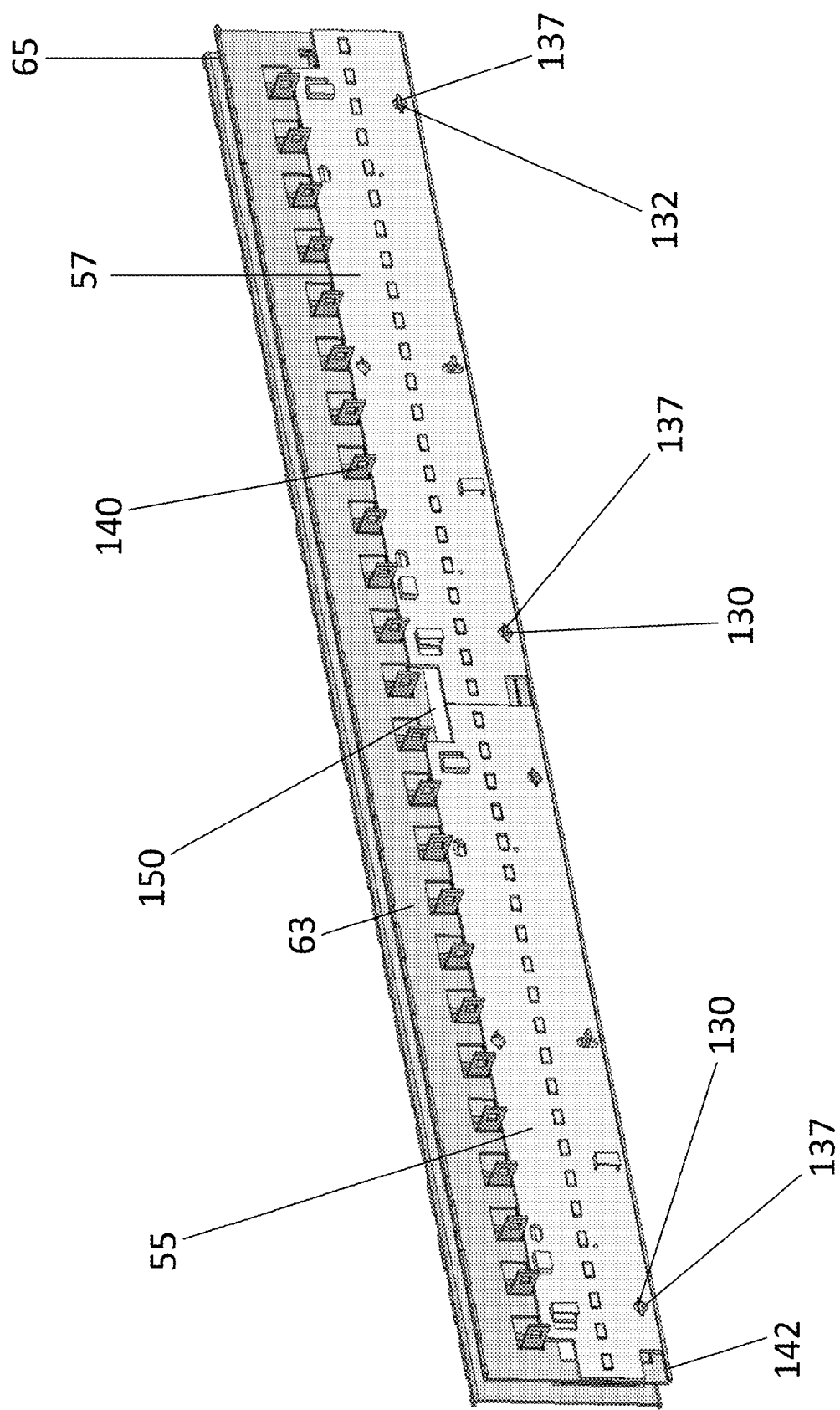
FIGS. 15a and 15b are perspective views of the first and second LED chips secured onto the chip bracket, according to another embodiment of the present invention.
Figure 15B:
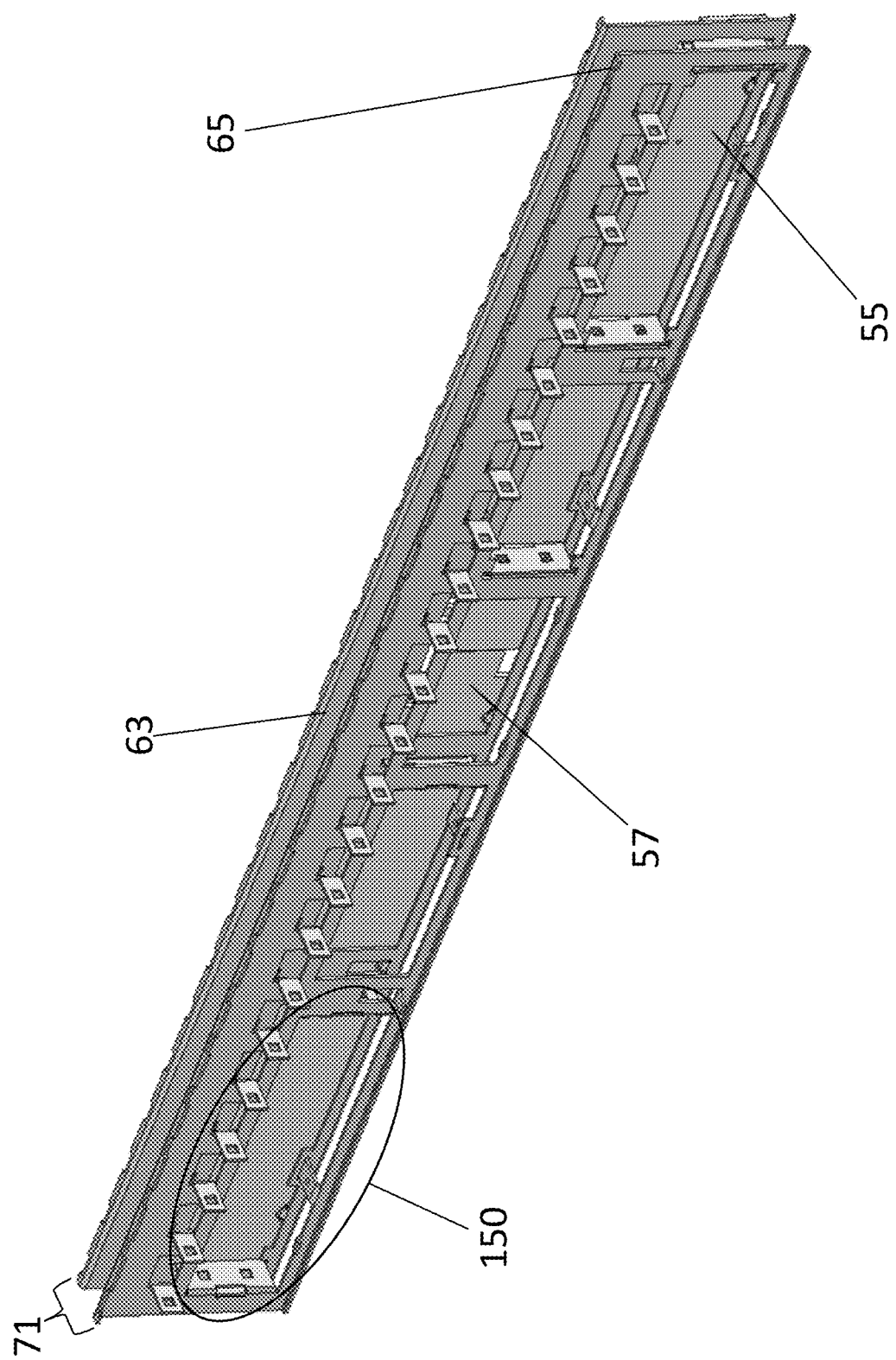

With reference to FIGS. 15a and 15b and according to another embodiment of the present invention, the first and second LED chips 55, 57 are shown secured onto chip bracket 65. The first and second LED chips 55 and 57 are positioned on to the center wall 63 of chip bracket 65. Each LED chip is placed between the lower lip 142 and the fin latches 140. The first and second LED chips 55 and 57 are fastened onto the chip bracket 65 by coupling the lower chip mounts 137 through the first and second securing members 130, 132 of each LED chip.

With specific reference to FIG. 15b, the interior view of first and second LED chips 55, 57 secured onto the chip bracket 65 is shown in greater detail. The large openings 150 on the center wall 63 permits heat dissipation from the back for the first and second LED chips 55, 57. Heat dissipation from the back of the LED chip is essential in LED chip utilization. The heat dissipated from the back of the LED chips is initially localized within the gap 71 of the chip bracket 65. Vertical airflow expels the dissipated heat from the gap 71 allowing the LED chips to function at lower temperatures.

Figure 16:
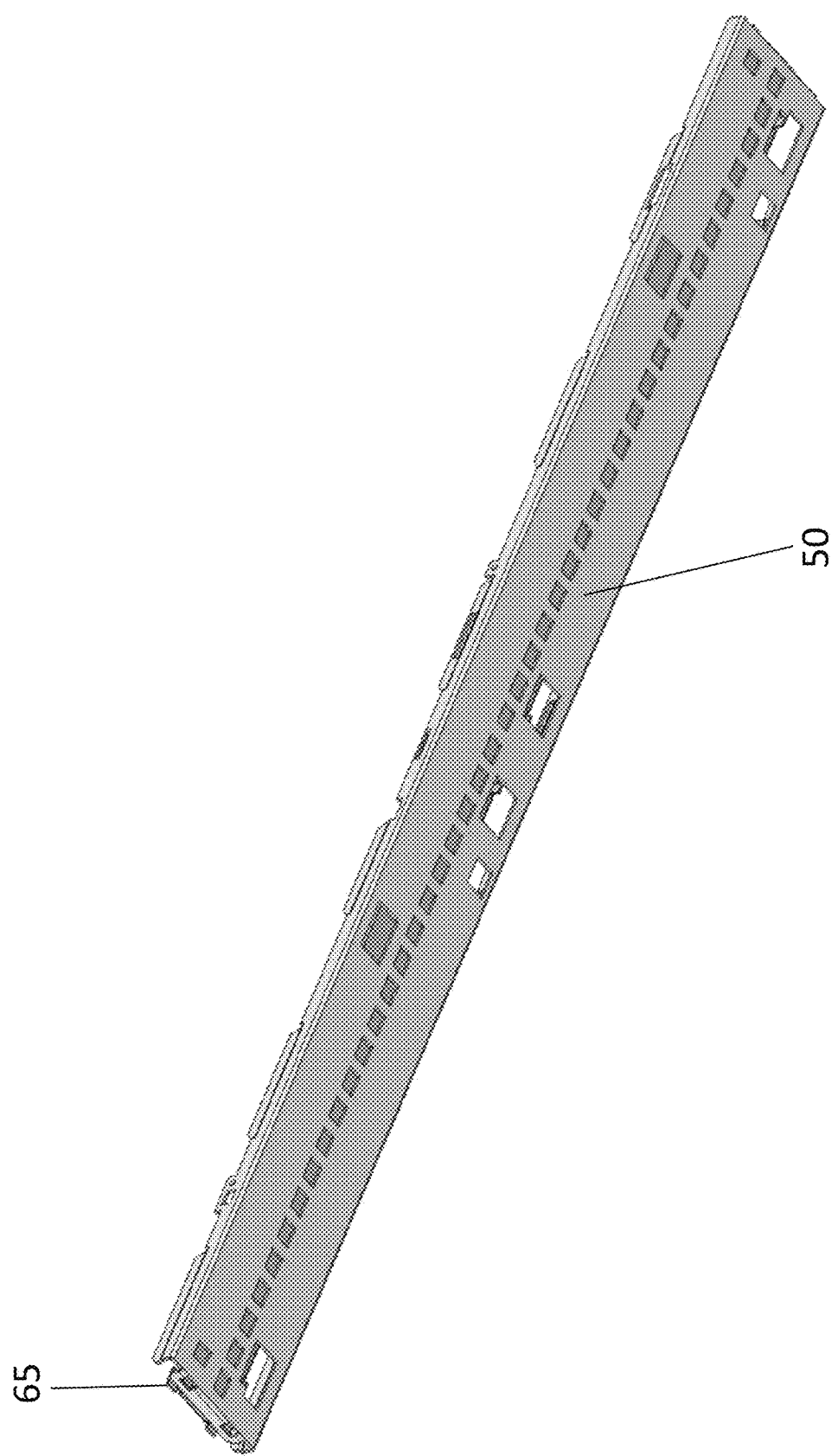
FIGS. 16, 16a and 16b are perspective views of the shell interacting with the chip bracket, according to one embodiment of the present invention.
Figure 16A:
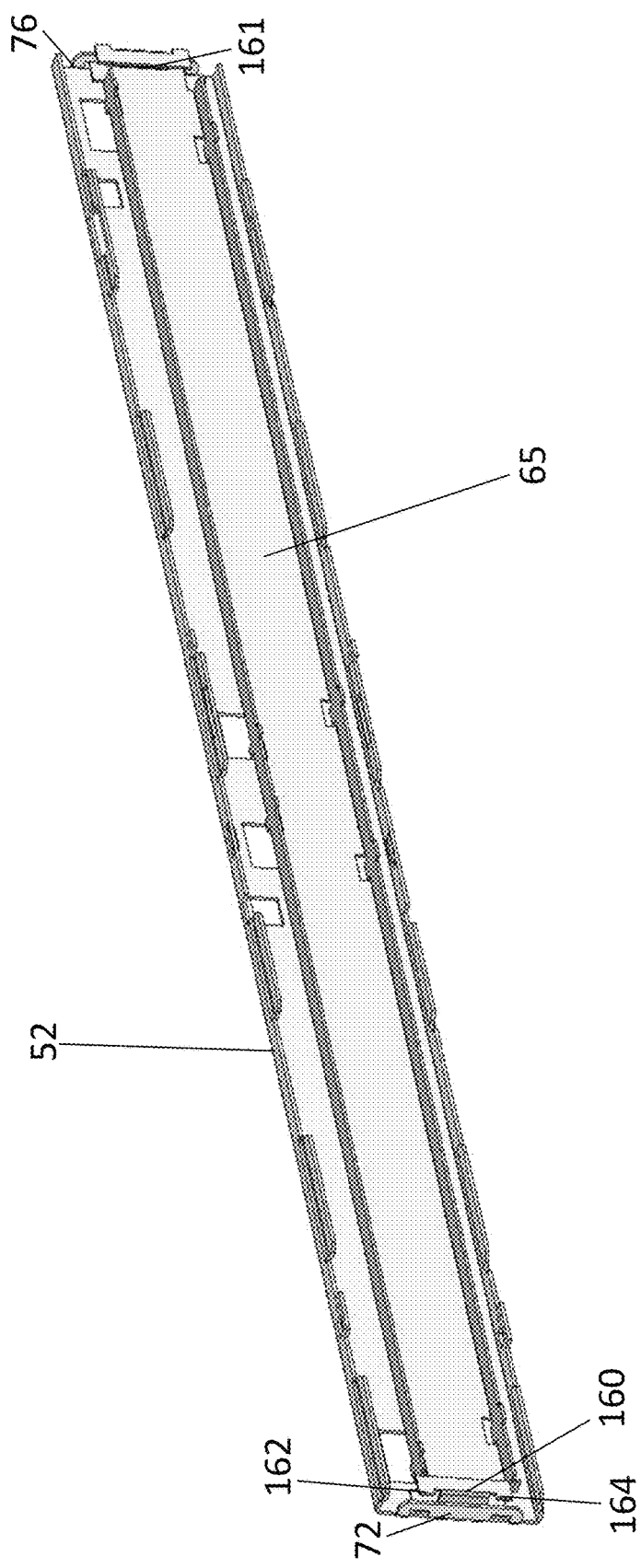
Figure 16B:
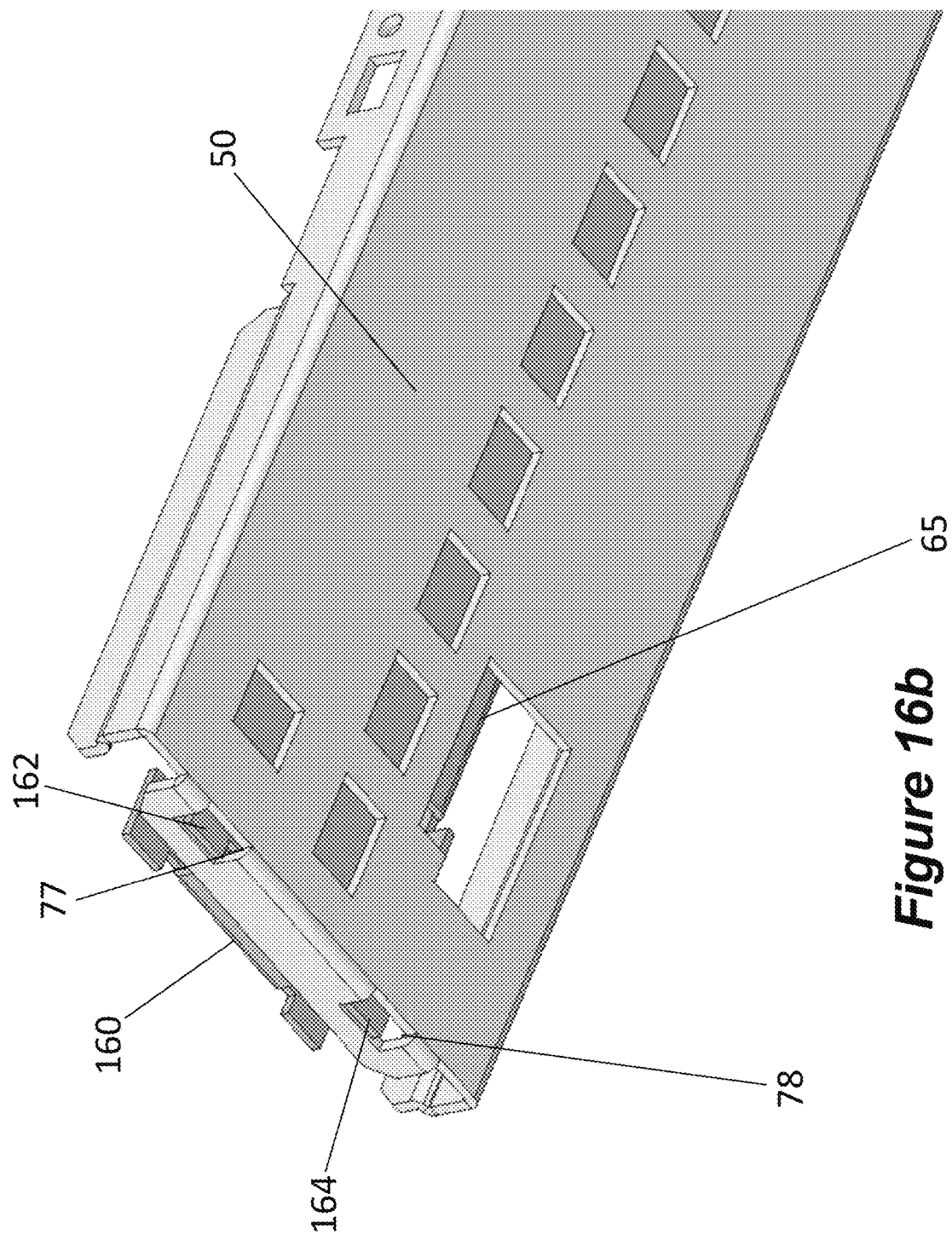

With reference to FIG. 16 and according to one embodiment of the present invention, the first thermally conductive shell 50 is shown interacting with chip bracket 65. The chip bracket 65 fits within the cavity of the first thermally conductive shell 50. As shown in FIG. 16a, the point of contact between the first thermally conductive shell 50 and the chip bracket 65 occurs at the outer edges. The chip bracket 65 is situated where the position braces 160, 161 rest upon the back of the first and second beveled protrusions 72, 76. With specific reference to FIG. 16b, latch members 162, 164 insert into the upper and lower beveled apertures 77, 78 thereby securing the chip bracket 65 within the cavity of the first thermally conductive shell 50. The interaction between chip bracket 65 and second shell 52 (not shown) is identical to the interaction described above.

Figure 17:
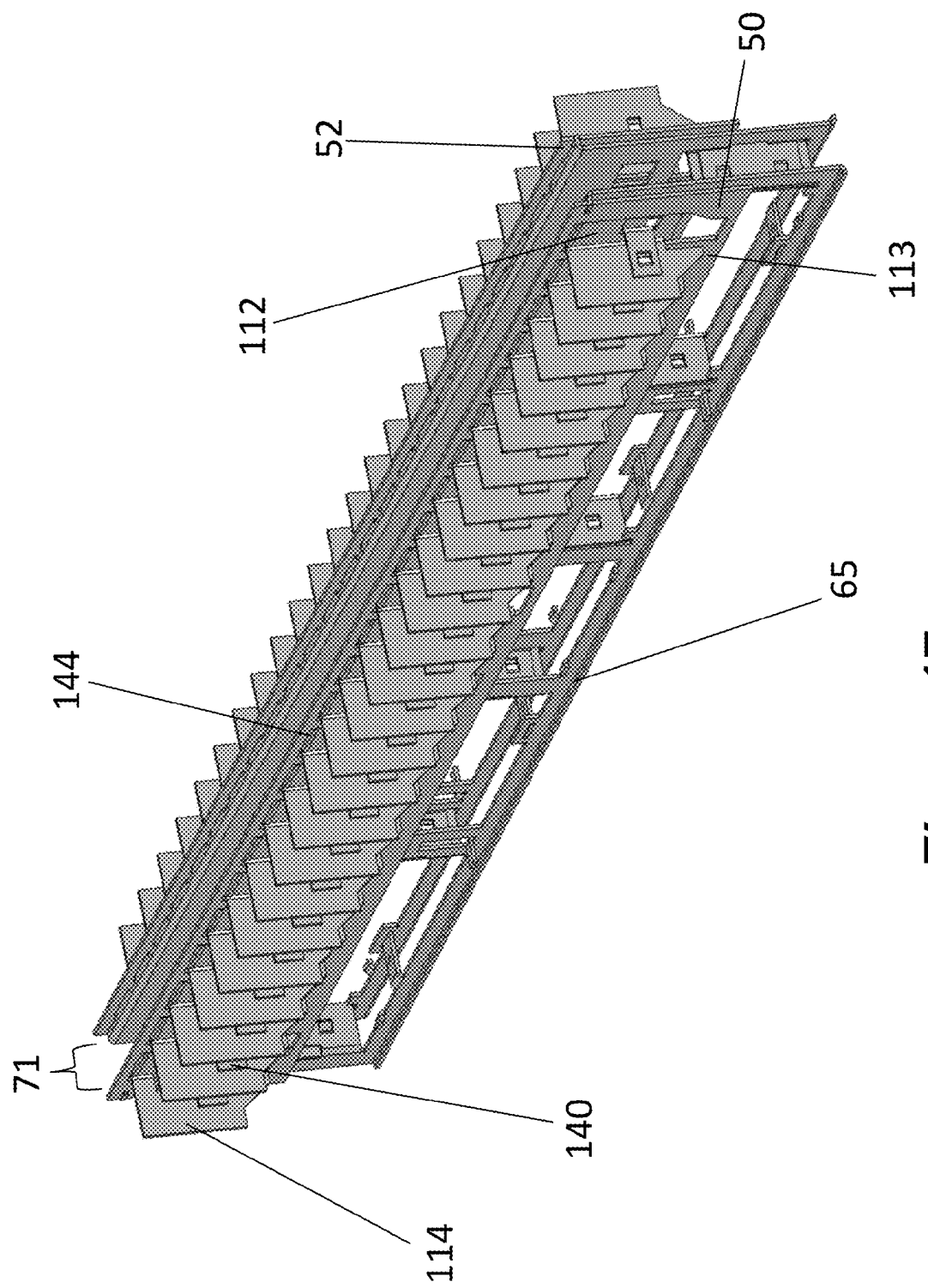
FIGS. 17 and 17a are perspective views of the shell interacting with the chip bracket, according to another embodiment of the present invention.
Figure 17A:
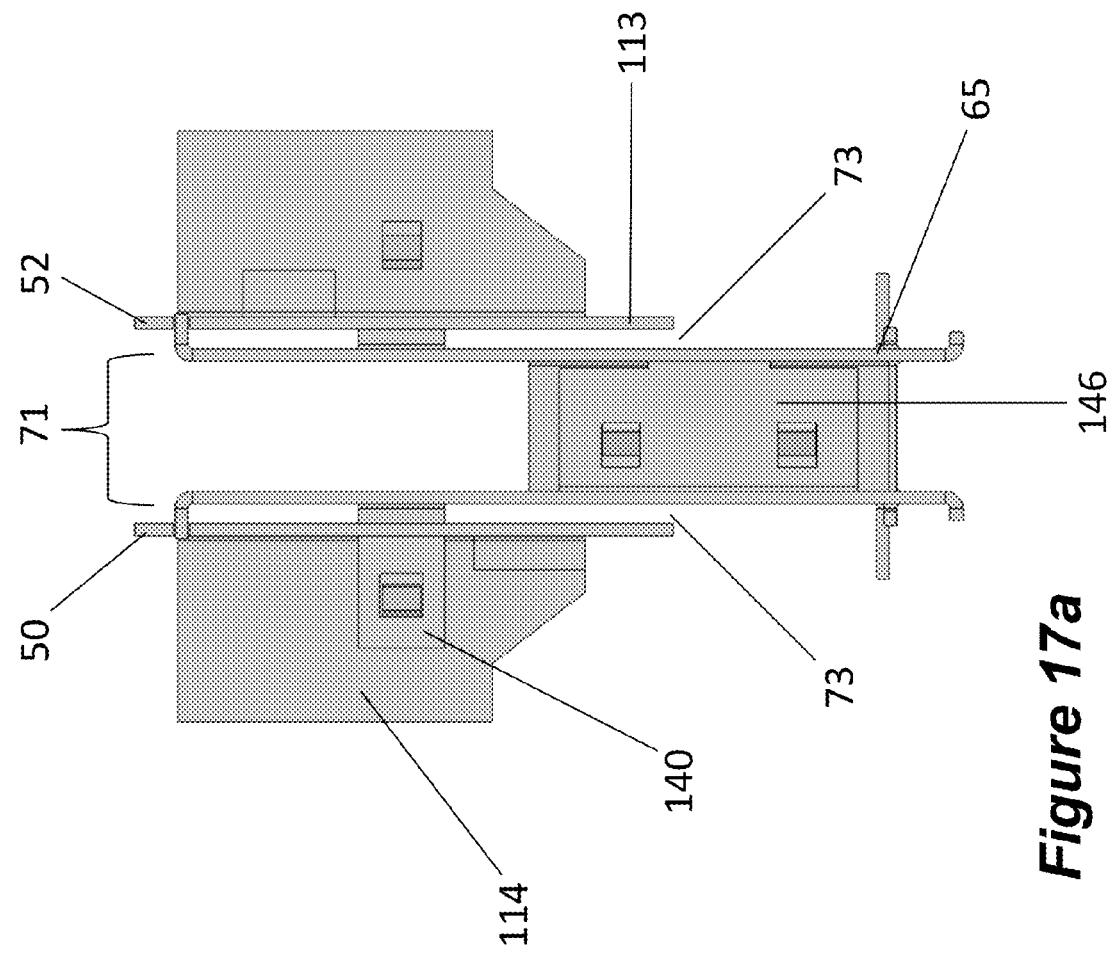

With reference to FIGS. 17 and 17a and according to another embodiment of the present invention, the first and second thermally conductive shells 50 and 52 are shown connected to the chip bracket 65. The chip bracket 65 connects with the first and second thermally conductive shells 50 and 52, thereby locking each shell into the correct position. The first and second thermally conductive shells 50 and 52 are positioned onto the chip bracket 65 by resting the beveled teeth 144 within the rectangular slots 112. The fin latches 140 latch onto the respective fins 114, thereby locking the first and second thermally conductive shell 50 and 52 onto the chip bracket 65. A chip board cavity 73 is maintained between the chip bracket 65 and the first and second thermally conductive shells 50 and 52, respectively. Gap 71 is maintained, allowing air to flow vertically through the center of chip bracket 65. The thermal conducting line 113 makes contact with the LED Chip (not shown) and conducts heat from the face of the LED chip to the fins 114. Vertical convective air flow cools the fins, thereby dissipating heat from the face of LED chip (not shown).

With specific reference to FIG. 17a, a profile view of the first and second thermally conductive shells 50 and 52 interacting with the chip bracket 65 is shown. The width of gap 71 is dependent on strut 146. The first and second thermally conductive shells 50 and 52 maintain minimal contact with the chip bracket 65. The points of contact between the first and second thermally conductive shells 50, 52 and the chip bracket 65 occur at the beveled teeth 144 and the fin latches 140. As a result, a chip board cavity 73 is produced between the chip bracket 65 and the respective first and second shells.

Figure 18:
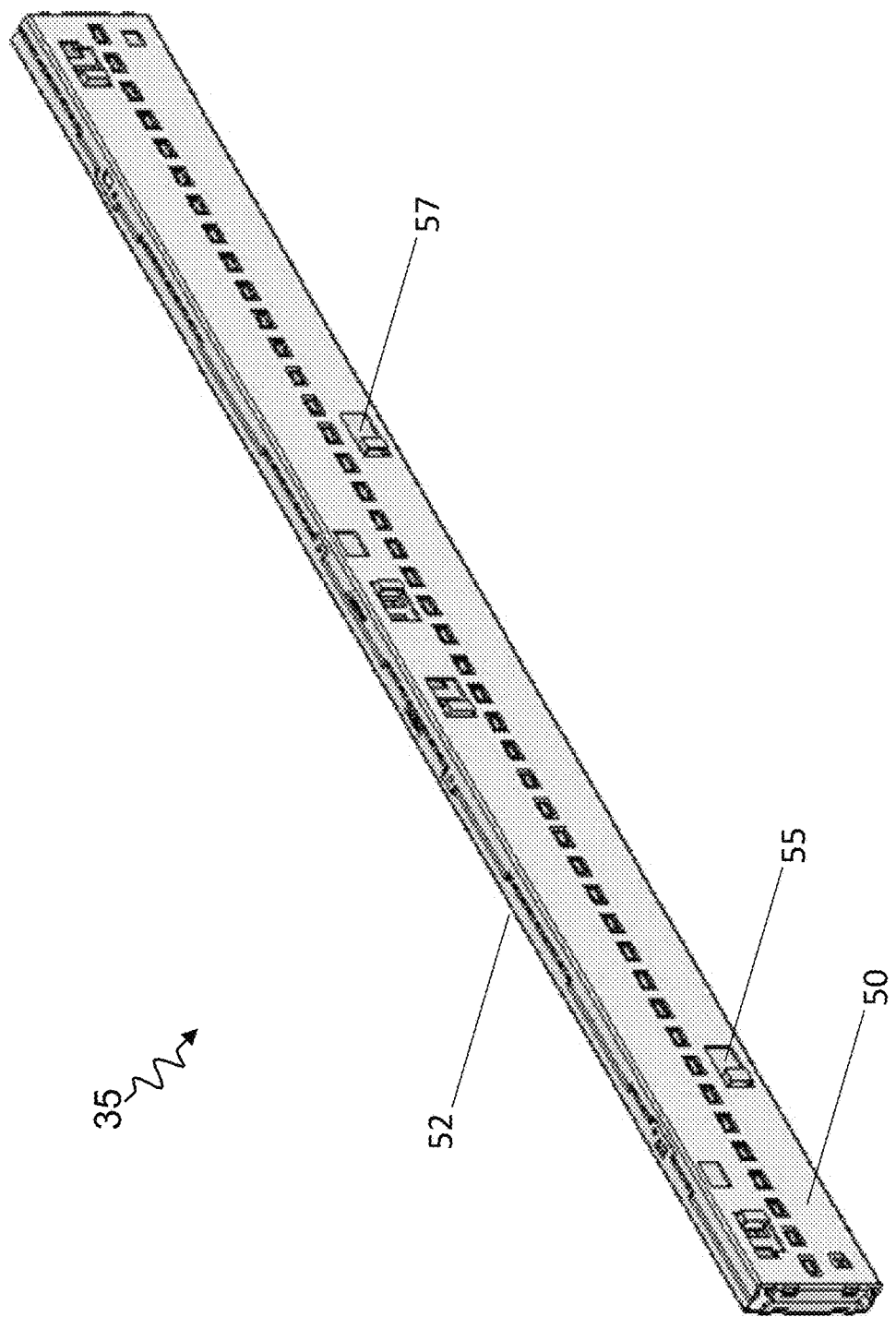
FIG. 18 is a perspective view of the complete LED module, according to one embodiment of the present invention.

With reference to FIG. 18 and according to one embodiment of the present invention, the complete LED module 35 is shown in its closed confirmation. In another embodiment of the present invention, the perforated composition of the first and second thermally conductive shell 50 and 52 permits air to flow through the LED module 35. Air enters the LED module 35 and dissipates the heat from the chip bracket 65 (not shown) and from the back surface of the LED boards 55, 57, 59 (not shown) and 61 (not shown). Any heat expelled from the face of the LED chips 55 and 57 is conducted to the thermally conductive shell 50 and is subsequently dissipated by natural air flow. Dissipation of heat can be enhanced with the addition of fins (not shown) to the upper region of thermally conductive shell 50. The height of the fins (not shown) varies from a minimum of 1 mm to a maximum of 75 mm. Fins (not shown) increase the surface area of the thermally conductive shell 50 thereby increasing the heat dissipation rate of natural air flow. Similar heat dissipation management occurs with LED chips 59 and 61 (not shown), and shell 52, located on the other side of the LED module 35.

Figure 18A:
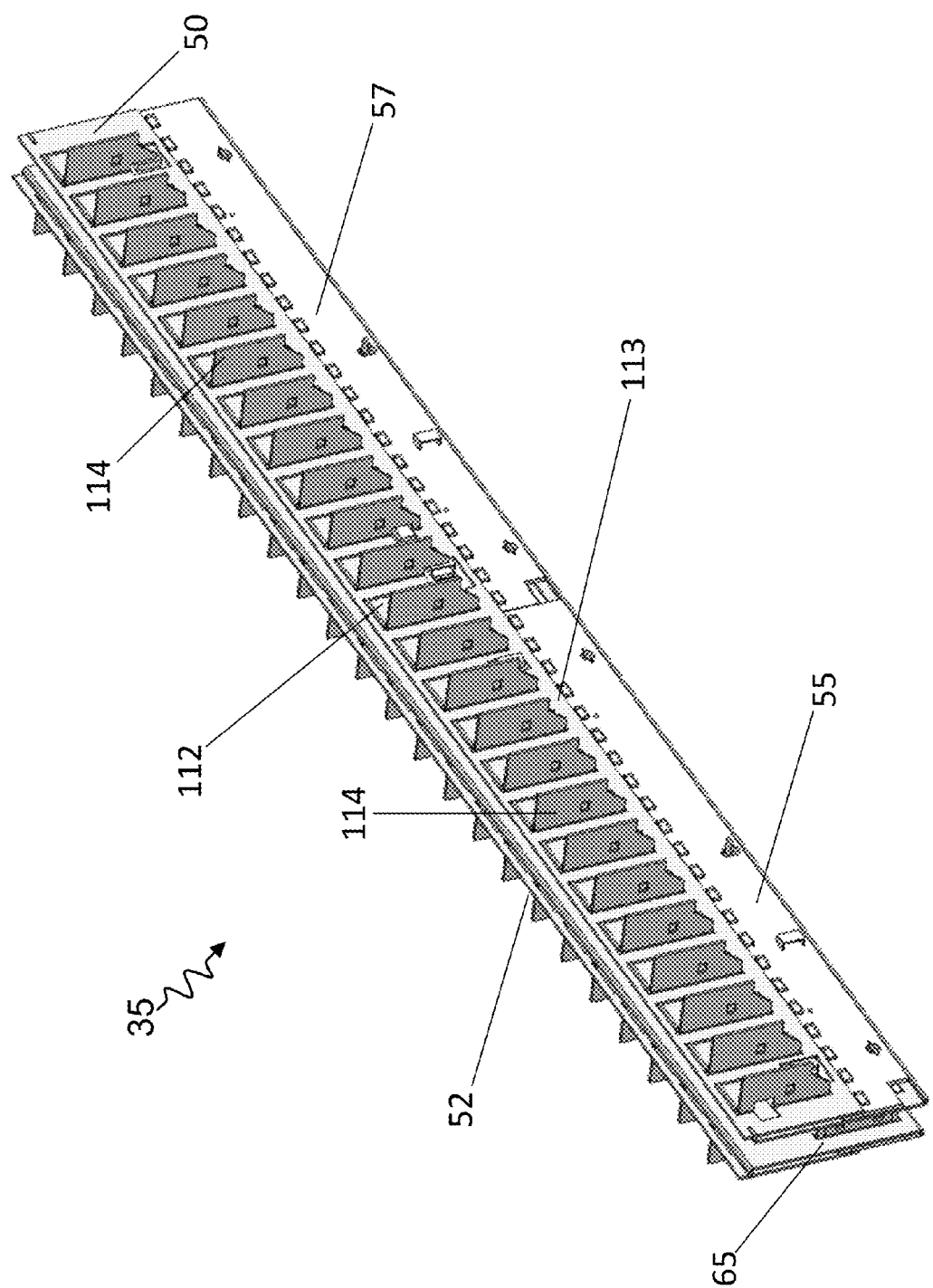
FIGS. 18a and 18b are perspective views of the complete LED module, according to another embodiment of the present invention.
Figure 18B:
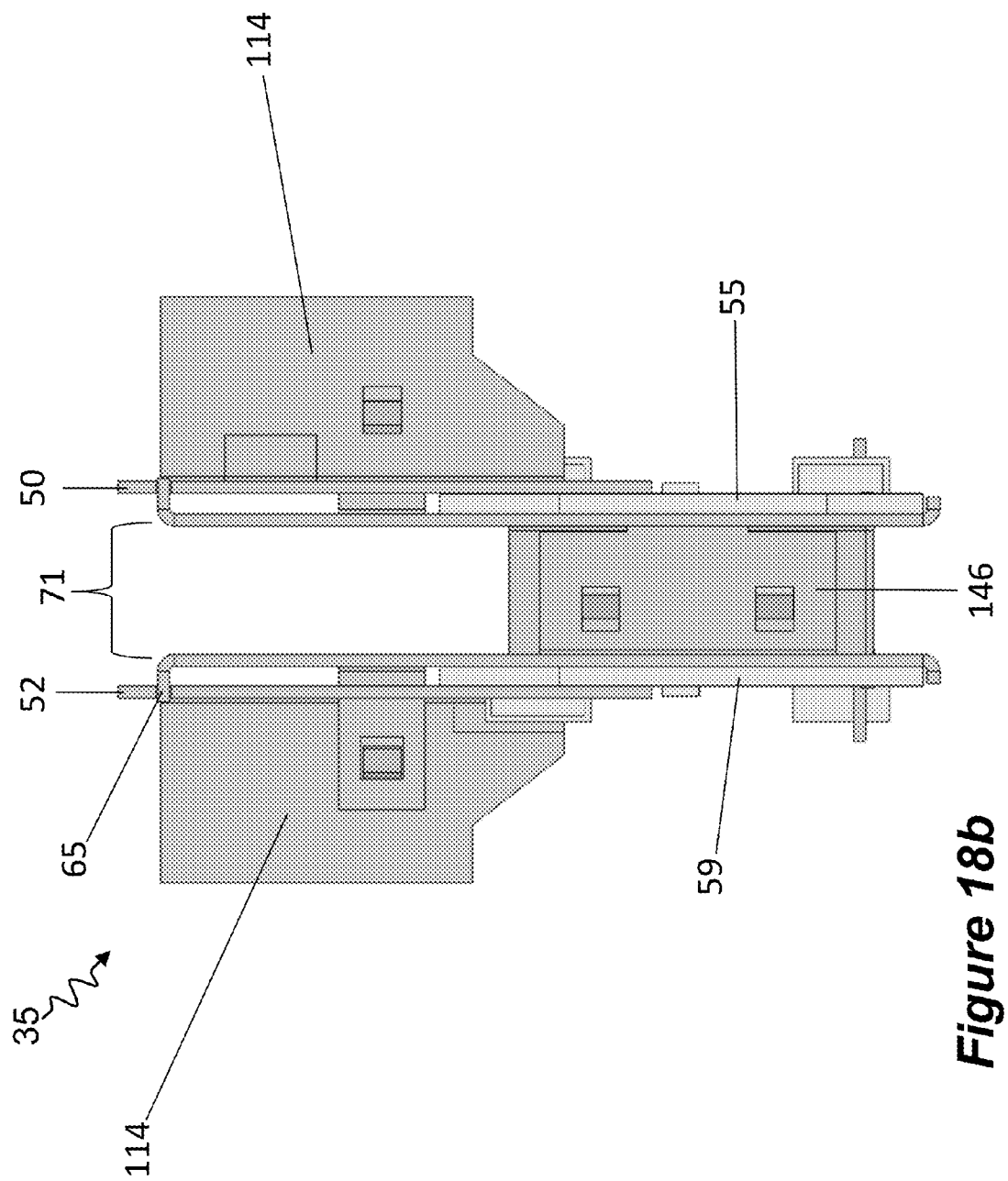

With reference to FIGS. 18a and 18b and according to another embodiment of the present invention, the complete LED module 35 is shown. Under this embodiment, high intensity LED chips are employed, and as such heat dissipation is a crucial aspect of the LED module 35. The lower portion of the first and second LED chips 55 and 57 are exposed, as only the upper portion is fastened by thermally conductive shell 50. This permits air flow to dissipate heat from the face of the first and second LED chips 55 and 57. Heat is dissipated from the face of the LED chips 55 and 57 by the fins 114. Heat is conducted from the surface of the shell through the thermal conducting line 113, which makes contact with the LED chips 55 and 57. The conducting line 113 conducts the heat from the face of the LED chips 55 and 57 to the fins 114. The fins 114, having an increased surface area expel the heat which dissipates from the LED module 35 by natural air flow. Similar heat dissipation management occurs with LED chips 59 and 61 (not shown), and shell 52, located on the other side of the LED module 35.

With specific reference to FIG. 18b, a profile view of the LED module 35 is shown. Heat dissipated from the back of opposing LED chips is localized within gap 71. In one embodiment of the present invention, the thermally dissipating means defined as the width of gap 71 is dependent on the density and heat emission of the LED chip employed within the LED module 35. LED chips with greater density and heat emission will require a larger gap 71. A larger width within gap 71 prohibits interaction of heat dissipated from opposing LED chips, chips 55 and 59. The width of the gap 71 is determined by the strut 146 and the link 148 (not shown). The length of the strut 146 and the link 148 (not shown) can be varied to alter the gap 71 width from a minimum of 2 mm to a maximum of 75 mm. The resultant width, Δ gap, provides efficient heat dissipation based on the heat parameters of the LED module 35.

2. Lamp Assembly

Figure 19:
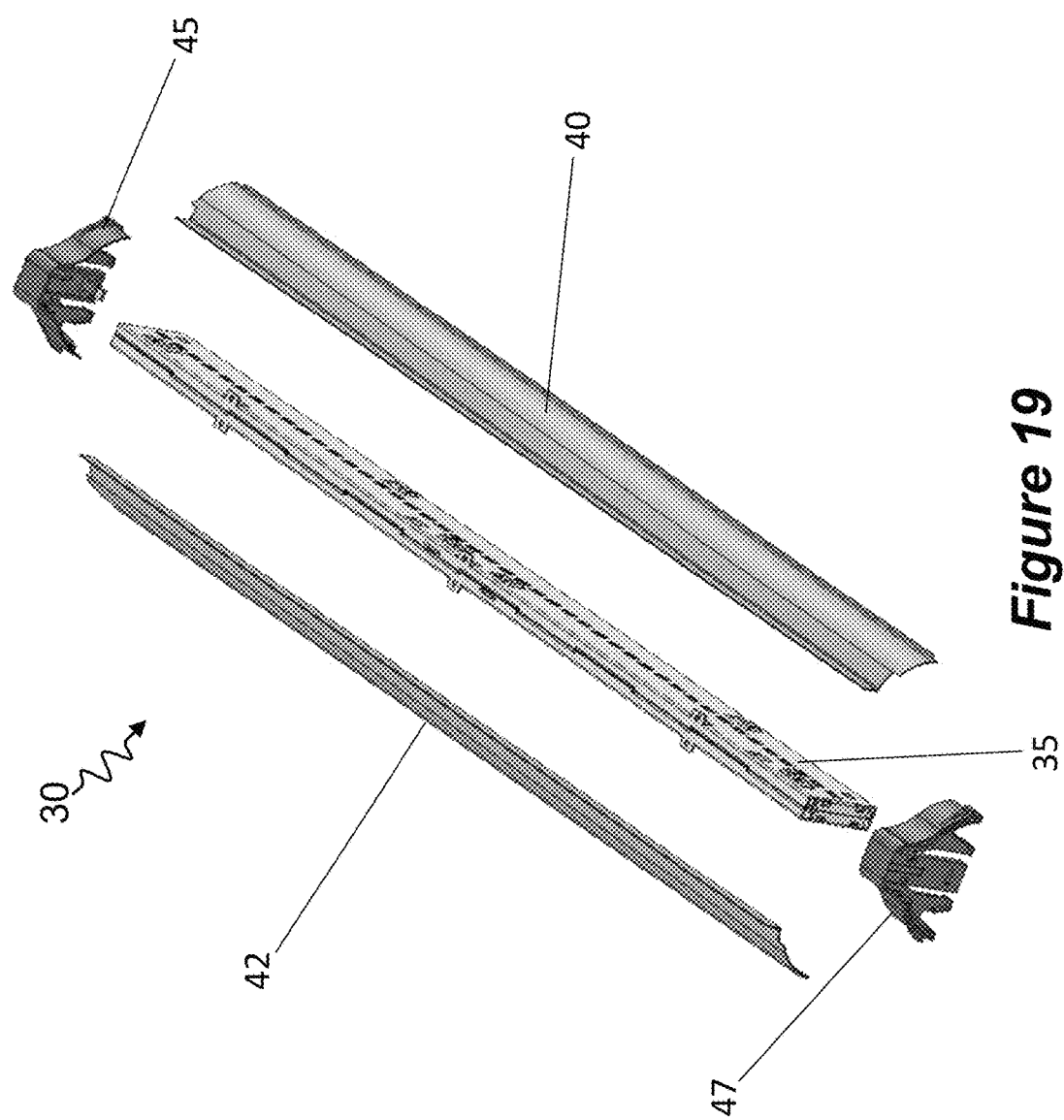
FIG. 19 is an exploded view of the lamp assembly unit, according to one embodiment of the present invention.

With reference to FIG. 19 and according to one embodiment of the present invention, the lamp assembly unit 30 is described in greater detail. FIG. 19 is comprised of an exploded view of the lamp assembly unit 30. The lamp assembly unit 30 consists of first and second reflectors 40, 42, first and second, module caps 45, 47, and a LED module 35. The first and second reflectors 40, 42 are axially mirrored and interpose the LED module 35. First and second module caps 45, 47 link all the components together and are positioned at the axial ends of the LED module 35.

Figure 19A:
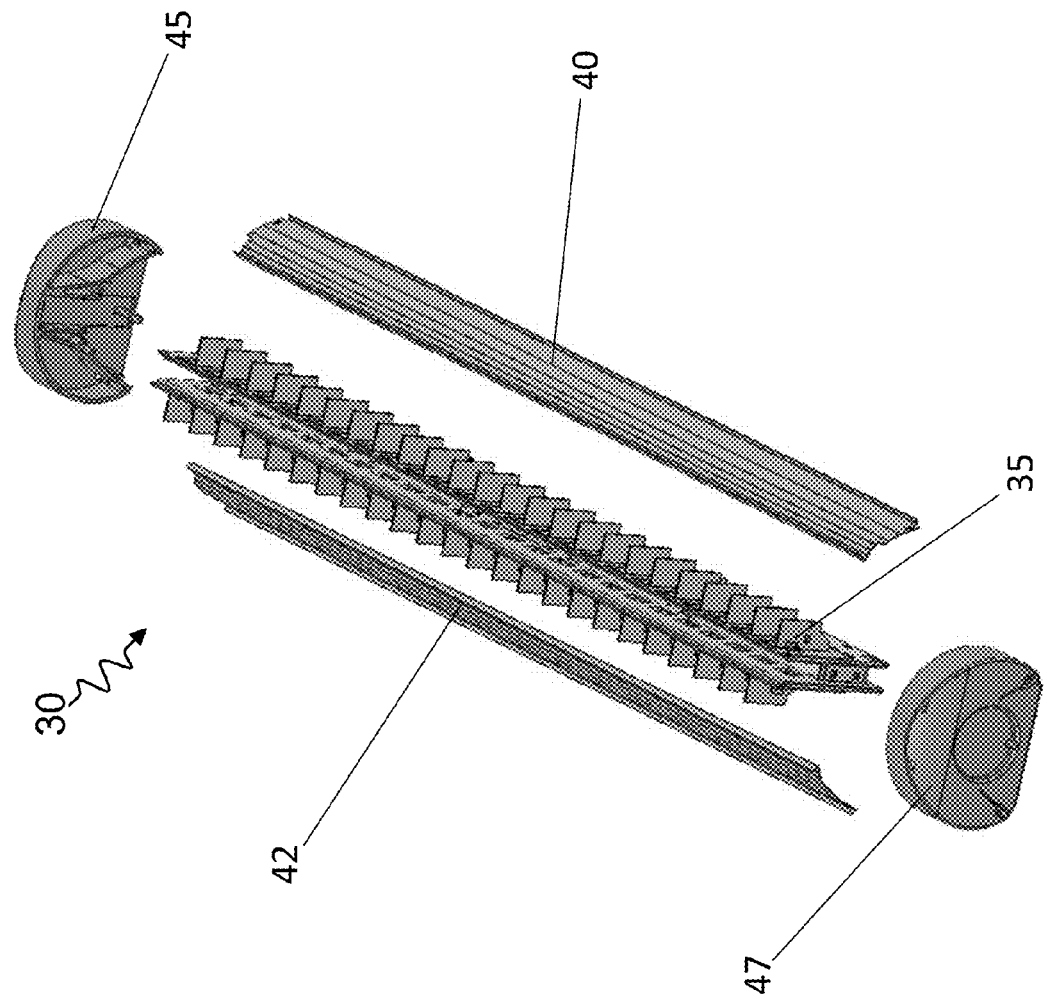
FIG. 19a is an exploded view of the lamp assembly unit, according to another embodiment of the present invention.

With reference to FIG. 19a and according to another embodiment of the present invention, the lamp assembly unit 30 is described greater detail. FIG. 19a is comprised of an exploded view of the lamp assembly unit 30. The lamp assembly unit 30 consists of first and second reflectors 40, 42, first and second, module caps 45, 47, and a LED module 35.

Figure 20:
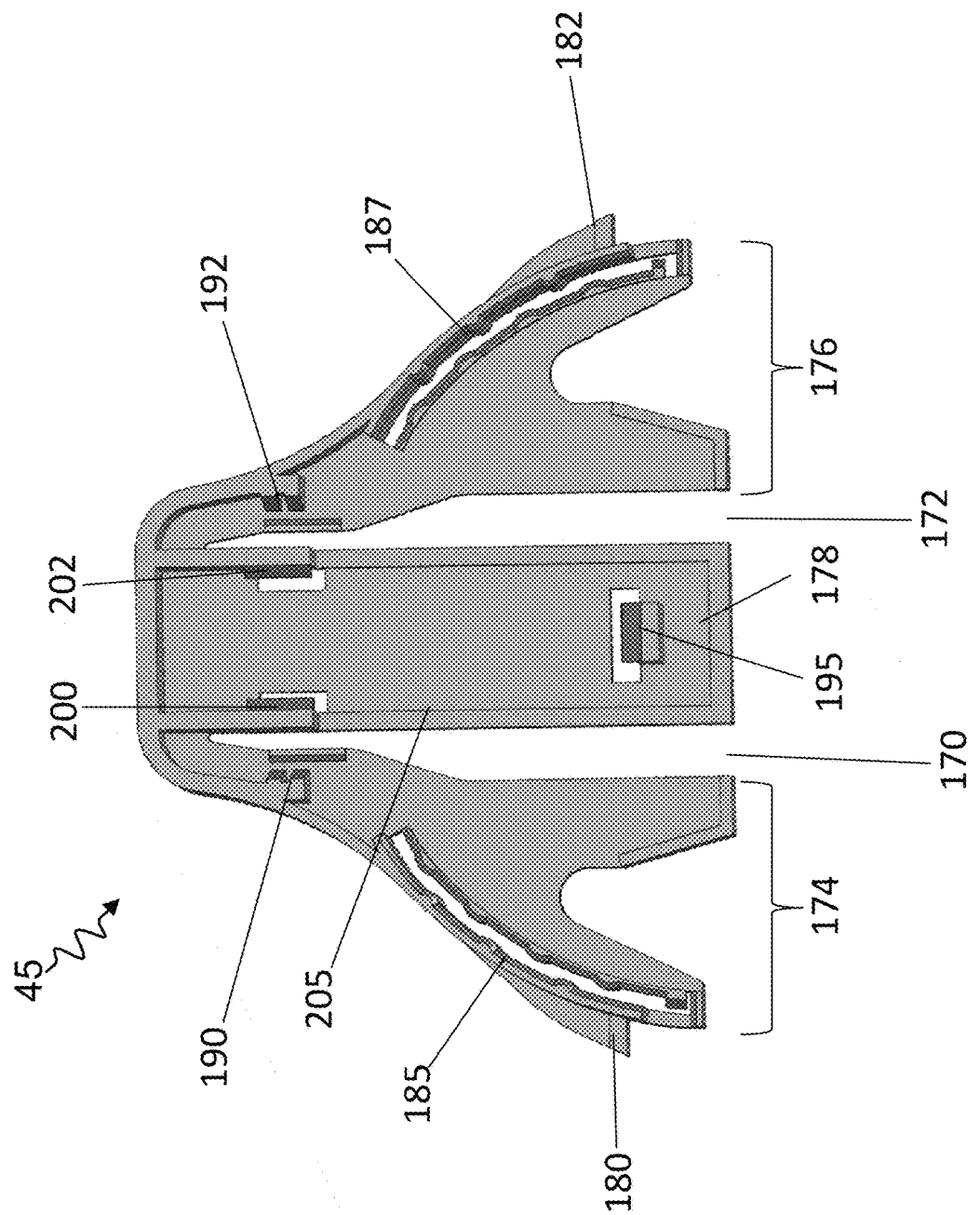
FIG. 20 is a perspective view of the module cap, according to one embodiment of the present invention.

With reference to FIG. 20 and according to one embodiment of the present invention, the first module cap 45 is shown in greater detail. The first module cap 45 is comprised of a first and second module cap arms 174, 176 attached to the central rectangular body 178. The first and second compression cavities 170, 172 are interposed between the module cap arms 174, 176 (respectively) and the Central Body 178. The first and second module cap Arms 174, 176 contain a hook clamp protrusions 180, 182, Ribbed Troughs 185, 187, and shoulders 190, 192, respectively. Central body 178 contains a central chip bracket clasp 195, first and second shell latches 200, 202 and is outlined by a Raised Rim 205. The composition of the second cap module (not shown) is identical to the one described above.

Figure 21:
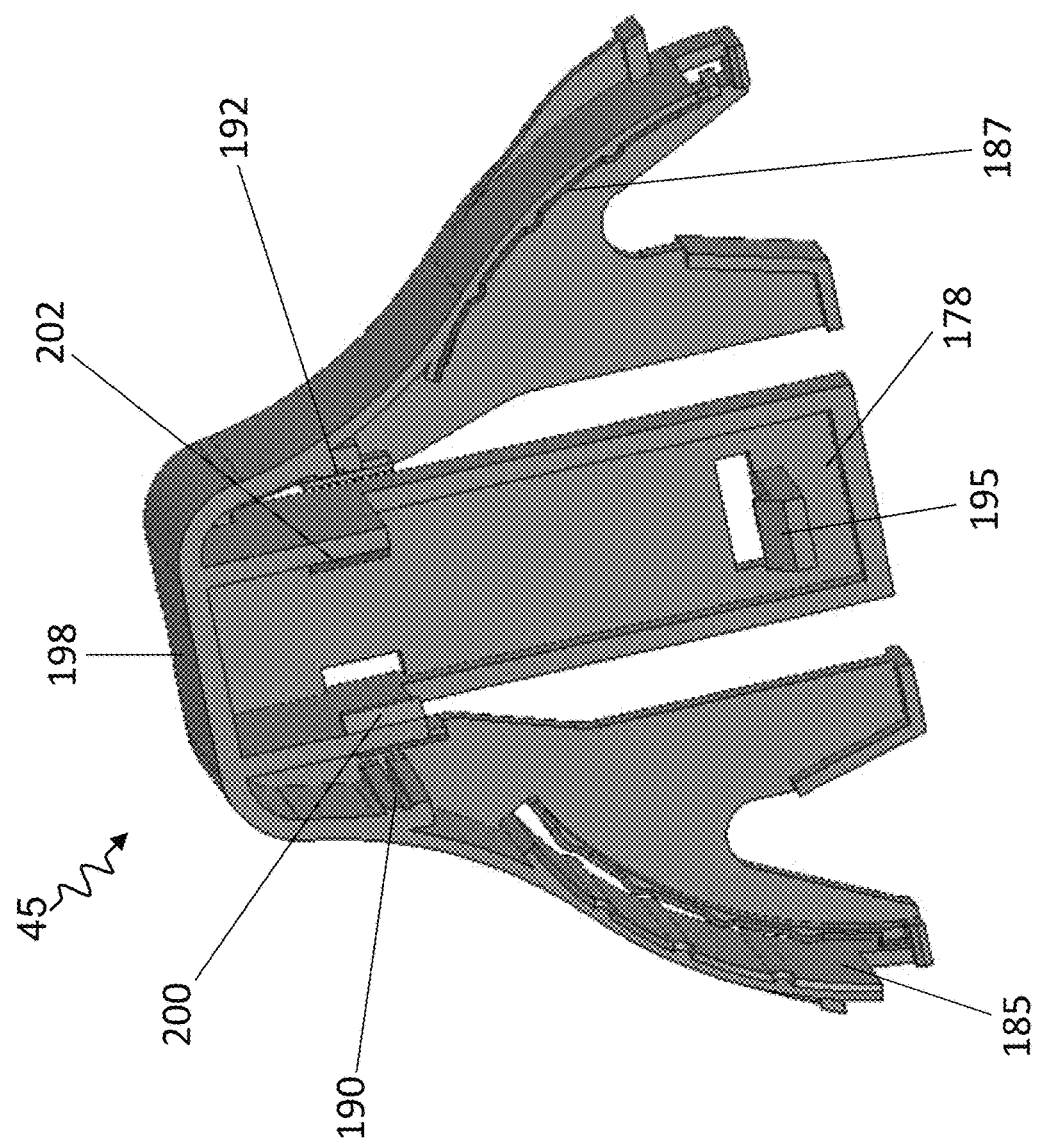
FIG. 21 is a perspective profile view of the module cap, according to one embodiment of the present invention.
Figure 21A:
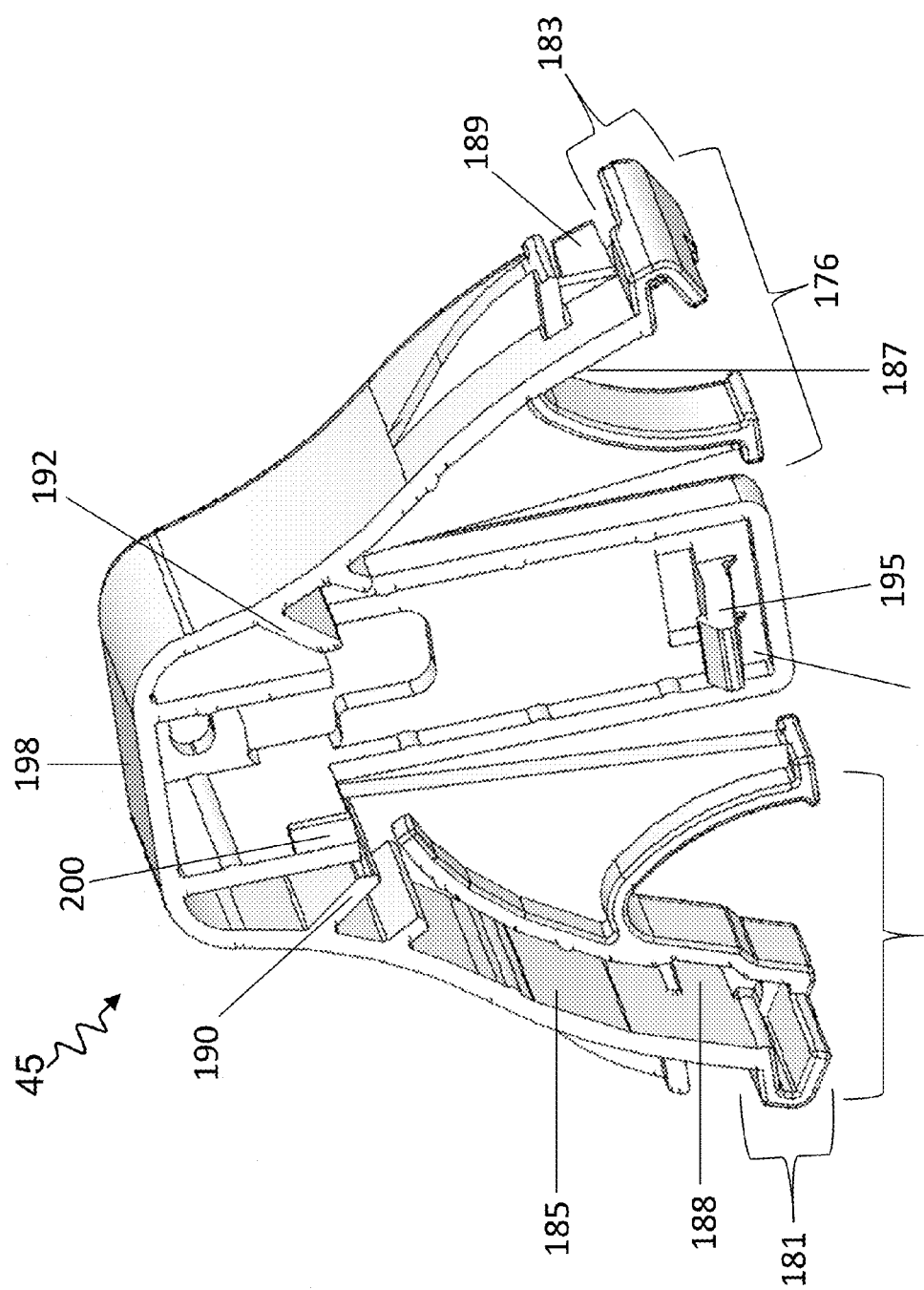
FIG. 21a is a perspective profile view of the module cap, according to another embodiment of the present invention.
Figure 21B:
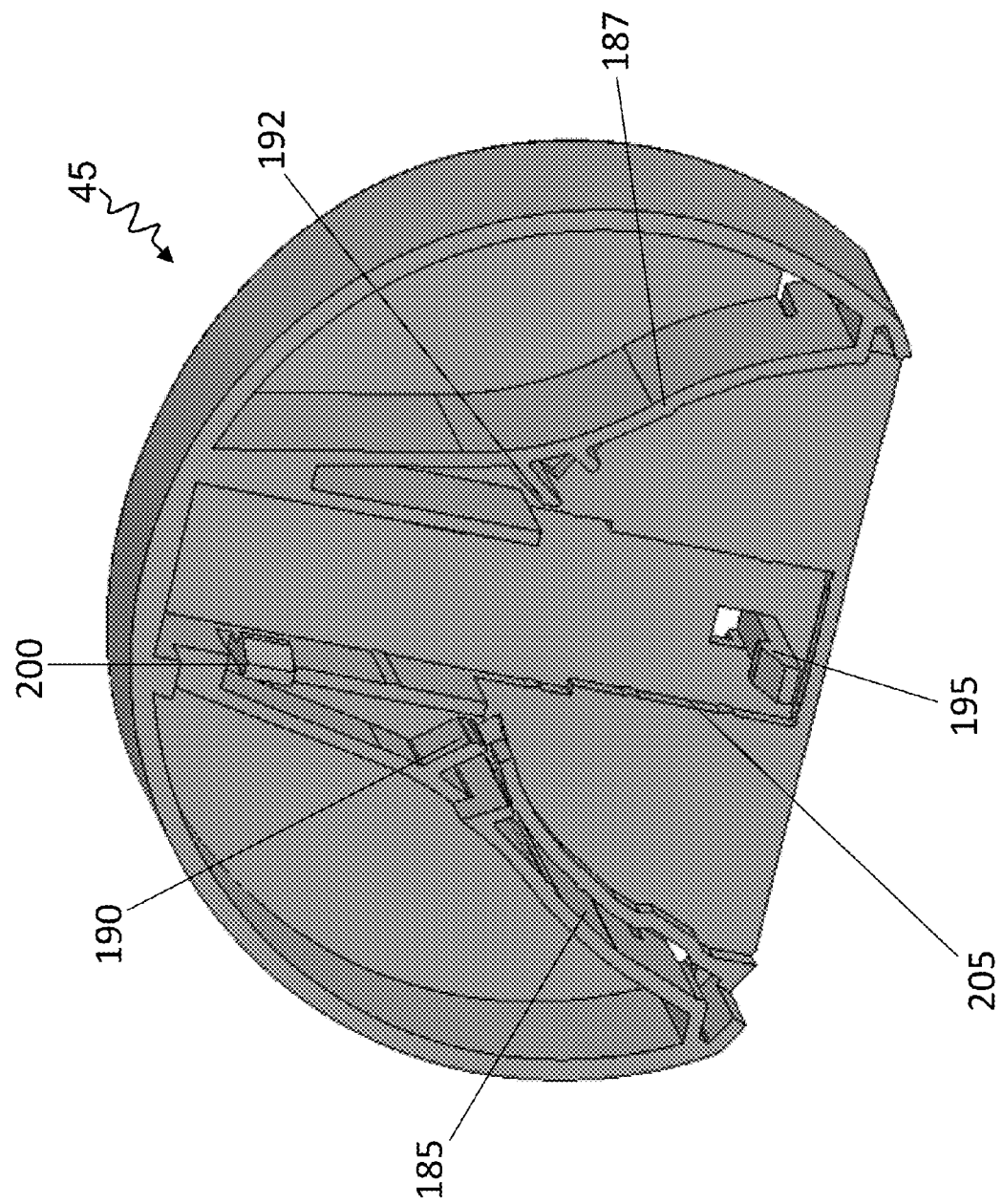
FIG. 21b is a perspective profile view of the module cap, according to another embodiment of the present invention.

With reference to FIG. 21 and according to one embodiment of the present invention, the first module cap 45 is shown at a slight angle to illustrate key features. The upper surface of the first module cap 45 is topped by the extension cover protruding outward from the face 198. The central body 178 contains protruding chip bracket clasp 195 and protruding shell latches 200, 202. The external surface of the first and second ribbed troughs 185, 187 and shoulders 190, 192 coincide with the protruding extension and as such protrude from the surface of the module cap 45. The chip bracket clasp 195 also protrudes from the surface of the first cap module 45. In another embodiment of the present invention, FIG. 21*a*, the module cap 45 is shown at a slight angle to illustrate key features. The first and second shoulder 190, 192 project from the extension cover. First and second platform shoulders 181, 183 protrude from the first and second module cap arms 174, 176, respectively. First and second reflector latch 188, 189 are located on the lower region of the first and second module cap arms 174, 176, respectively. In yet another embodiment of the present invention, FIG. 21*b*, the rounded module cap 45 is shown. In this embodiment the cap module 45 contains an extended upper region. Additionally, the first and second module cap arms 174 (not shown) and 176 (not shown) are fixed on the cap module 45, and as such do not flex when pressure is applied.

Figure 22:
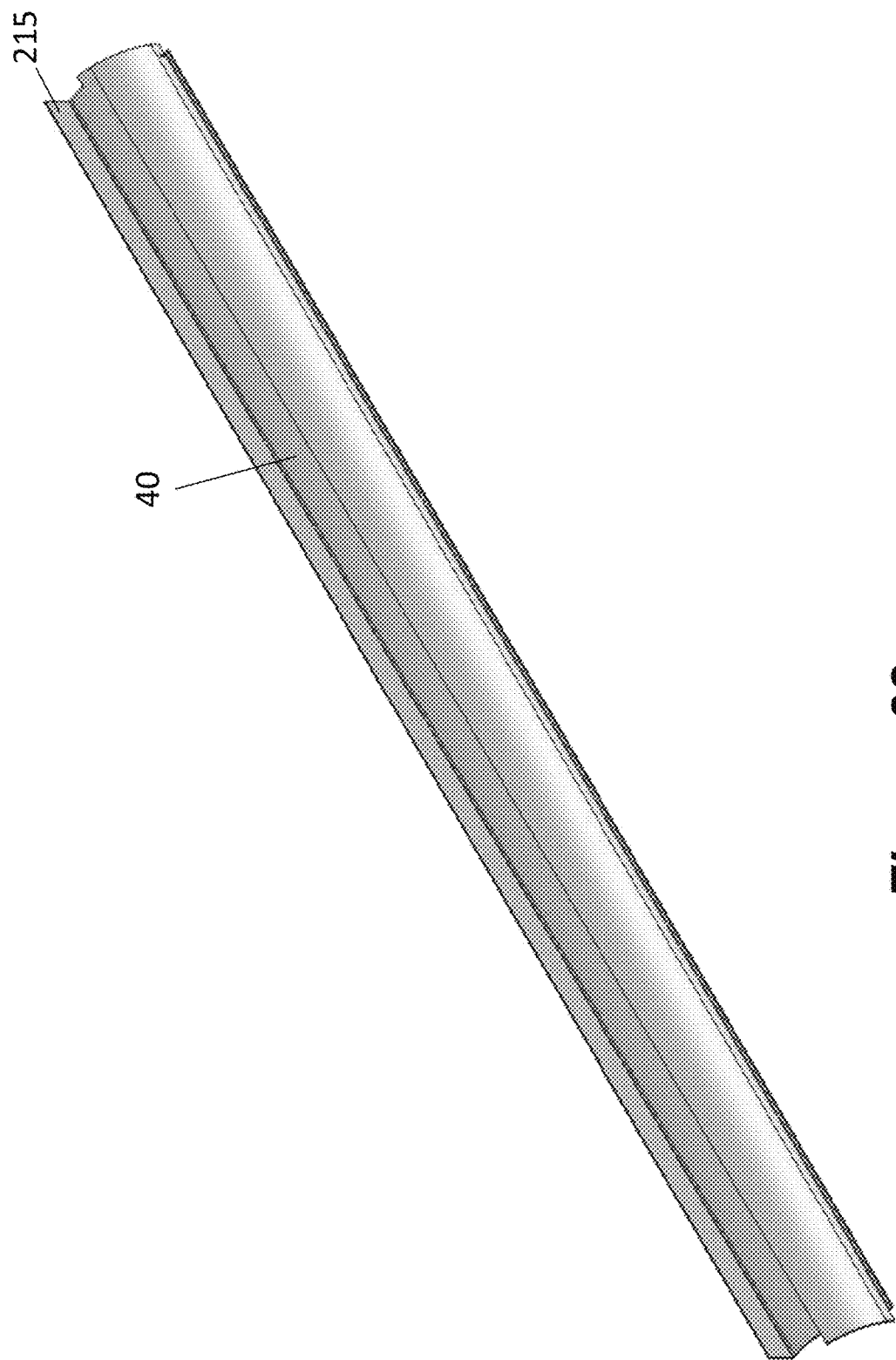
Figure 22A:
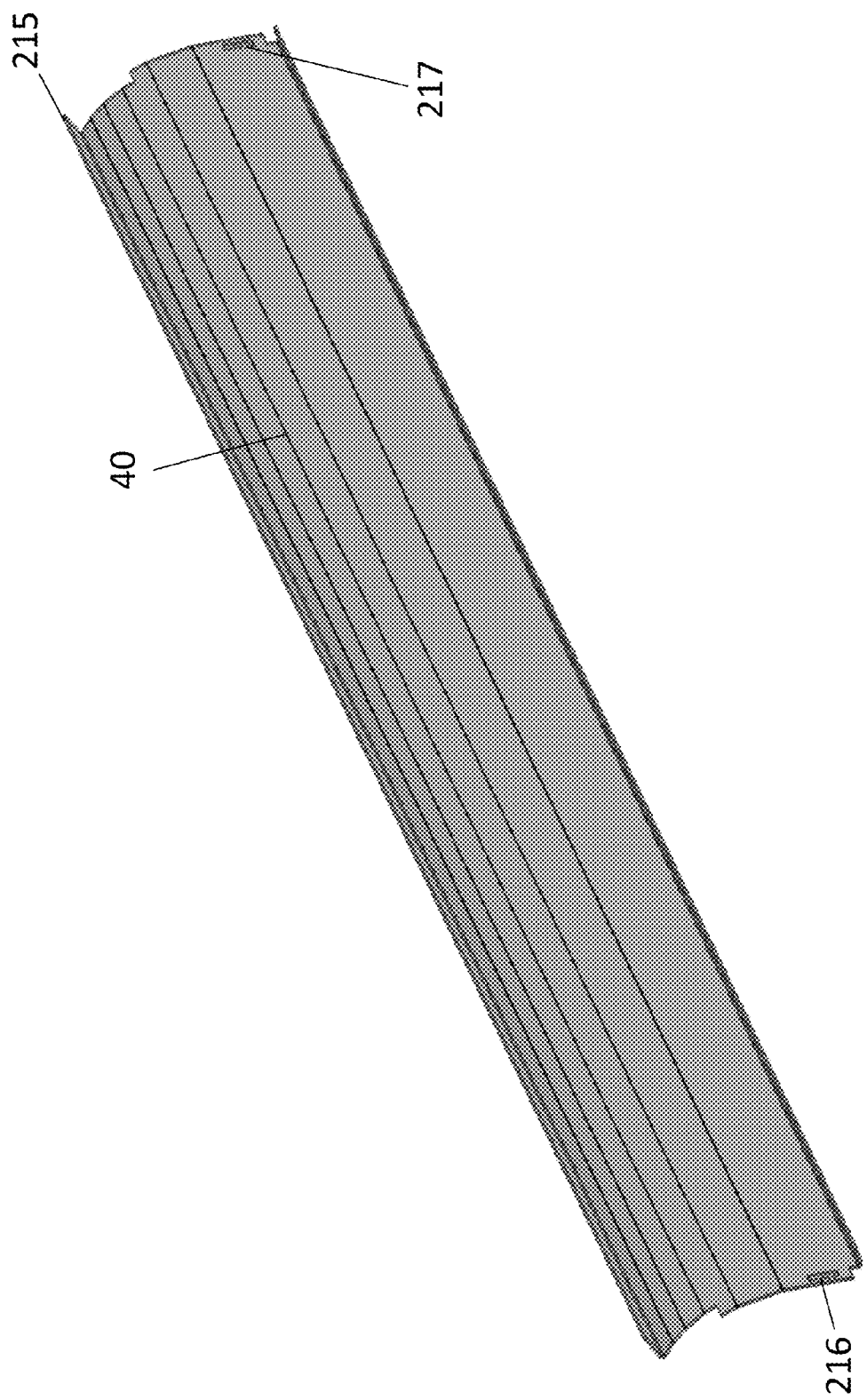
FIGS. 22a and 23a are perspective views of the reflector, according to another embodiment of the present invention.
Figure 23A:
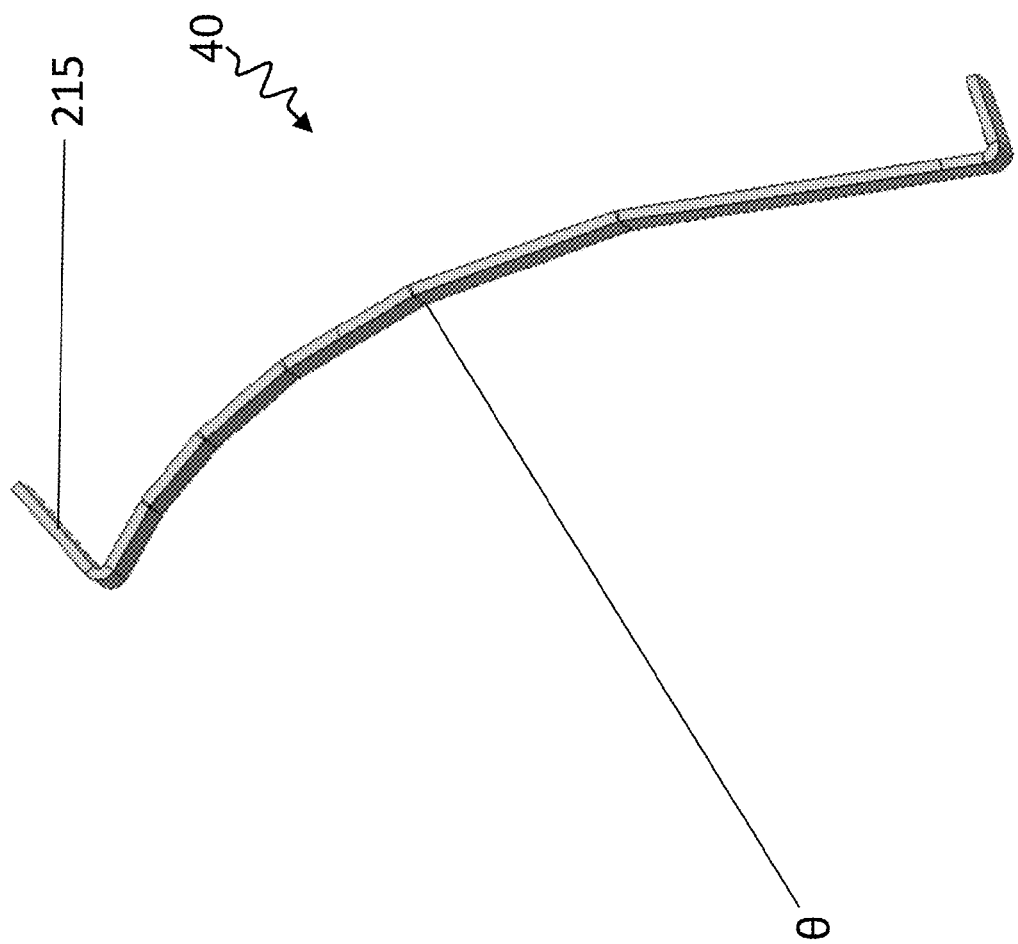

With reference to FIGS. 22 and 23 and according to one embodiment of the present invention, the first reflector 40 is shown in greater detail. The first reflector 40 is comprised of an arch with a curved radius of θ, and a fin 215. The composition of the second reflector 42 (not shown) is identical to the one described above. In another embodiment of the present invention, FIG. 22*a* and FIG. 23*a*, the reflector 40 is shown in greater detail. The segmented reflector 40 is comprised of an arch with a radius of θ with an angled fin 215. The radius θ will be dependent on the size of the reflector being used in a lighting fixture of the present invention and as would be known by a worker skilled in the relevant art. The first and second mounting slit 216, 217 adorn the lower extremity of the first reflector 40. The composition of the second reflector 42 (not shown) is identical to the once described above.

Figure 24:
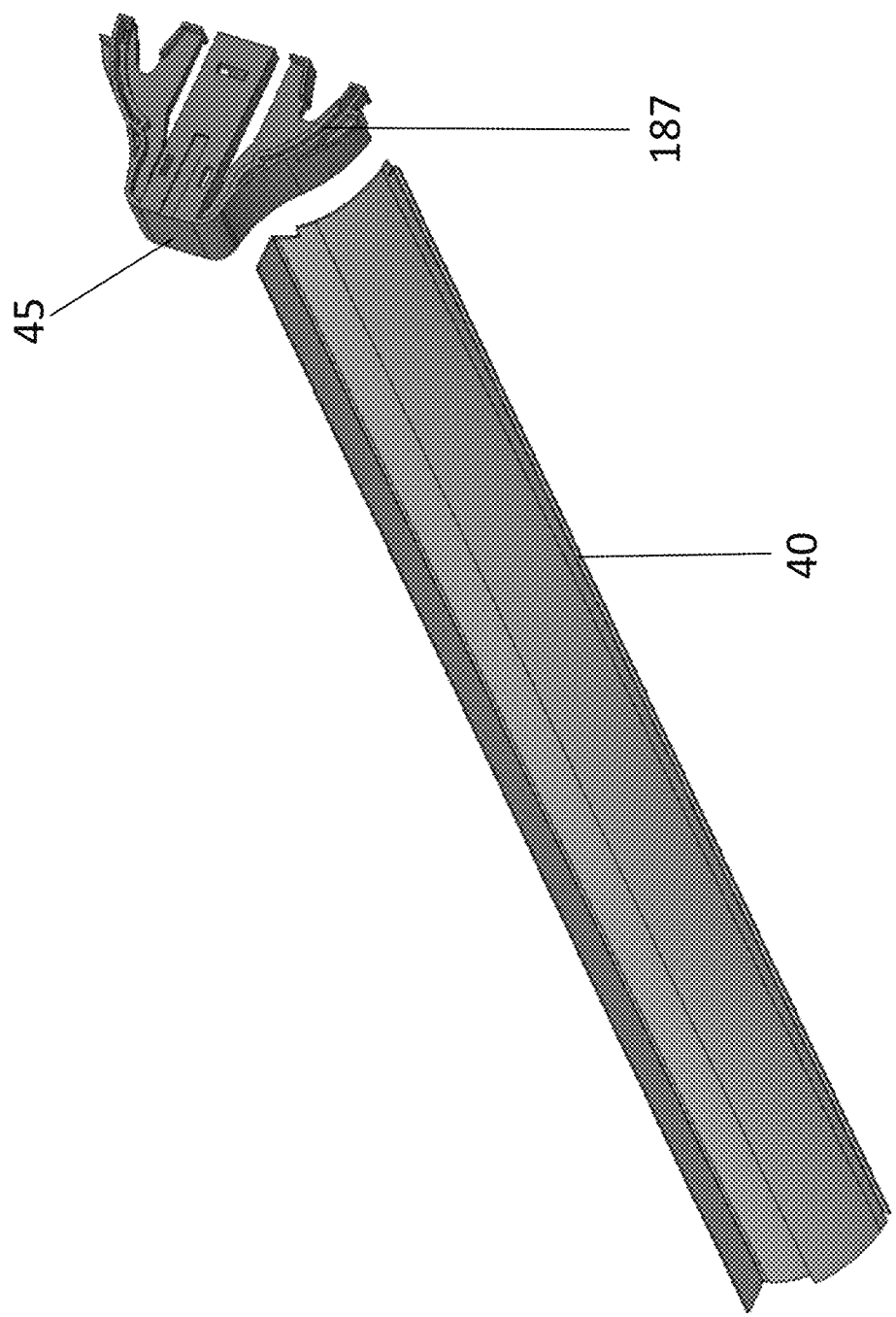
FIG. 24 is a perspective view of the Reflector linking within the module cap, according to one embodiment of the present invention.
Figure 25:
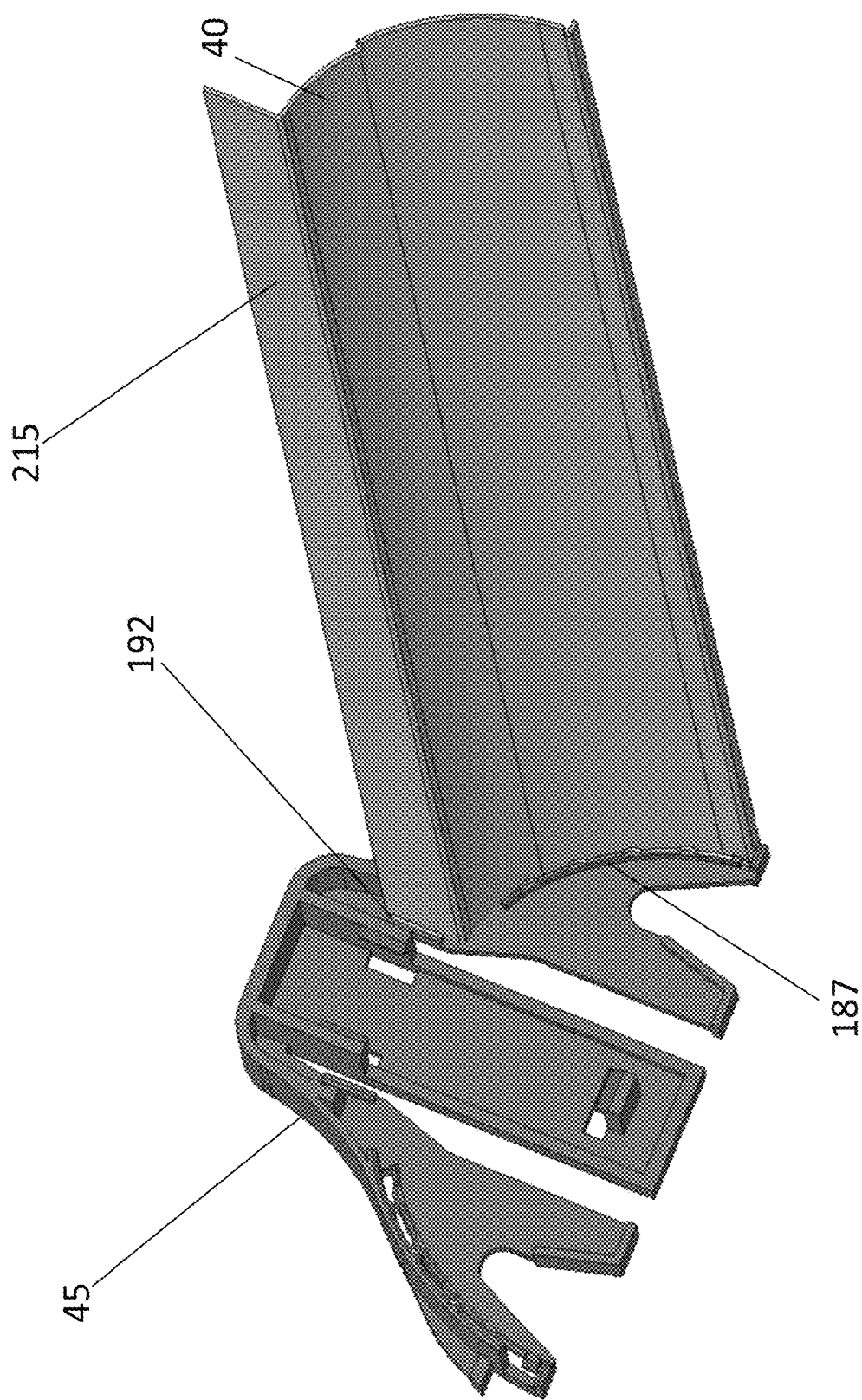
FIG. 25 is a perspective view of the Reflector linked within the module cap, according to one embodiment of the present invention.

With reference to FIGS. 24 and 25 and according to one embodiment of the present invention, the first module cap 45 is shown to interact with the first reflector 40. The first reflector 40 latches into the first module cap 45 by penetrating the ribbed trough 187. With further reference to FIG. 25, the reflector 40 links into the ribbed trough 187 thereby fastening the reflector 40 to the module cap 45. Continued movement of the first reflector 40 through the ribbed trough 187 is prohibited by the interaction of the reflector fin 215 and the first module cap shoulder 192. The interaction between the first module cap and the second reflector is identical to the interaction described above. The interaction between the second module cap with the first and second reflectors is identical as described above.

Figure 24A:
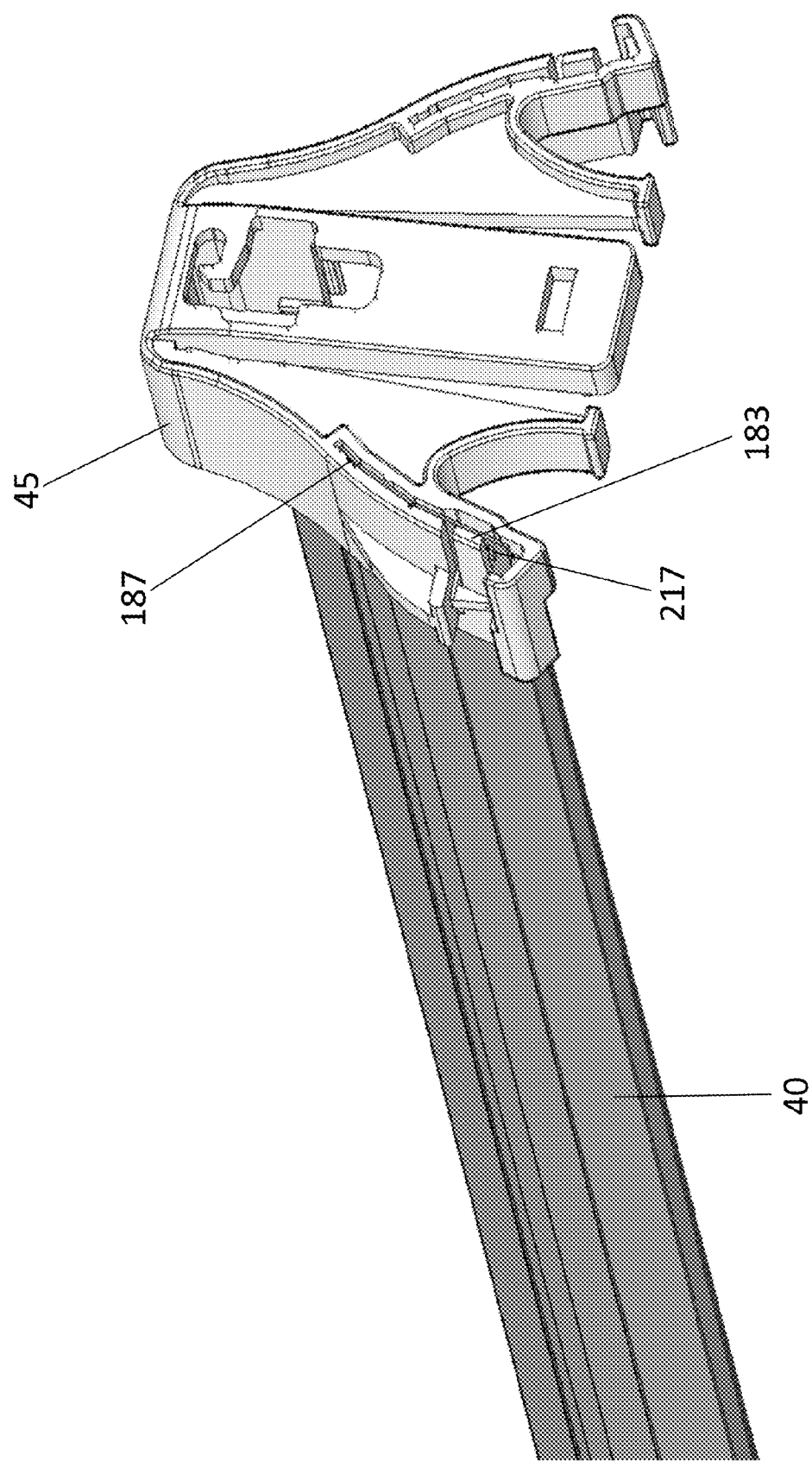
FIG. 24a is a perspective view of reflector linking within the module cap, according to another embodiment of the present invention.
Figure 25A:
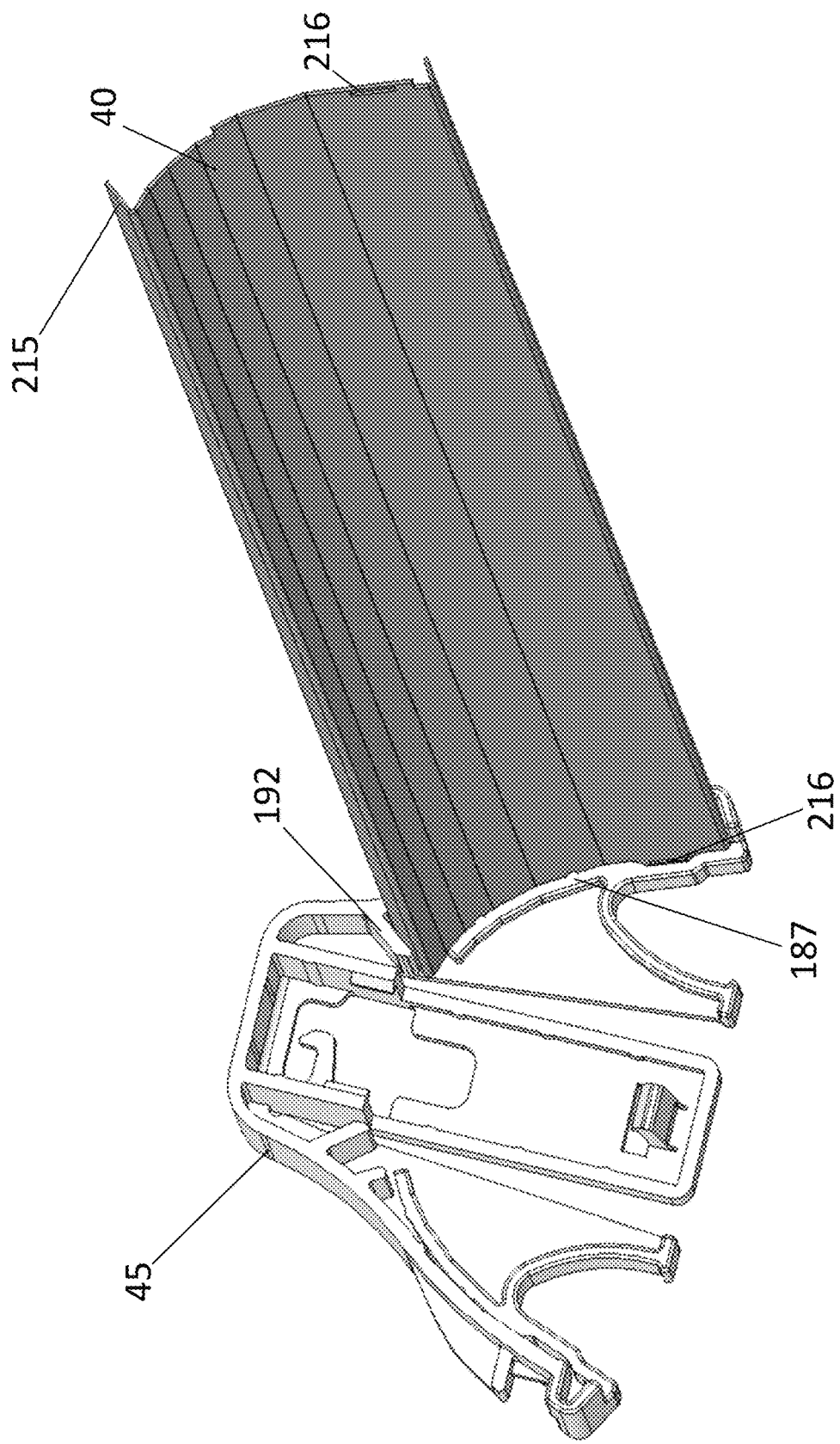
FIG. 25a is a perspective view of the reflector linked with the module cap, according to another embodiment of the present invention.

With reference to FIGS. 24*a* and 25*a* and according to another embodiment of the present invention, the first module cap 45 is shown interacting with the first reflector 40. The reflector engages the module cap by penetrating the ribbed trough 187. The reflector is locked into position when the module cap reflector latch 183 interacts with the reflector mounting slit 217. With further reference to FIG. 25*a*, the second shoulder 192 interacts with the angled fin 215 of reflector 40 to prohibit lateral movement. The interaction between the first module cap 45 and the second reflector is identical to the interaction described above. The interaction between the second module cap and the first and second reflectors is identical as described above.

Figure 26:
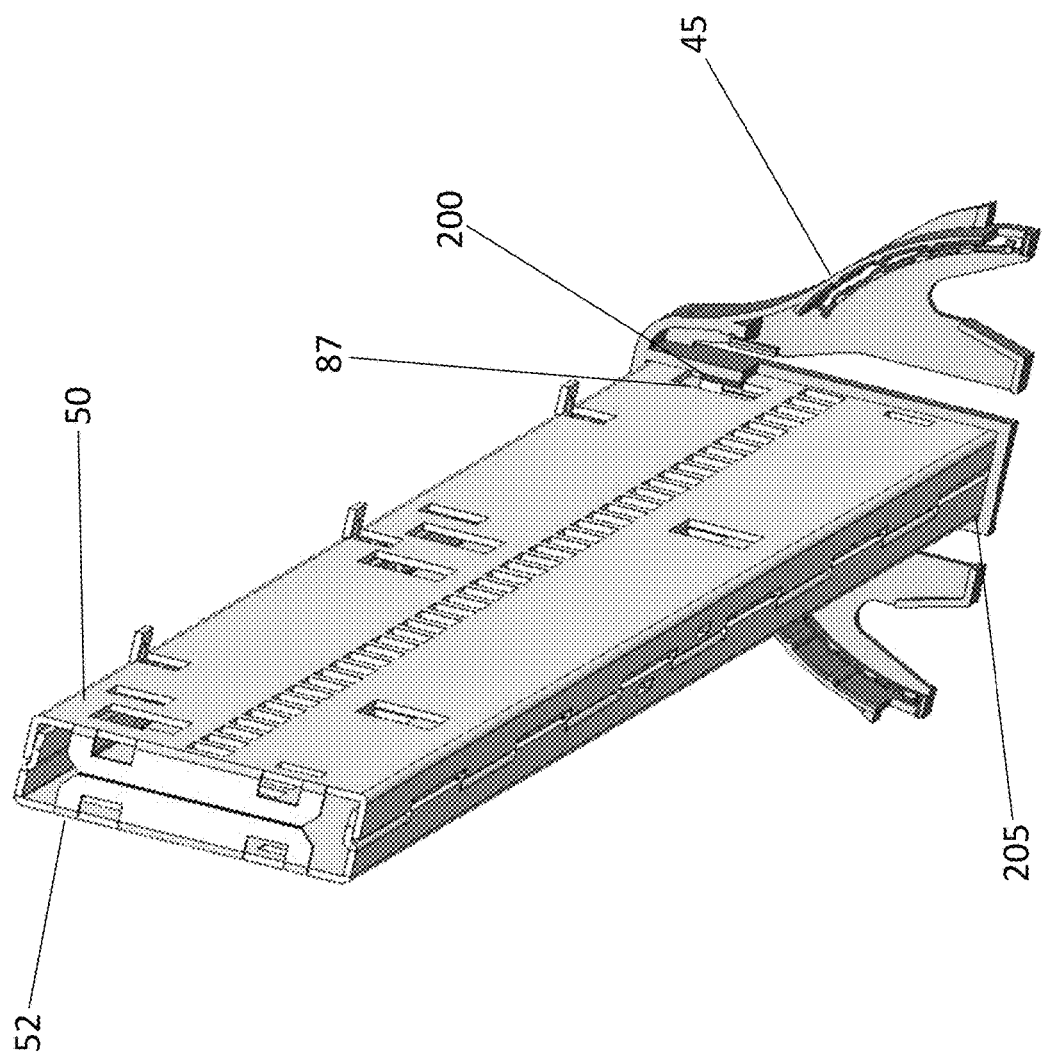
FIGS. 26 and 26a perspective views of the first and second shell attached onto the module cap, according to one embodiment of the present invention.

With reference to FIG. 26 and according to one embodiment of the present invention, the first module cap 45 is shown to interact with a LED module's shell 54 comprised of first and second thermally conductive shells 50, 52. Attachment of the LED module 35 to first and second module caps 45 is essential to the formation of the lamp assembly unit 30. The first and second thermally conductive shells 50, 52 set into the first module cap's 45 by fitting within the raised rim 205. Upon setting, the first module cap 45 latches onto the first thermally conductive shell 50. The latching mechanism is comprised of the first module cap 45 shell latch 200 and the first thermally conductive shell 50 second receiving aperture 87.

Figure 26A:
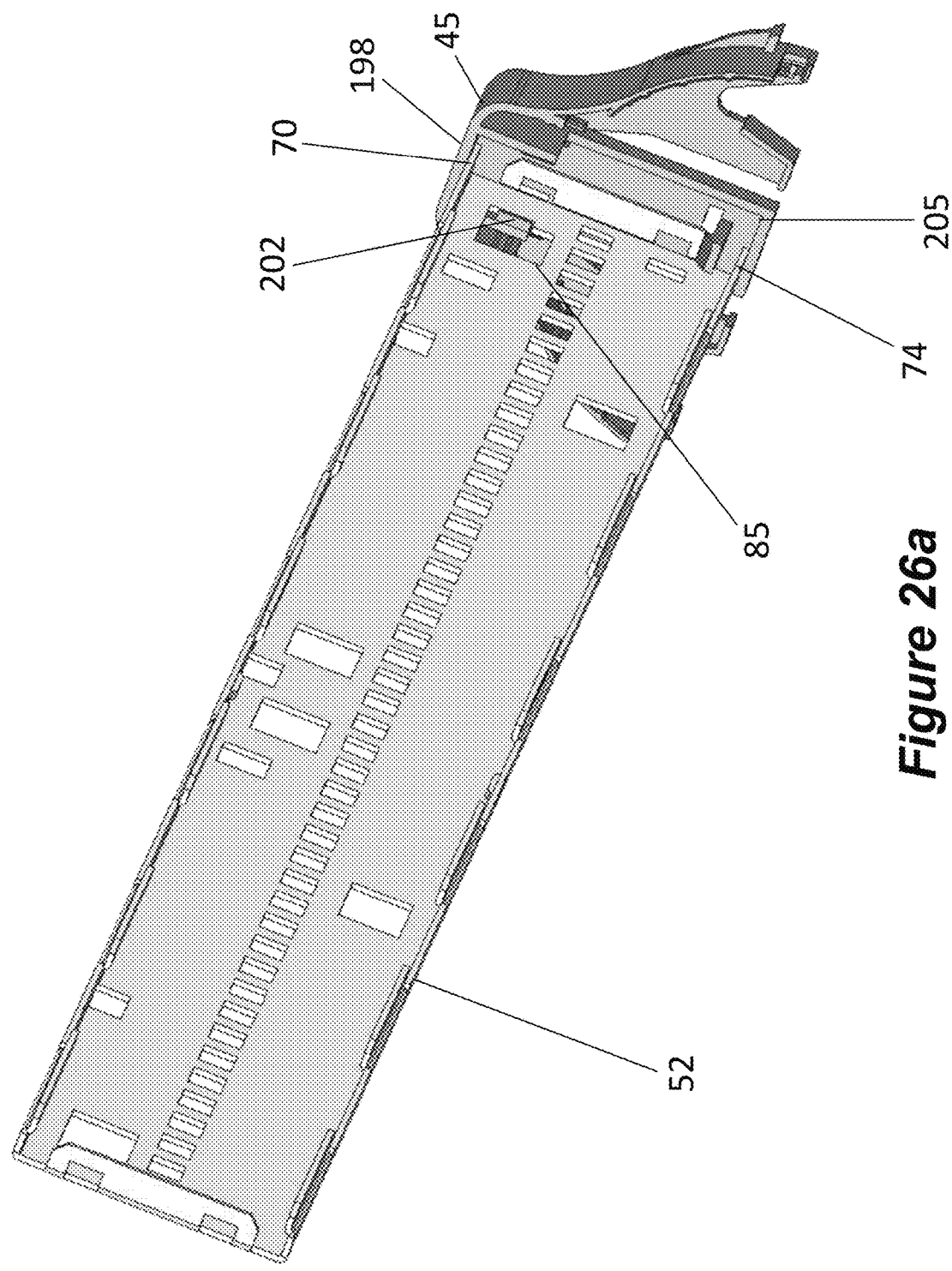

With reference to FIG. 26*a* and according to one embodiment of the present invention, the second shell 52 is similarly linked. The second shell 52 latches on to module cap 45 through the interaction of the second receiving aperture 85 and the second shell latch 202. The raised rim 205 of first module cap 45 fits tightly around the shell's beveled protrusion 74 and the beveled protrusion 70, thereby stabilizing the structure and limiting wobble. The interaction between the second module cap 47 and the first and second thermally conductive shells 50, 52 is identical to the interaction described above.

Figure 27:
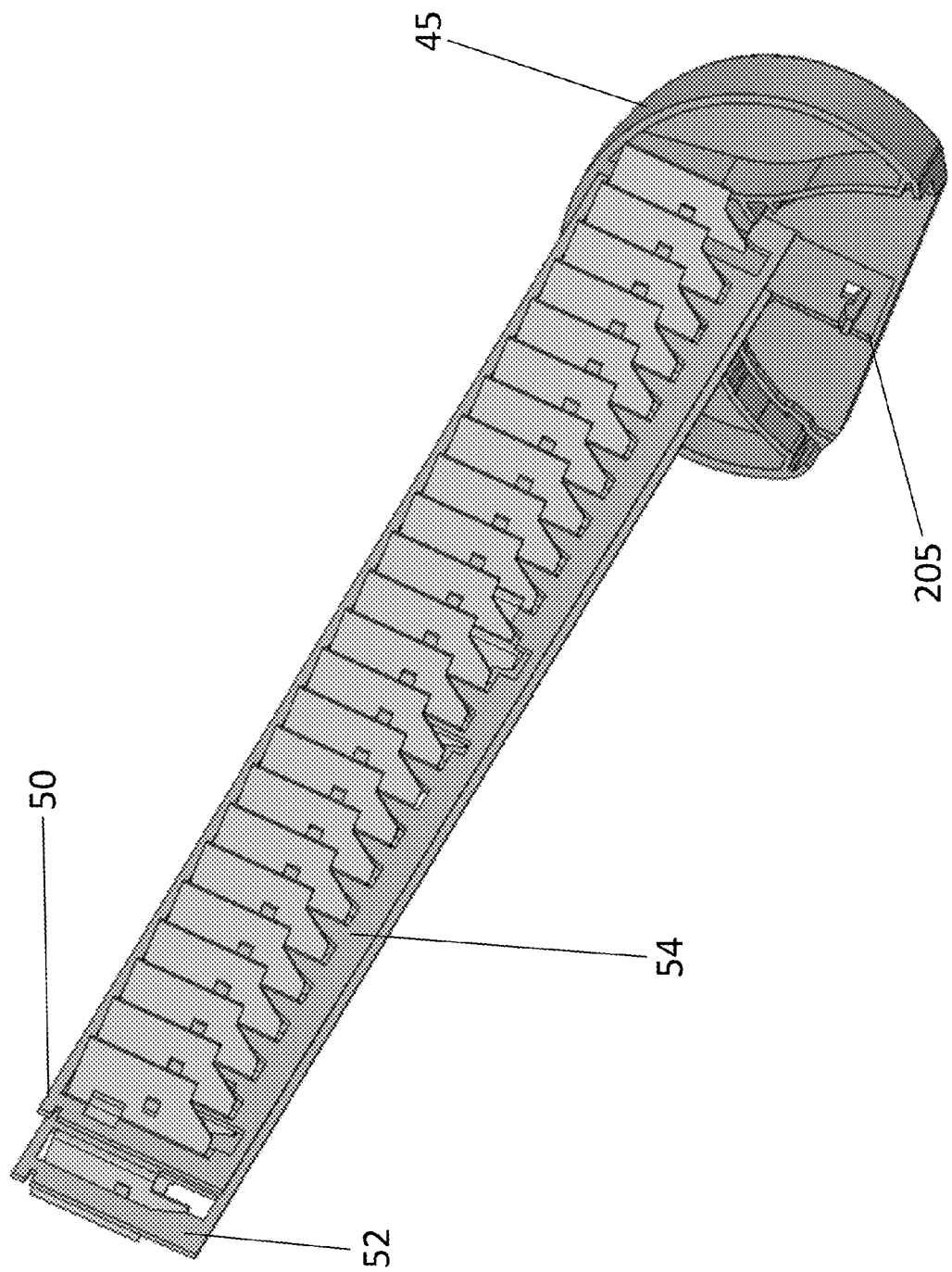
FIG. 27 is a perspective view of the first and second shell attached onto the module cap, according to another embodiment of the present invention.

With reference to FIG. 27 and according to another embodiment of the present invention, the first module cap 45 is shown to interact with a LED module's shell 54 comprised of first and second thermally conductive shells 50, 52. The first and second thermally conductive shells 50, 52 set into the first module cap's 45 by fitting within the upper region of the raised rim 205. Upon setting, the first module cap 45 latches onto the second shell 52. The latching is reversed on the second module cap 47. The second module cap 47 latches onto the first thermally conductive shell 50. To form a solid structure the first and second module cap 45 and 47 need to latch onto the second and first thermally conductive shell 52 and 50, respectively.

Figure 28:
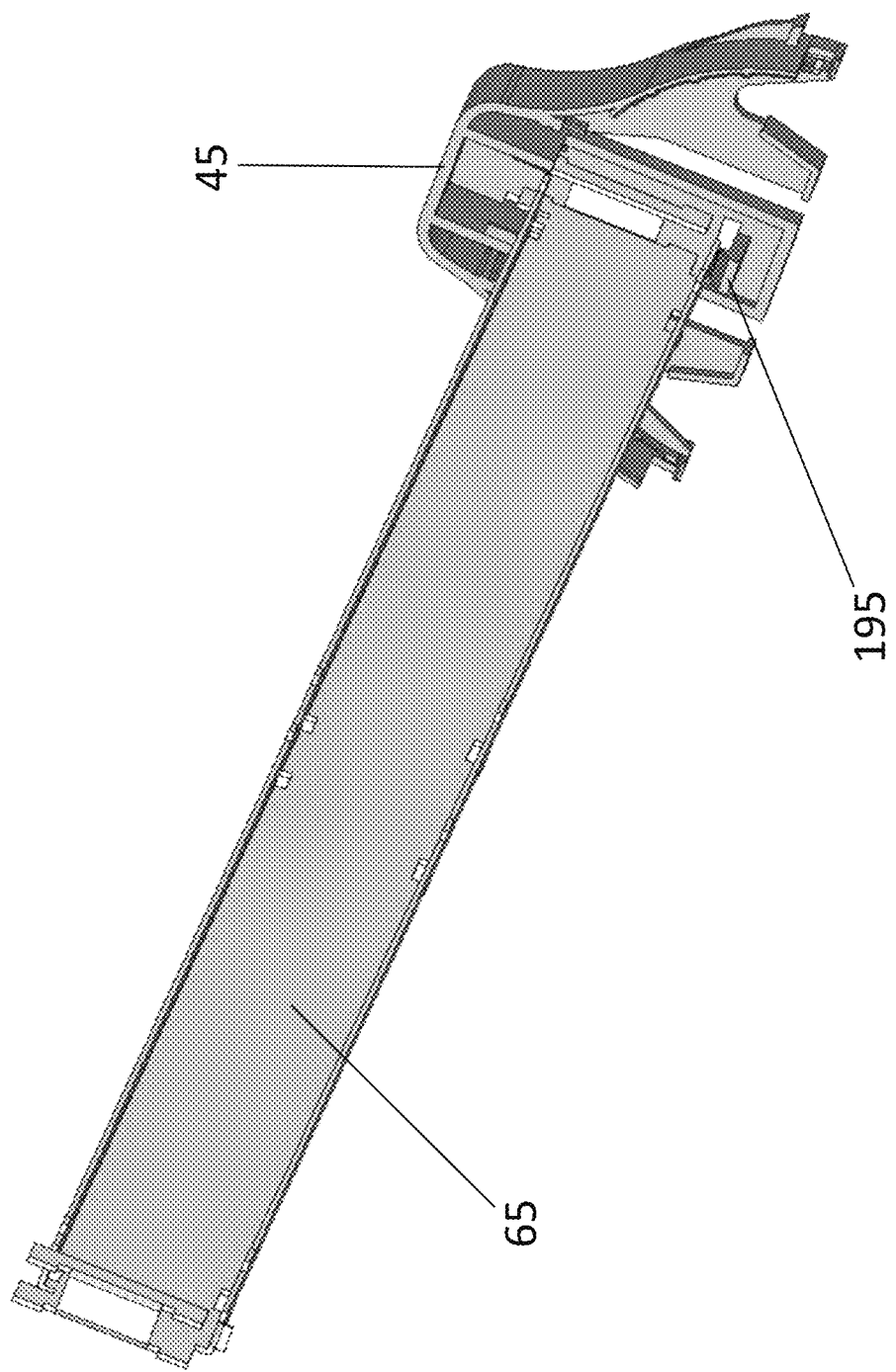
FIGS. 28 and 29 are perspective views of the chip bracket interacting with the module cap, according to one embodiment of the present invention.
Figure 29:
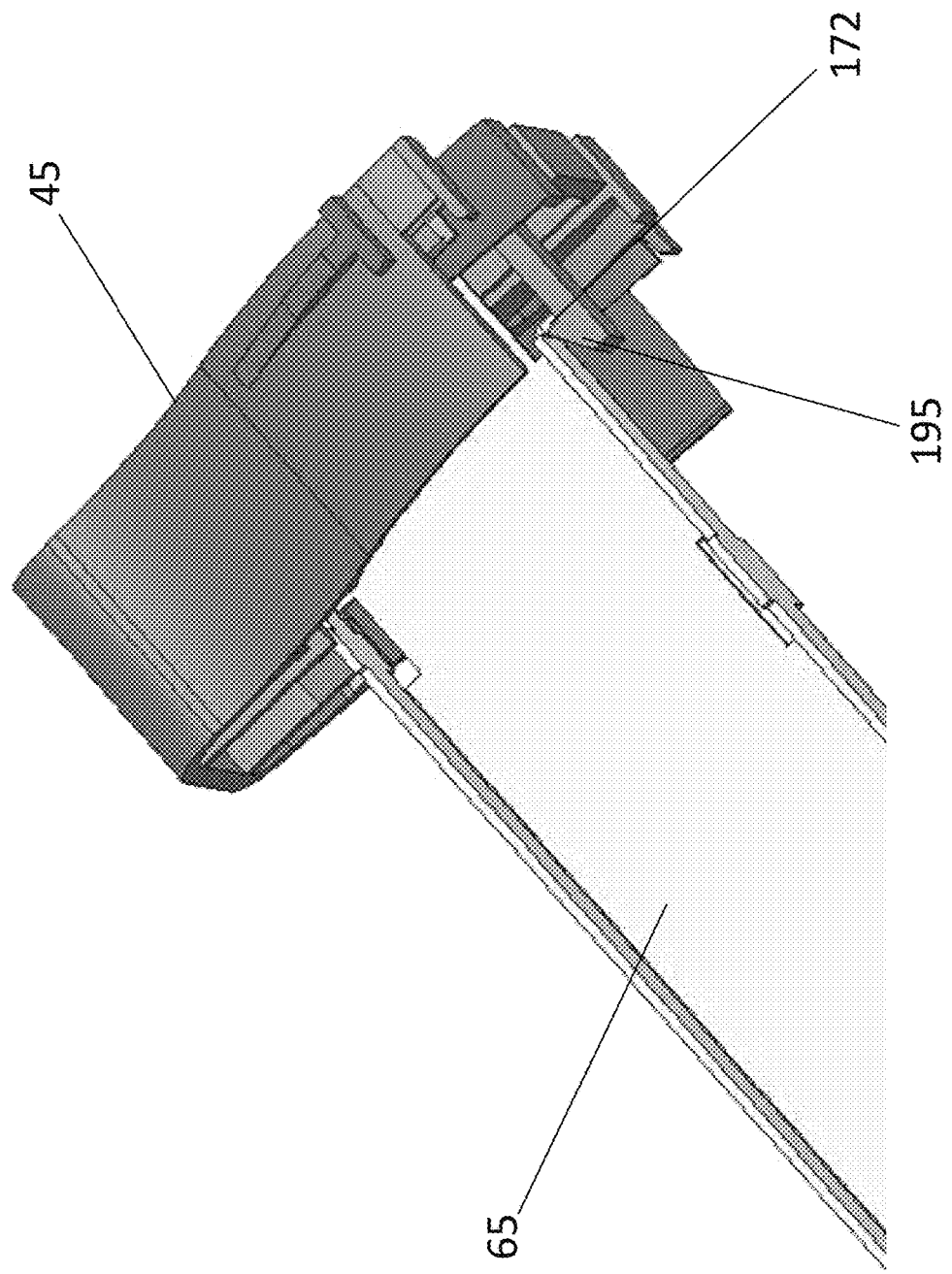

With reference to FIG. 28 and according to one embodiment of the present invention, the chip bracket 65 is shown to interact with the first module cap 45. LED module stability is further enhanced by the interaction of the chip bracket 65 with the module cap 45. As clearly shown in FIG. 29, the module cap chip bracket clasp 195 links directly to the chip bracket's 65 connecting member 172. The interaction between the chip bracket 65 and second module cap 47 is identical to the interaction described above.

Figure 30:
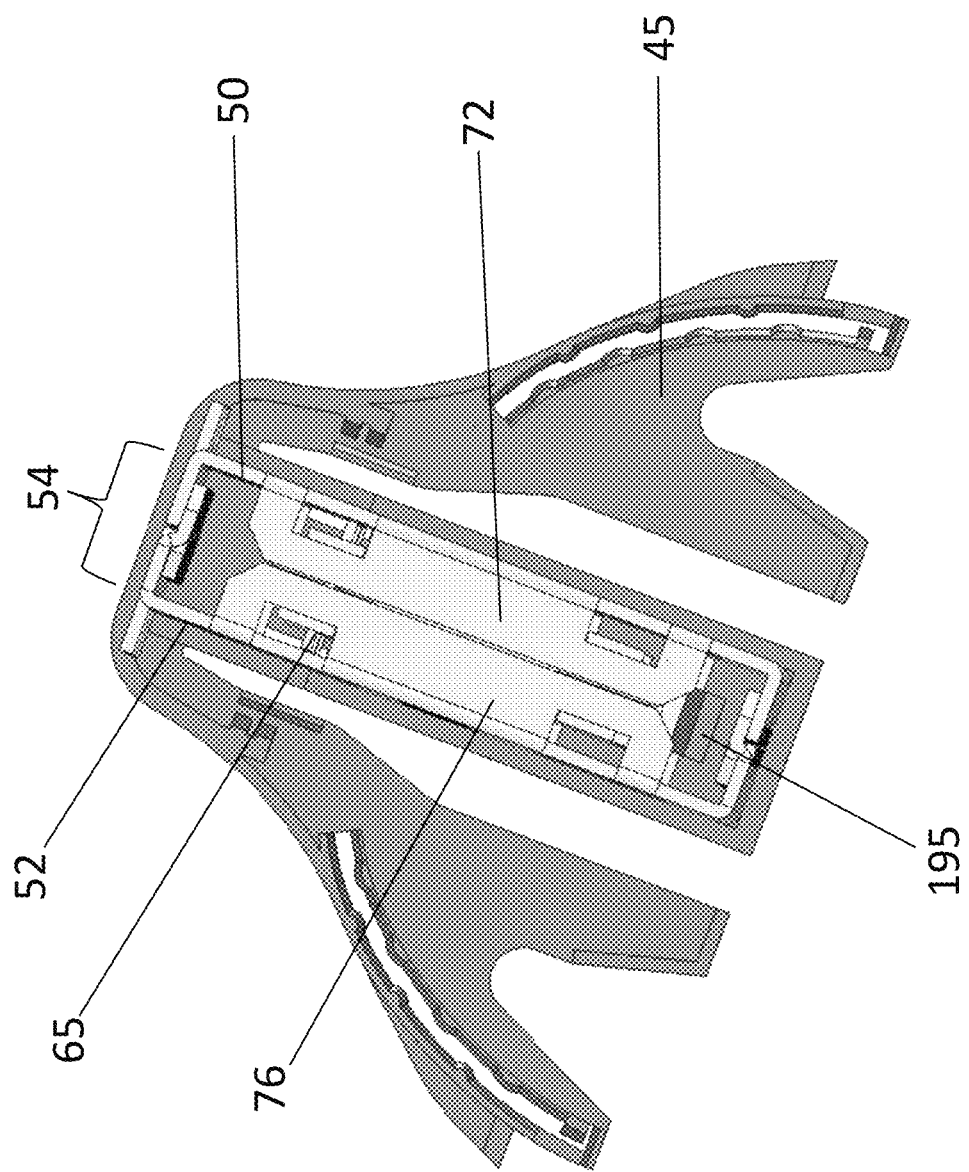
FIG. 30 is a perspective view of the module cap interacting with the chip bracket while encased by the first and second shell, according to one embodiment of the present invention.

With reference to FIG. 30 and according to one embodiment of the present invention, the chip bracket 65 is shown to interact with the first module cap 45 while encased within the LED module shell 54. The stabilizing effect of linking the module cap 45 with the chip bracket 65 is realized only when the chip bracket 65 is encased by the module shell 54. The first and second thermally conductive shells 50, 52, and protrusions 72, 76 permit the chip bracket Clasp 195 to penetrate the LED module shell 54 and interact with the chip bracket 65 and Connecting member not shown.

Figure 31:
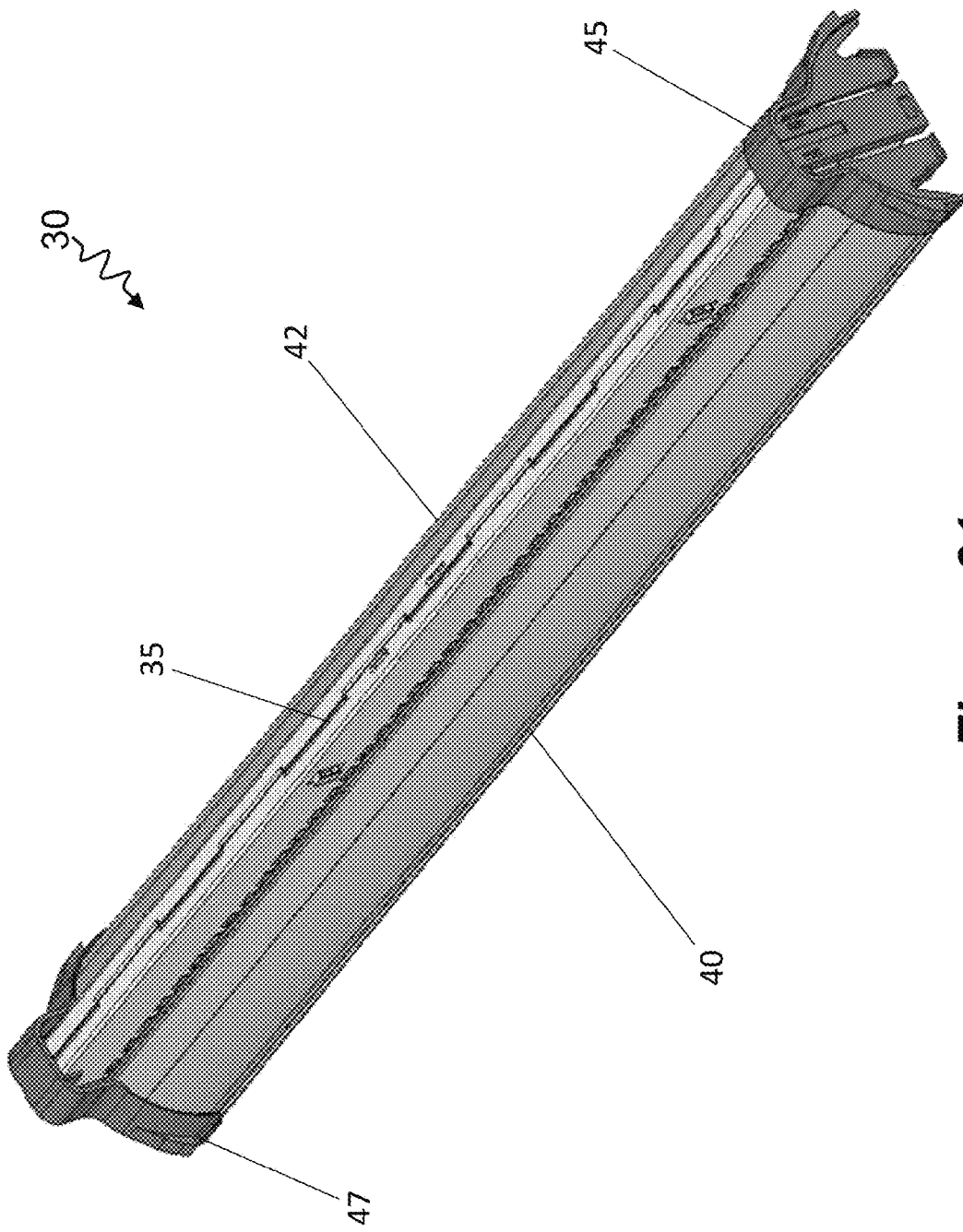

With reference to FIGS. 31 and 31*a* and according to one embodiment of the present invention, alternate views of a fully assembled lamp assembly unit 30 are shown. The LED module 35 along with the first and second reflectors 40 and 42 are fastened into the lamp assembly unit 30 by the first and second cap modules 45 and 47.

Figure 32:
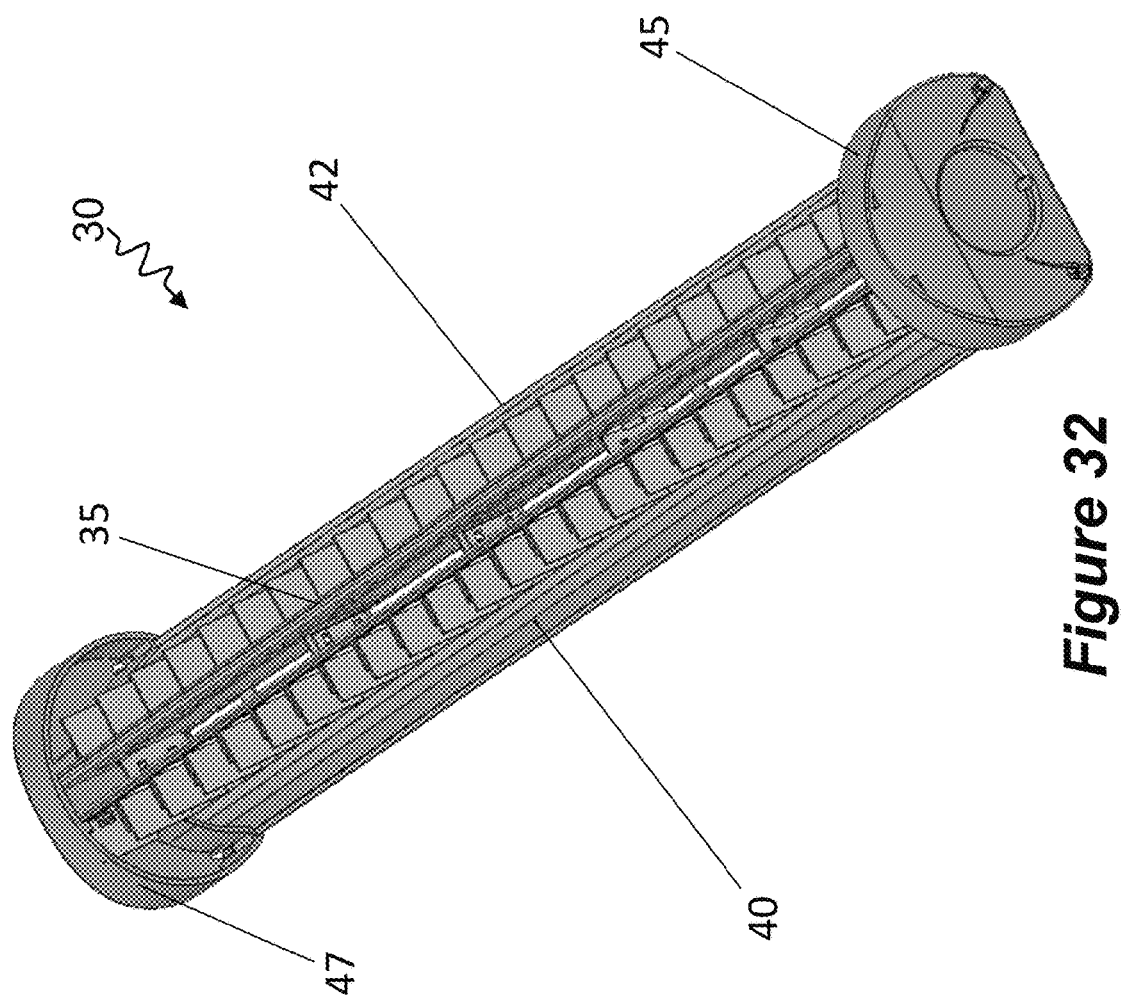
FIGS. 32 and 32a are perspective views of the Lamp Assembly unit, according to another embodiment of the present invention.
Figure 32A:
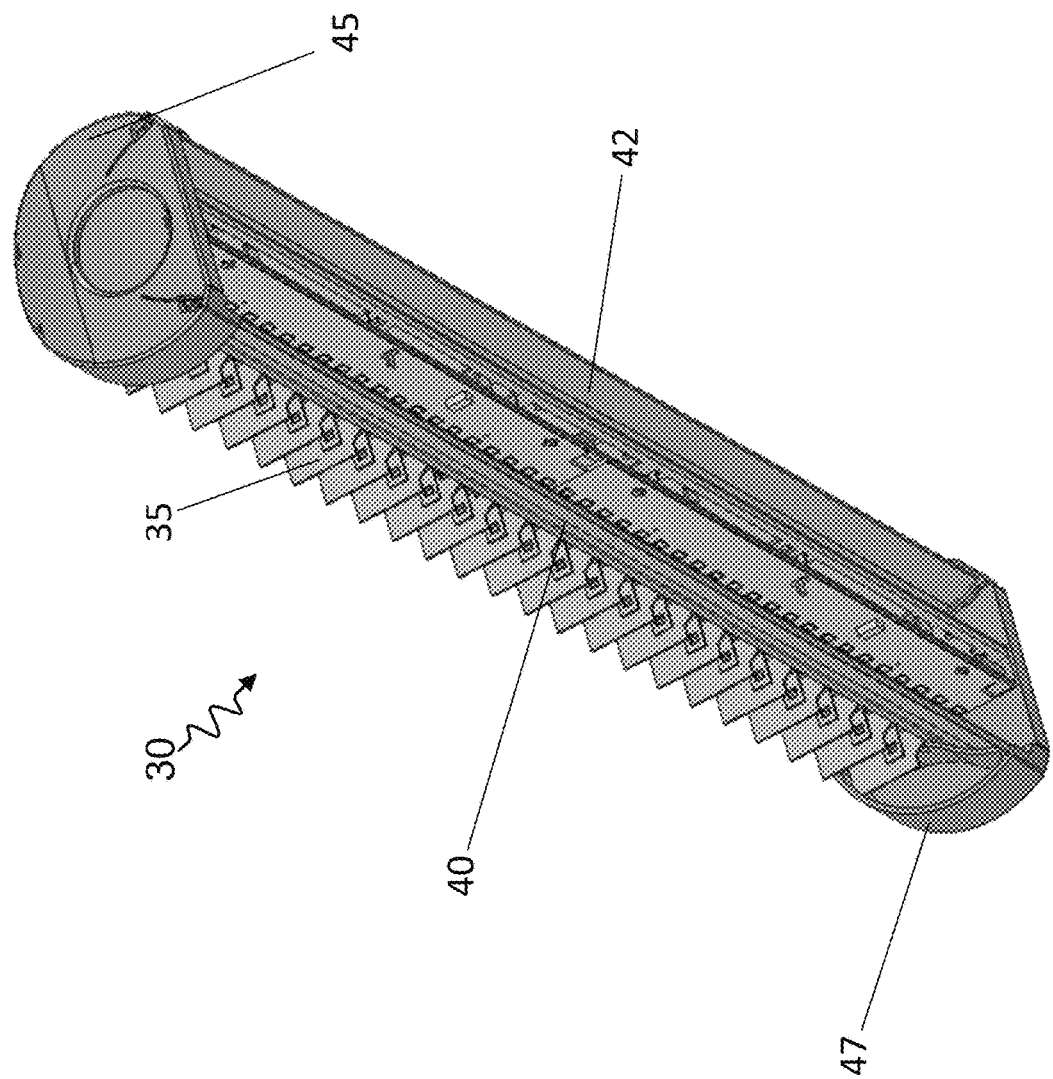

With reference to FIGS. 32 and 32*a* and according to another embodiment of the present invention, alternative views of a fully assembled lamp assembly unit 30 are shown. The LED module 35 along with the first and second reflectors 40 and 42 are fastened into the lamp assembly unit 30 by the first and second cap modules 45, and 47.

3. Light Fixture

Figure 33:
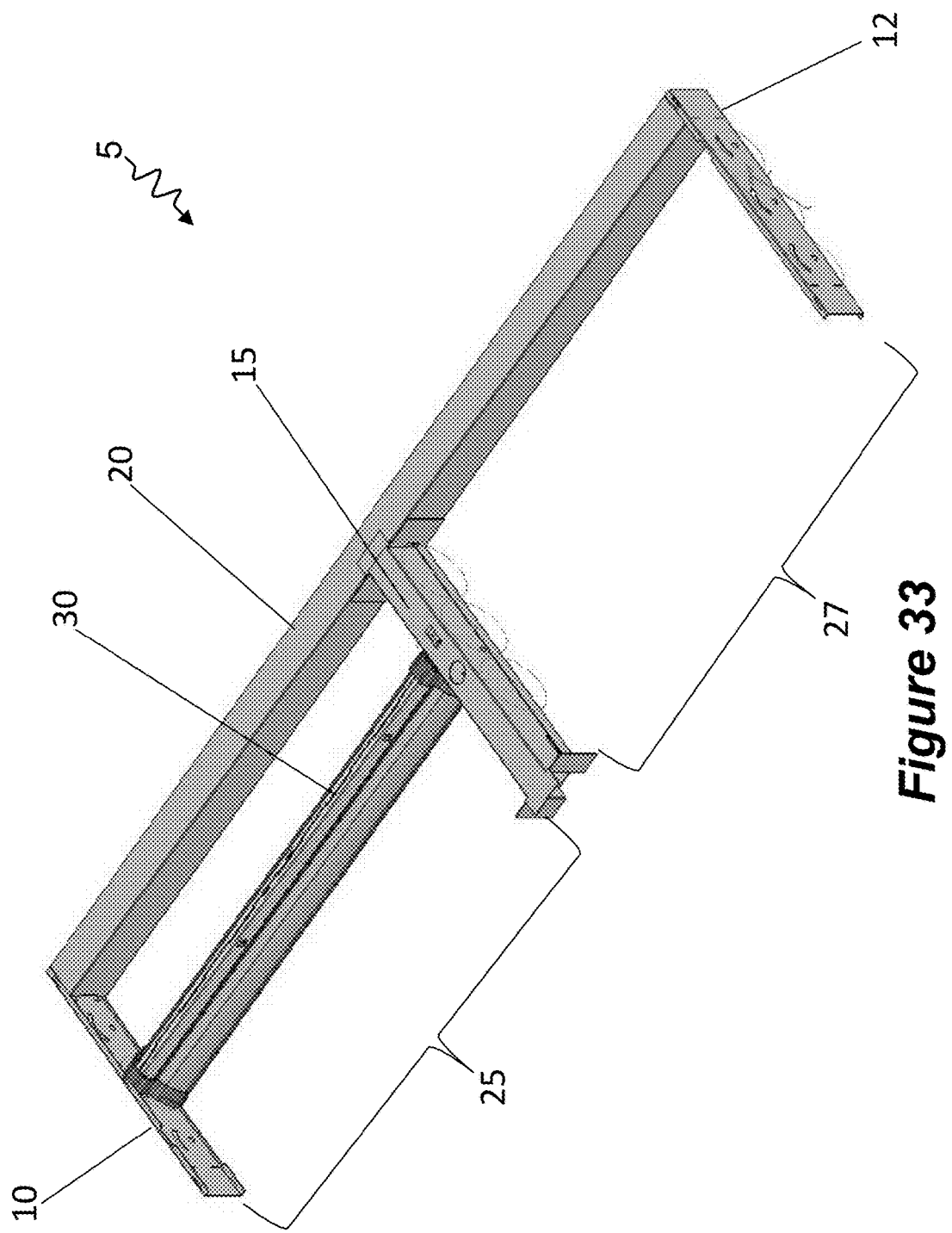
FIG. 33 is a perspective view of the Light Fixture containing a single Lamp Assembly unit, according to one embodiment of the present invention.

With reference to FIG. 33 and according to one embodiment of the present invention, the Light Fixture 5 is described in greater detail. The Light Fixture 5 is comprised of first and second end plates 10, 12, first and second driver channel (not shown) and a hollow bridge 15 that compartmentalize lamp assembly unit 30 to contain first and second openings 25, 27. Parallel lamp assembly unit 30 can be fitted into compartmentalized first or second openings 25, 27.

Figure 33A:
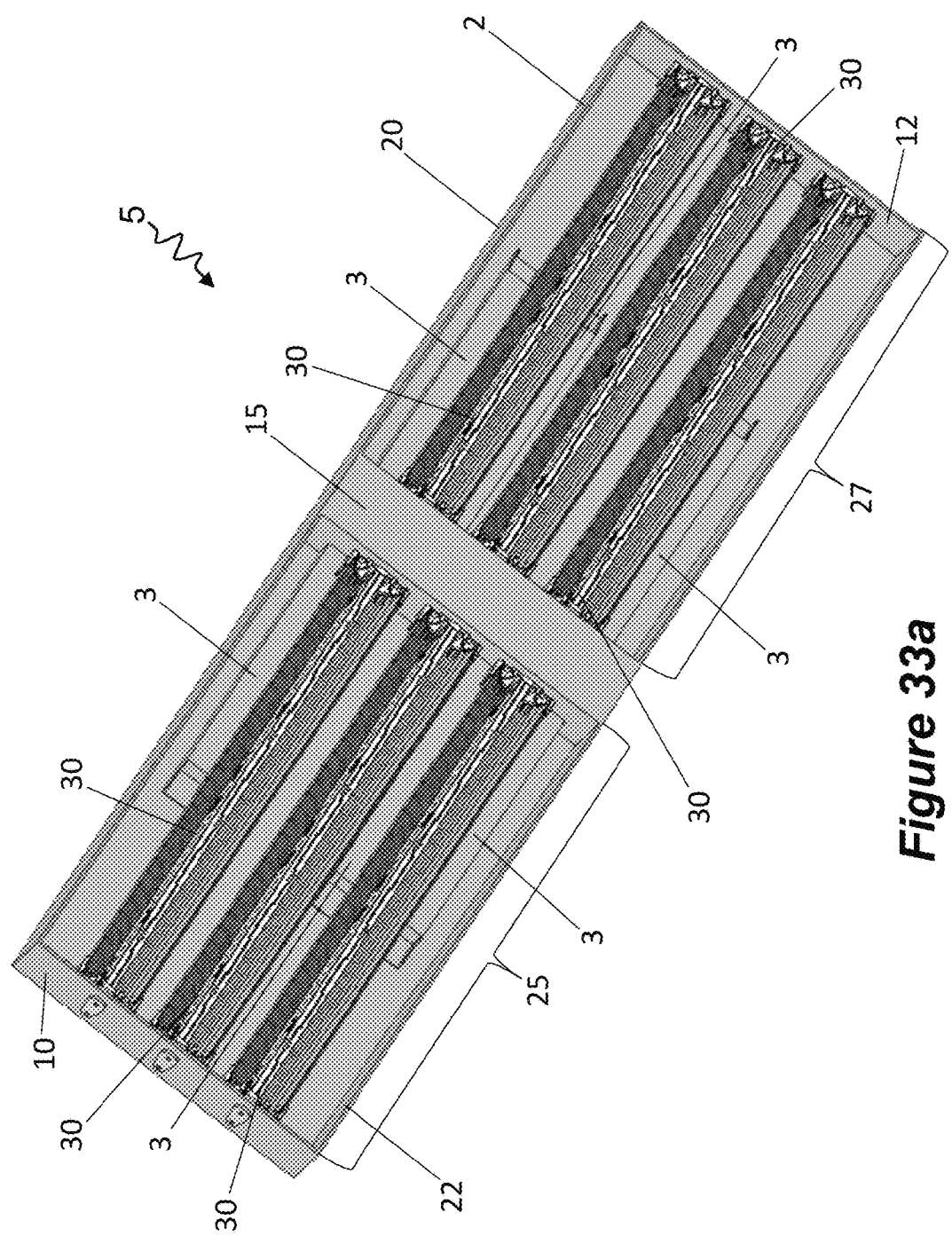
FIG. 33a is a perspective view of a Light Fixture, according to another embodiment of the present invention.

With reference to FIG. 33a and according to another embodiment of the present invention, the LED lighting fixture 5 is shown in greater detail. The light fixture is housed within the enclosure 2. The enclosure 2 covers the upper region of the light fixture. The first and second driver channel 20, 22, the first and second end plates 10, 12, and the hollow bridge 15 form the structural elements of the enclosure 2. The first and second openings 25, 27 are capable of housing multiple parallel lamp assembly units 30. Parallel lamp assembly units 30 can be fitted in parallel within the first and second openings 25, 27. For illustrative purposes, FIG. 33a describes the first and second opening 25, 27 to contain three lamp assembly units 30. A worker skilled in the relevant art would appreciate the various combinations of lamp assembly unit 30 that can be fitted into the first and second opening. Depending on user preference, the first and second opening 25, 27 can be manufactured to hold an indefinite amount of lamp assembly units 30. In addition, depending on user preference, the LED lighting system can be manufactured to contain a single opening 27, or in the alternative contain multiple openings.

Figure 33B:
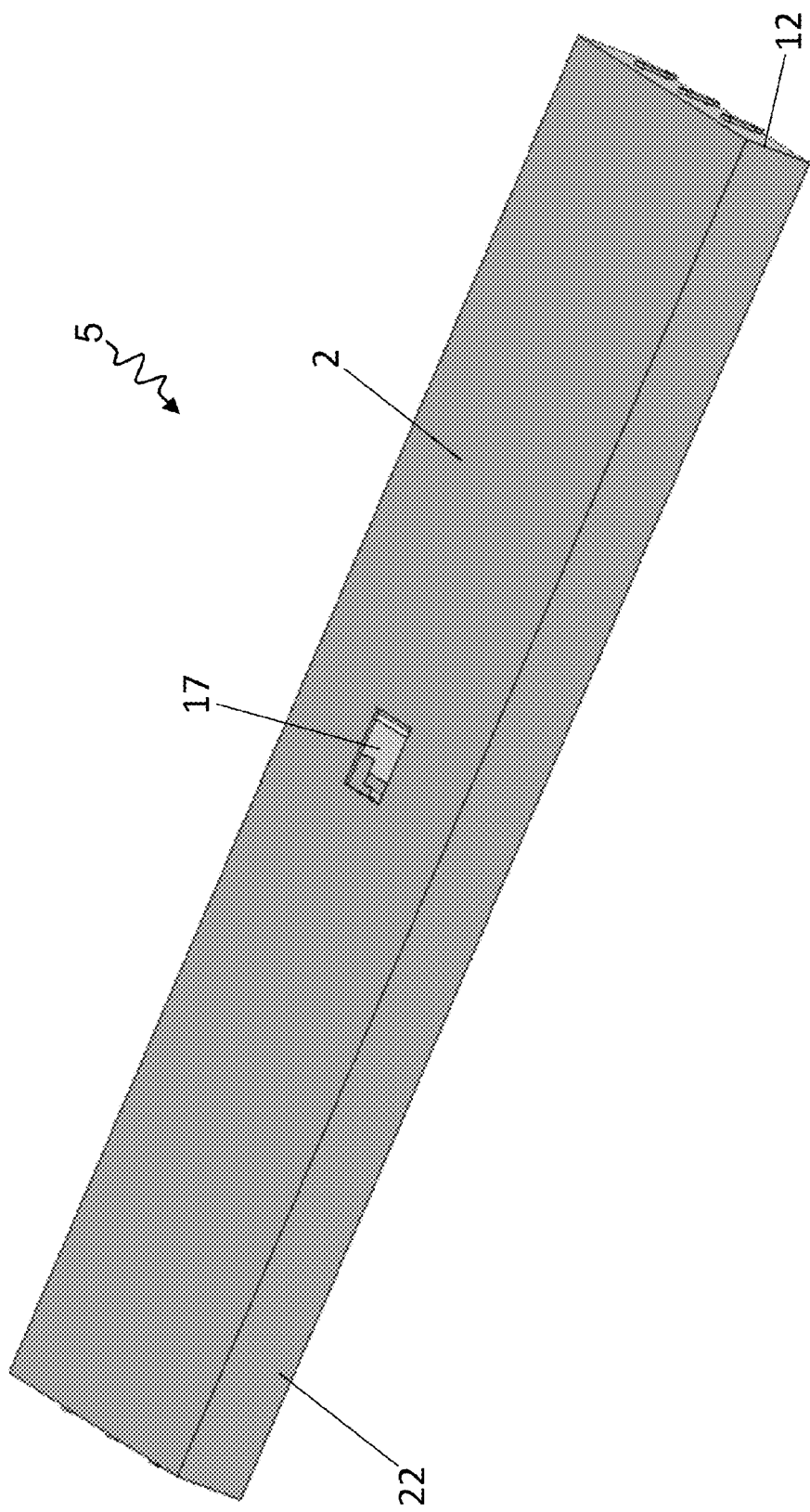
FIG. 33b is a perspective view of the Light Fixture enclosure, according to one embodiment of the present invention.

With reference to FIG. 33b and according to another embodiment of the present invention, an aerial view of the lighting fixture 5 is shown in greater detail. The enclosure 2 houses the lighting system. The first and second driver channel 20, 22, and the first and second end plates 10, 12, are integrated into the enclosure 2. A central hole within enclosure 2 displays the transformer 17, which is enclosed within the hollow bridge 15 (not shown). In another embodiment of the present invention, enclosure 2 is flat panel, lacking the first and second driver channel 20, 22, and the first and second end plates 10, 12. The enclosure 2 contains air ventilation slots, or perforations that allow convective air to flow.

Figure 33C:
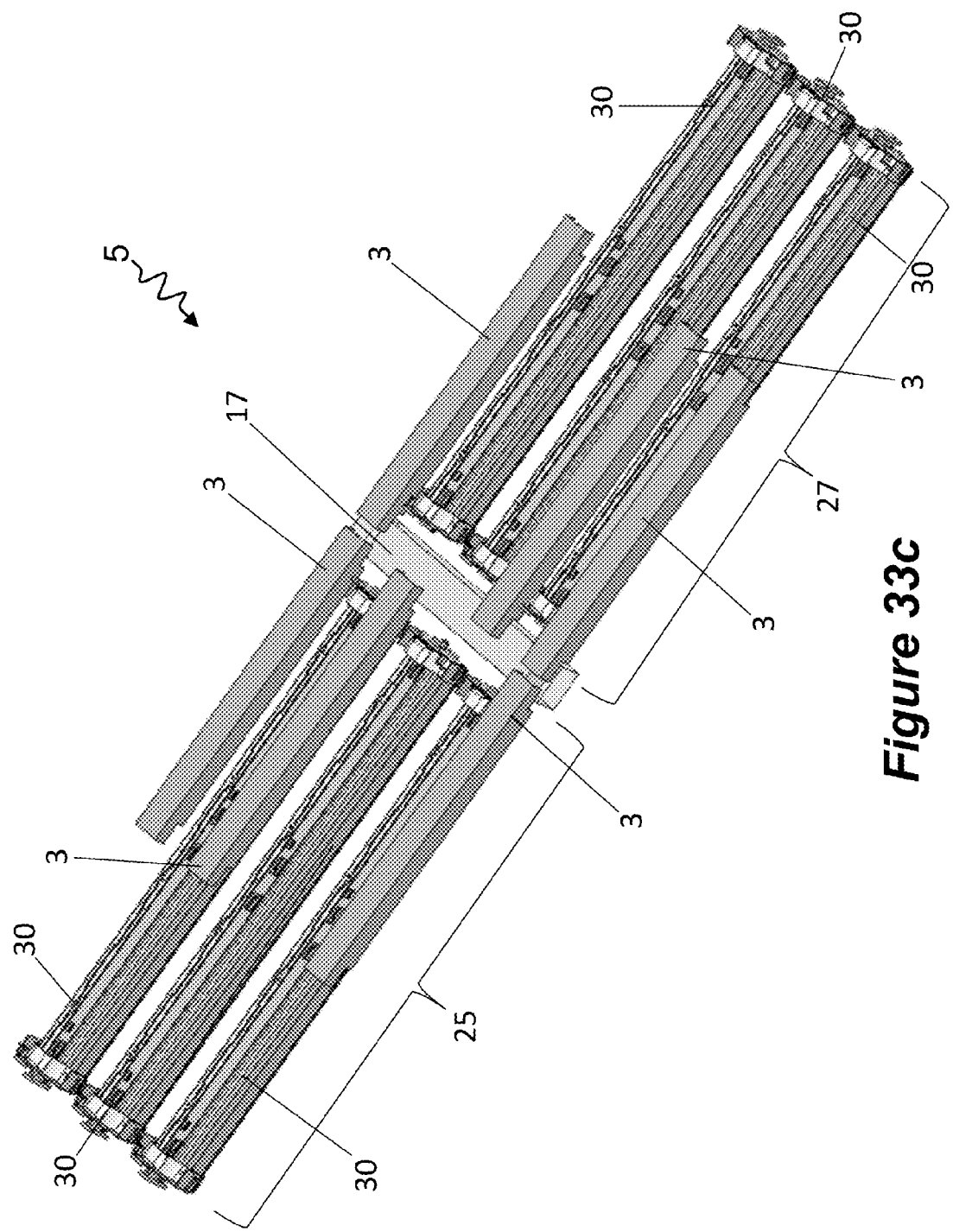
FIG. 33c is a perspective view of the Light Fixture lacking the back cover, according to one embodiment of the present invention.

With reference to FIG. 33c and according to another embodiment of the present invention, an aerial view of the lighting fixture 5 lacking the enclosure is shown in greater detail. The light fixture 5 is comprised of LED drivers 3, lamp assembly units 30, and a transformer 17. An electrical current is passed from an electrical source (not shown) to the transformer 17 and then passed to the LED driver 3 in order to modulate the electrical input that is received by the lamp assembly units 30. Single LED driver 3 corresponds to a single lamp assembly unit 30 within the lighting fixture 5. A worker skilled in the relevant art would appreciate the various combinations of LED drivers 3 and transformers 17 that can effectively power the lamp assembly units 30 within the lighting fixture 5. The number of lamp assembly units 30 can vary depending on user specifications. A worker skilled in the relevant art would appreciate that the various combinations of lamp assembly unit 30 fitted into the first and second opening 25, 27 would alter the number of LED drivers 3.

Figure 33D:
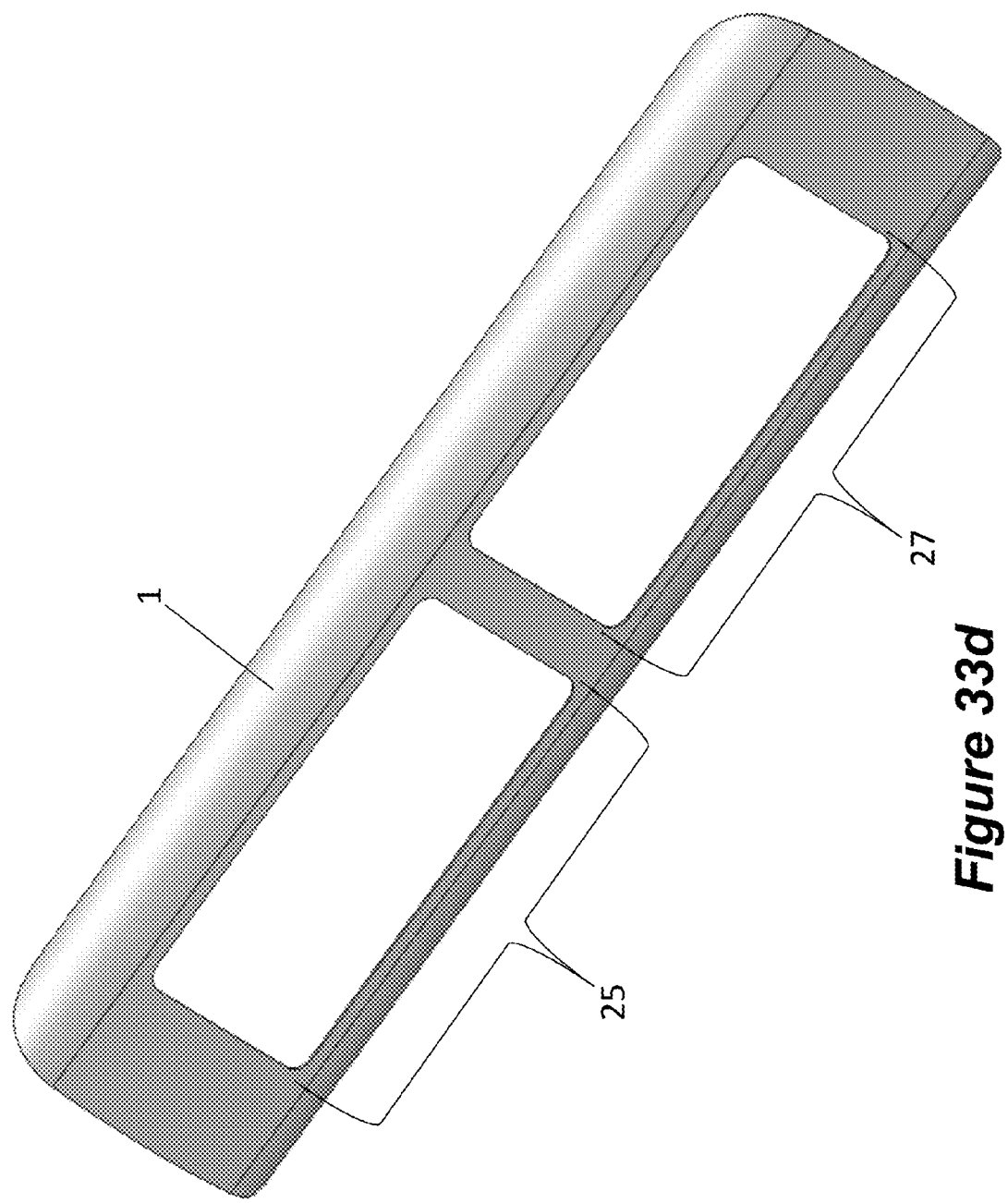
FIG. 33d is a perspective view of a Cosmetic Panel for installation onto a Light Fixture or LED lighting system, according to one embodiment of the present invention.

With reference to FIG. 33d and according to another embodiment of the present invention, the cosmetic panel is 1 shown in greater detail. The cosmetic panel 1 mounts to the visible portion of the lighting fixture 5. The cosmetic panel contains 2 holes which correspond to the first and second opening 25, 27 of the lighting fixture 5 (not shown).

Figure 34:
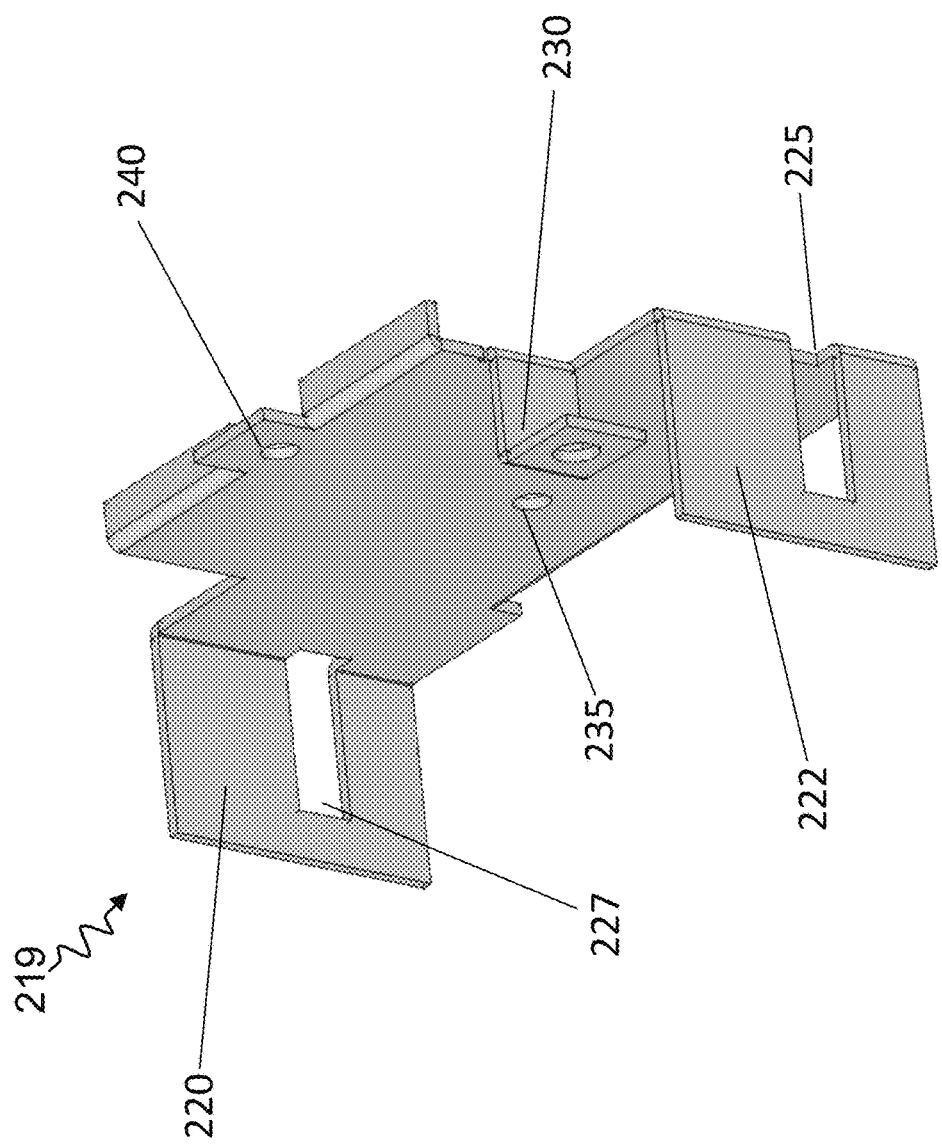
FIGS. 34 and 35 are perspective views of the rotation plate for use in a Light Fixture or LED lighting system, according to one embodiment of the present invention.
Figure 35:
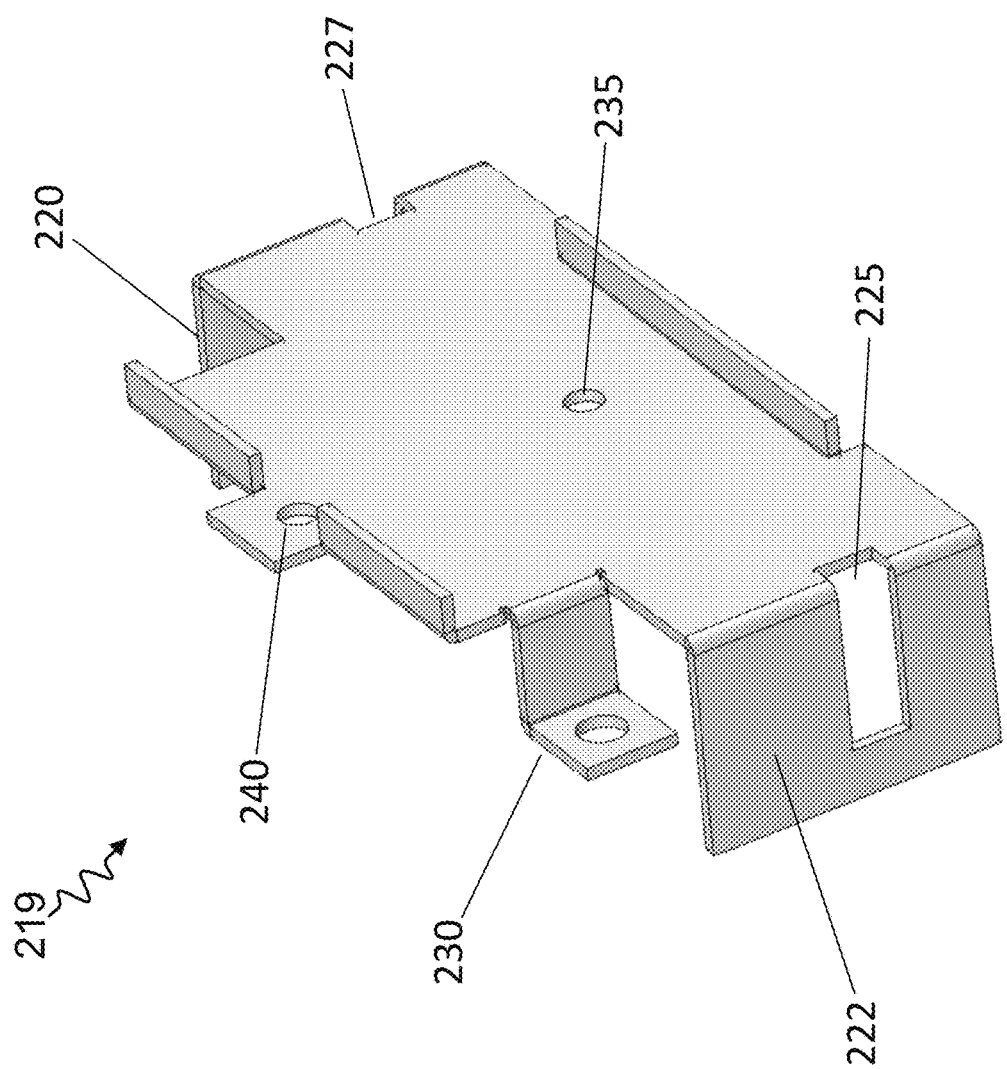
Figure 35A:
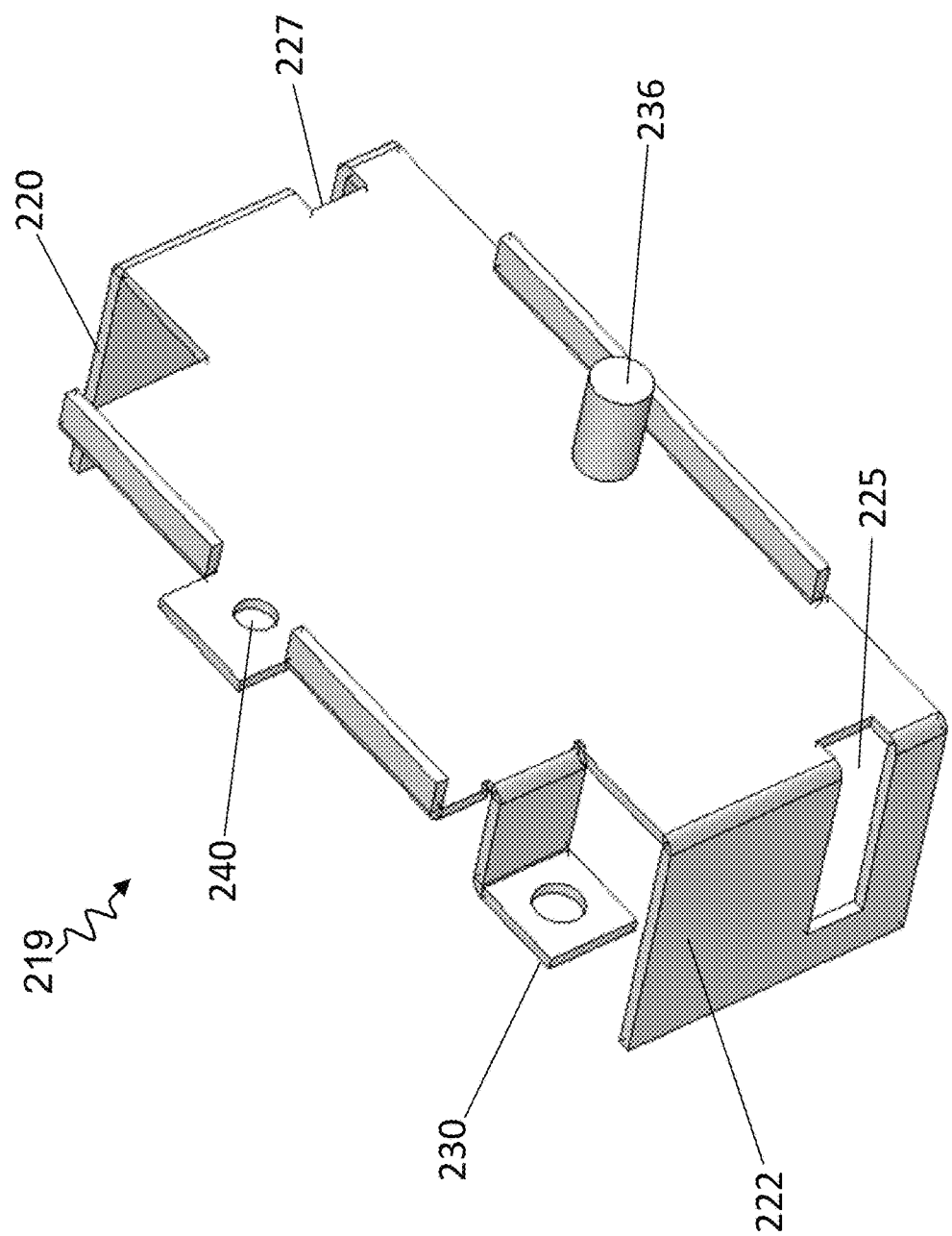
FIG. 35a is a perspective view of the rotation plate, according to another embodiment of the present invention.

With reference to FIGS. 34 and 35 and according to one embodiment of the present invention, the rotation plate 219 is shown in greater detail. The rotation plate 219 links the Lamp Assembly Unit 30 to the Light Fixture 5. The rotation plate 219 is comprised of a flat surface with first and second arm extension 220, 222. Each Arm extension contains a fastening chamber 225, 227, respectively. The flat region of the rotation plate 219 contains two centrally located bores, the pivot point 235, and the rotation limiter bore 240. The pivot lock 230 extends from the face of the rotation plate 219. In another embodiment of the present invention, FIG. 35a, the rotation plate is shown in greater detail. The rotation plate 219 rotates around the pivot axle 236.

Figure 36:
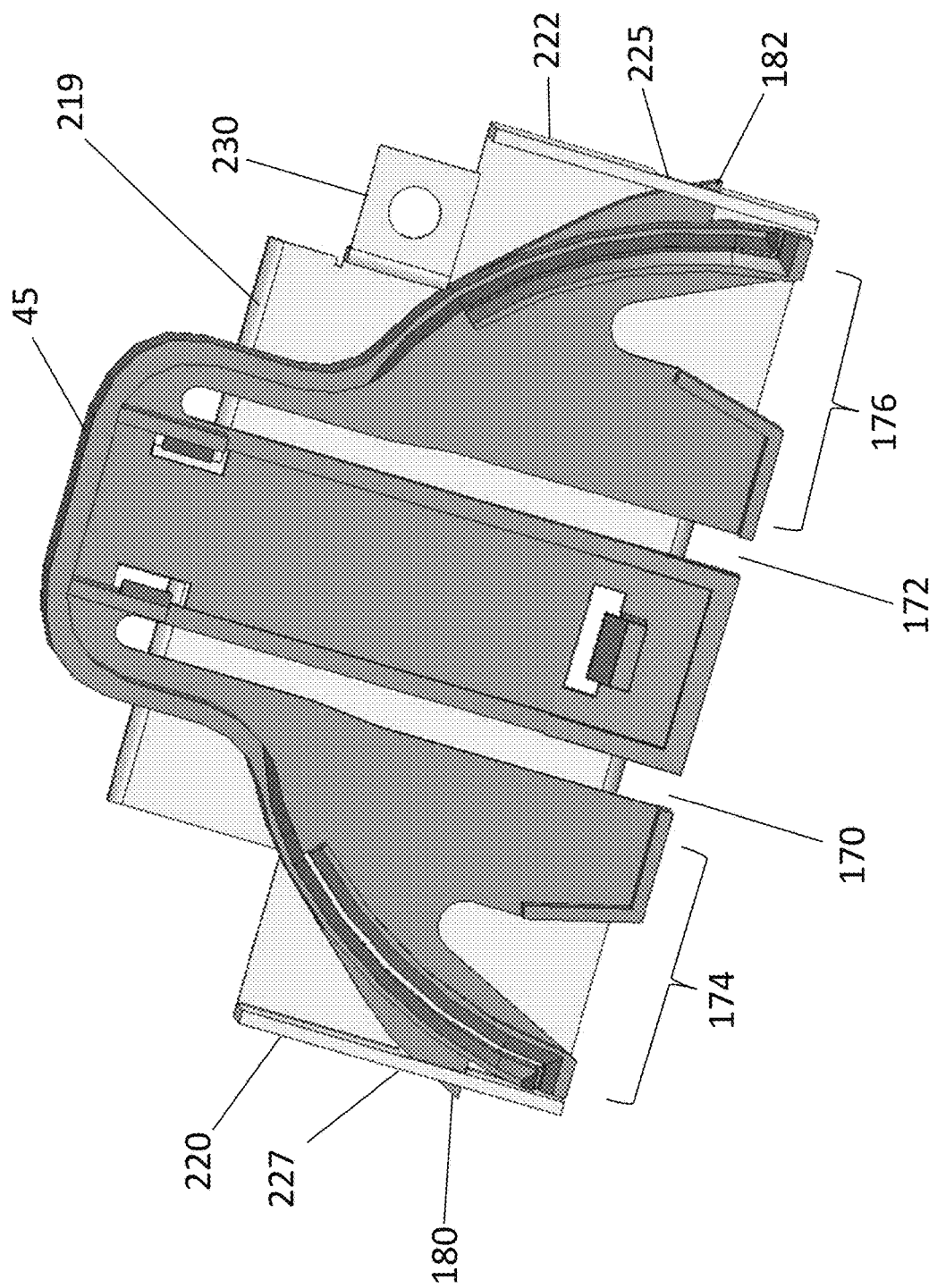
FIGS. 36 and 37 are perspective views of the module cap secured within the rotation plate, according to one embodiment of the present invention.
Figure 36A:
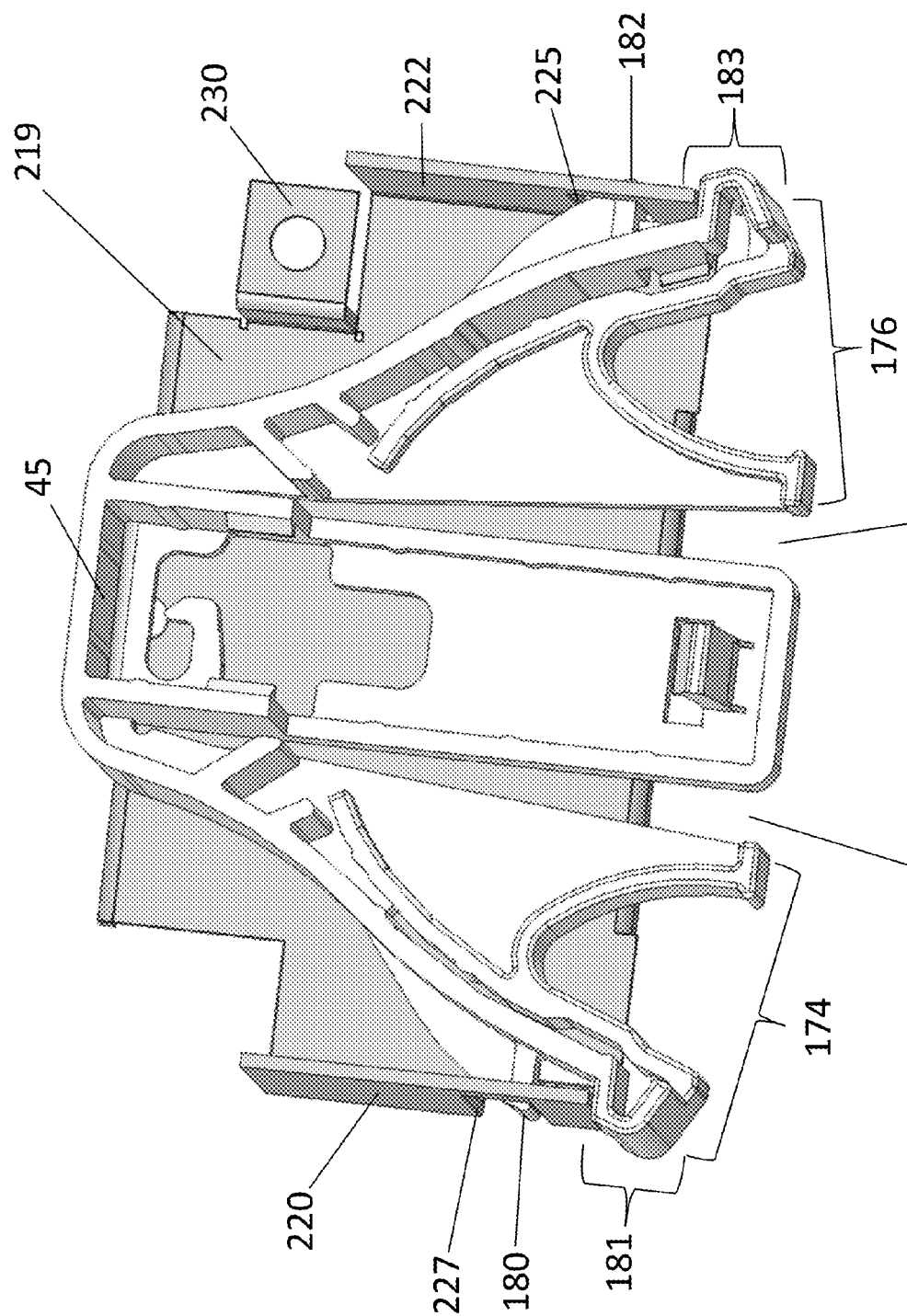
FIGS. 36a and 37a are perspective views of the module cap secured within the rotation plate, according to another embodiment of the present invention.
Figure 37:
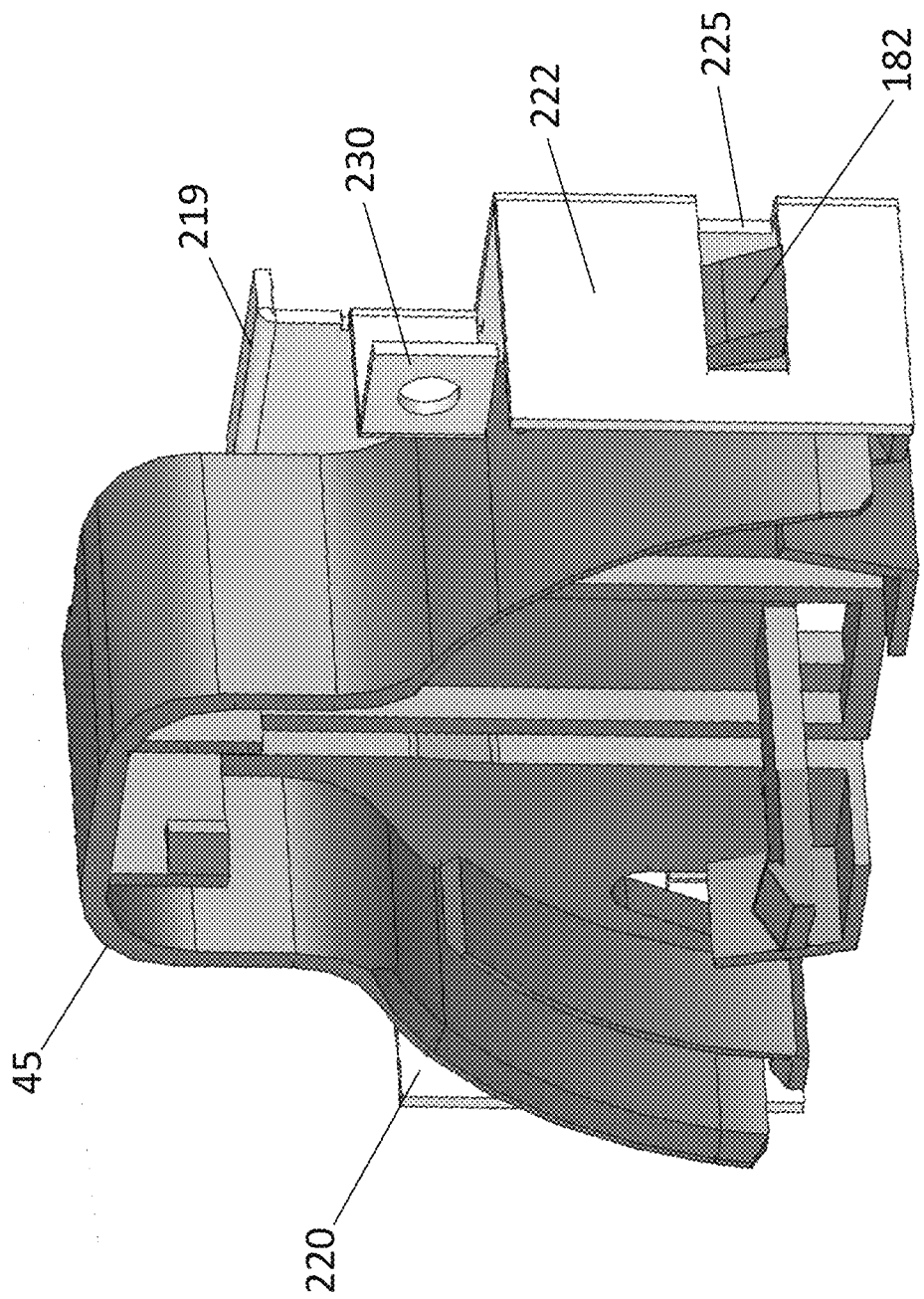
Figure 37A:
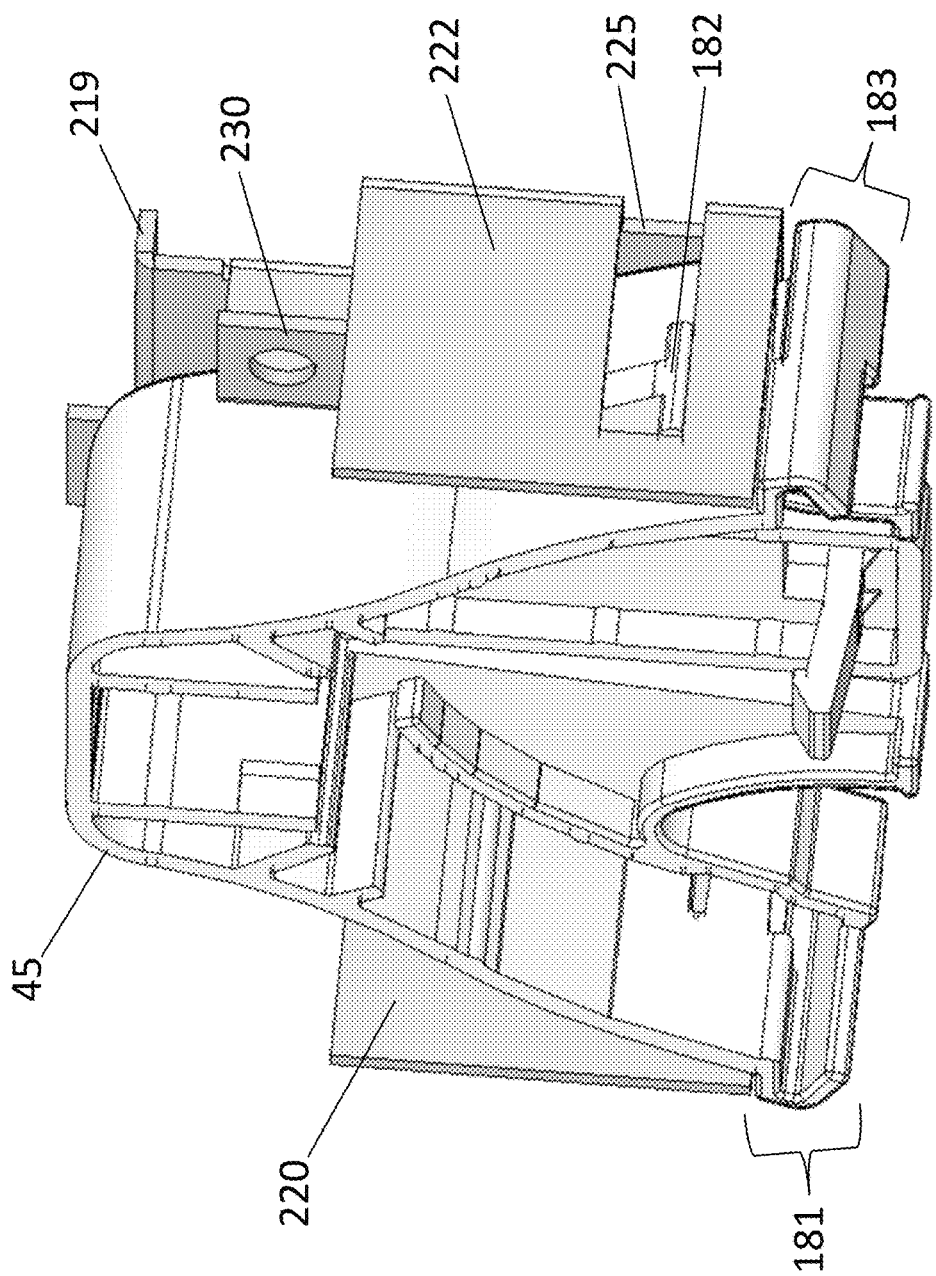

With reference to FIGS. 36 and 37 and according to one embodiment of the present invention, the rotation plate 219 is shown interacting with the first module cap 45. The first module cap 45 is secured into the rotation plate 219 by inserting the first and second Hook Clamps 180, 182 into the first and second Fastening Chambers 227, 225. The first module cap 45 is fitted into the rotation plate 219 by flexing the first and second module cap Arms 174, 176 through the compression gaps of the first and second compression cavity 170, 172. The interaction between the rotation plate 219 and the second module cap 47 is not shown for its interaction is identical to the interaction described above. In another embodiment of the present invention, FIG. 36a and FIG. 37a, the rotation plate 219 interacting with the first module cap 45 is shown in greater detail. The first and second platform shoulder 181, 183 further stabilize the interaction between the rotation plate 219 and the first module cap 45.

Figure 38:
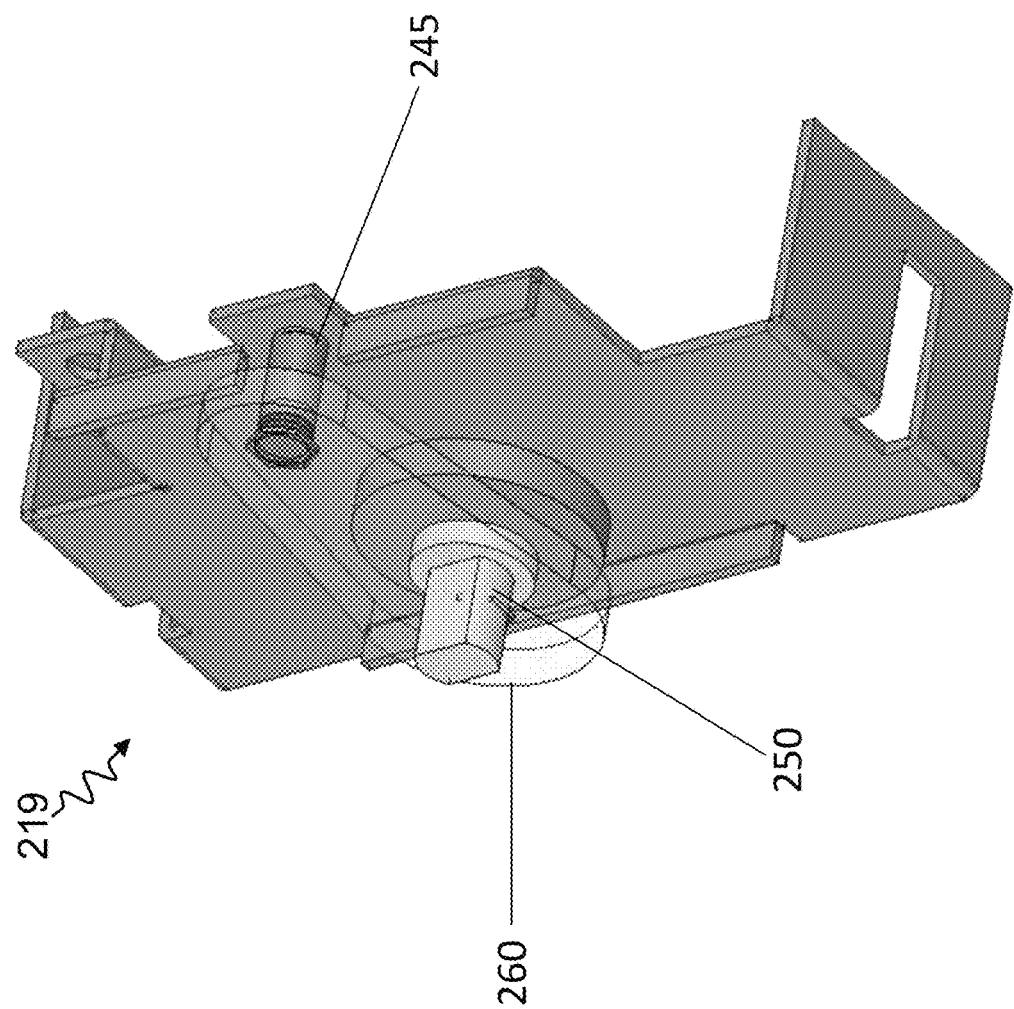
FIGS. 38 and 39 are perspective views of the rotation Mechanism attached to the rotation plate, according to one embodiment of the present invention.
Figure 39:
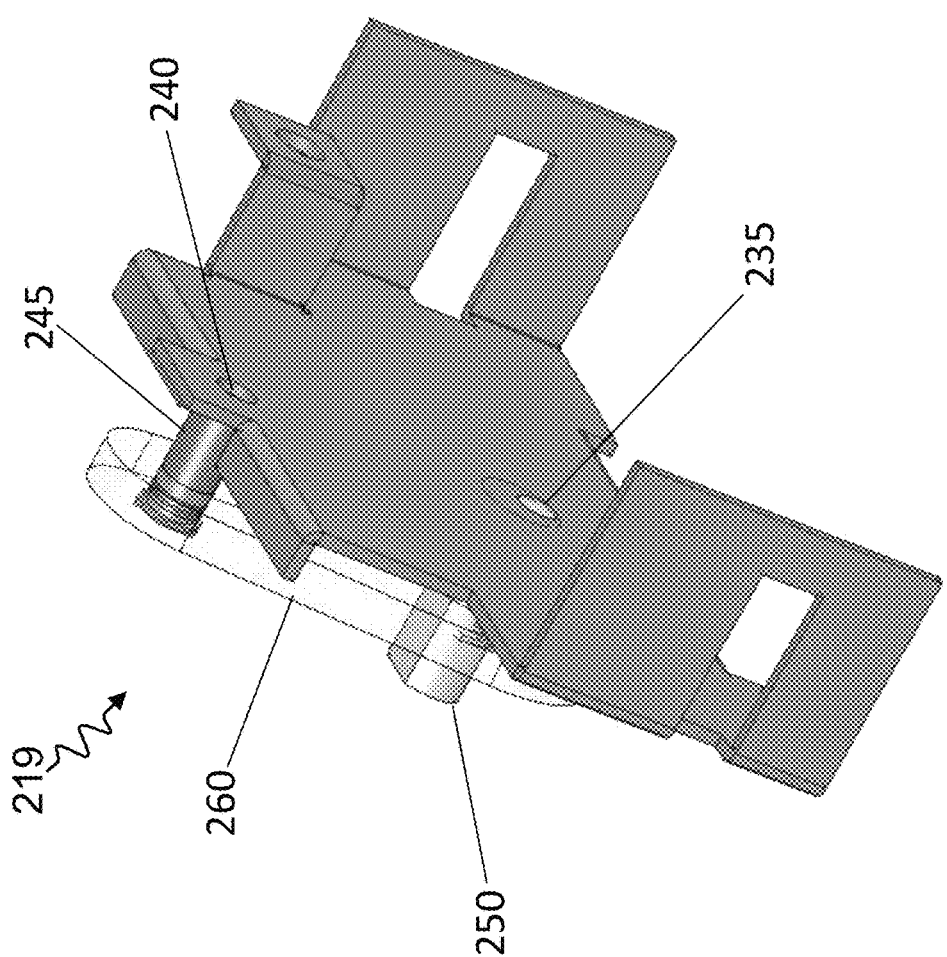

With reference to FIGS. 38 and 39 and according to one embodiment of the present invention, the rotation plate 219 is shown with the rotation mechanism attached. The Axle 250 and the rotation Limiter Bolt 245 are inserted into the rotation plate through the Pivot Point 235 and rotation Limiter Bore 240, respectively. The lever 260 (shown in clear) is attached to both the Axle 250 and the rotation Limiter Bolt 245.

Figure 40:
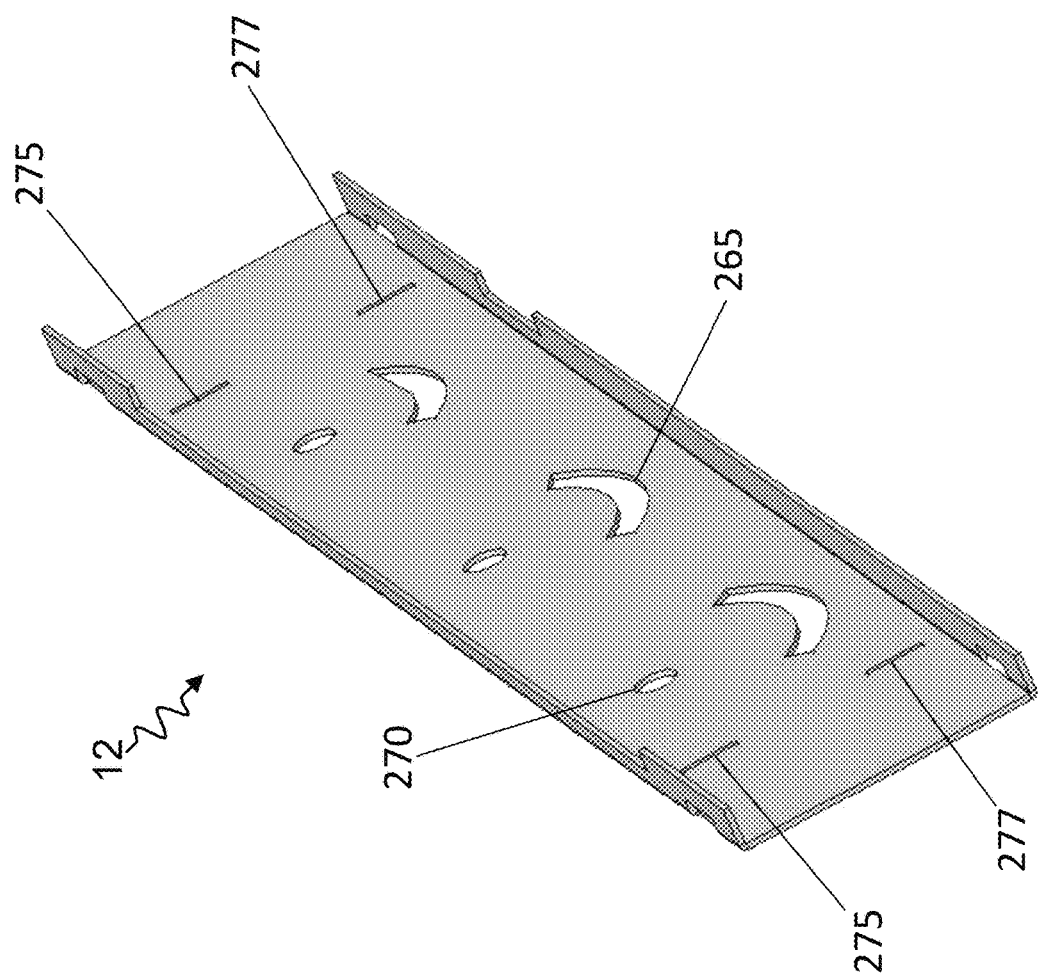
FIG. 40 is a perspective view of the end plate, according to one embodiment of the present invention.

With reference to FIG. 40 and according to one embodiment of the present invention, the first end plate 12 is shown in greater detail. The first end plate 12 is comprised of a flat surface and beveled edges. The flat portion of the first end plate 12 contains an aligned Axle Bore Chamber 270 and Curved Slot 265 set. The Axle Bore Chamber 270 and Curved Slot 265 sets are repeated throughout the first end plate 12. A worker skilled in the relevant art would appreciate that the repeated pattern will vary depending on the length of the end plate 12. The upper and lower driver channel Slits 275, 277 are positioned on the outer edges of the first end plate 12.

Figure 41:
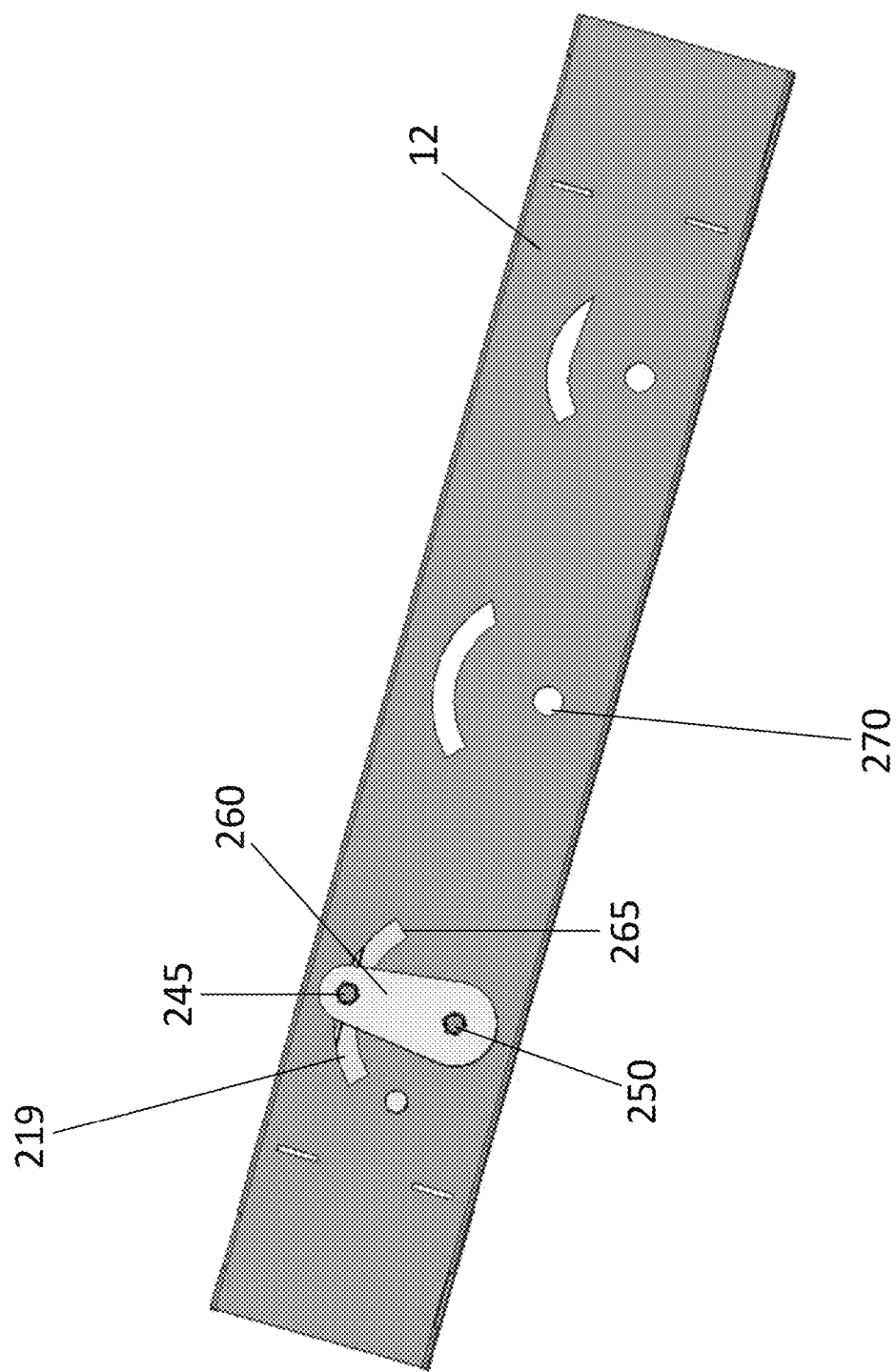
FIGS. 41, 42 and 43 are perspective views of the end plate interacting with rotation plate and the rotation mechanism, according to one embodiment of the present invention.
Figure 42:
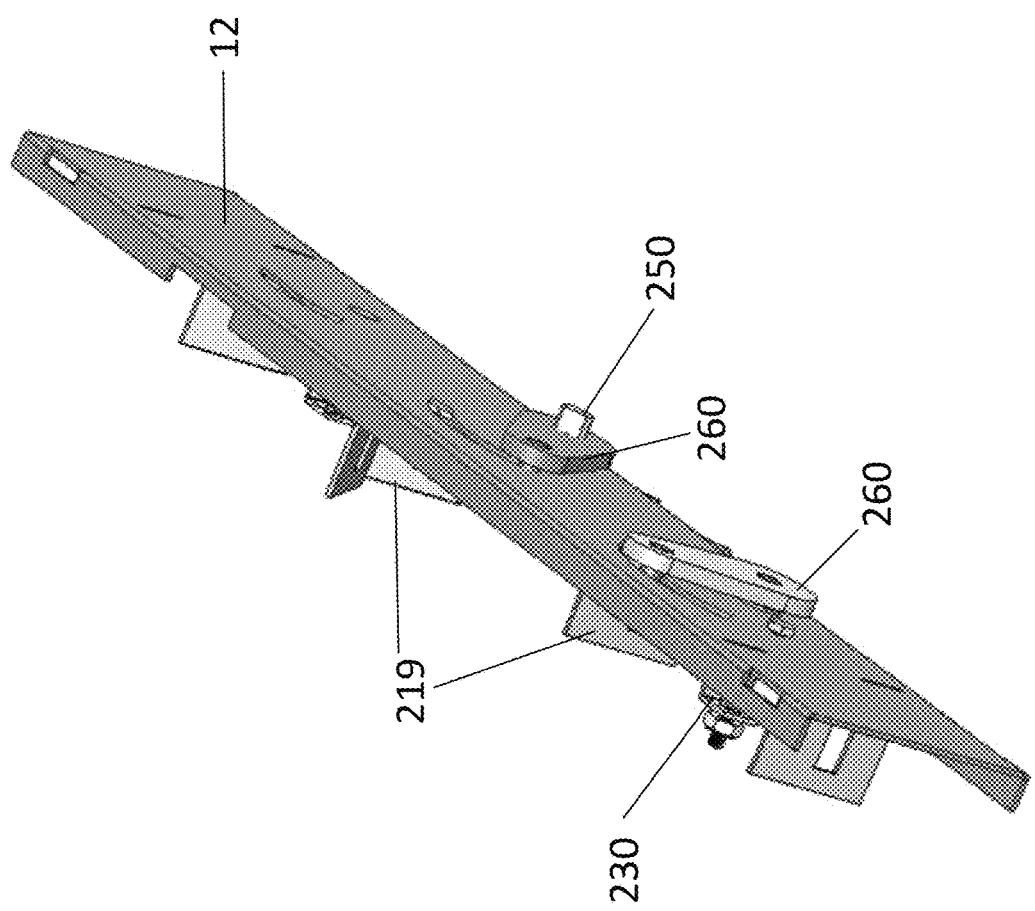
Figure 43:
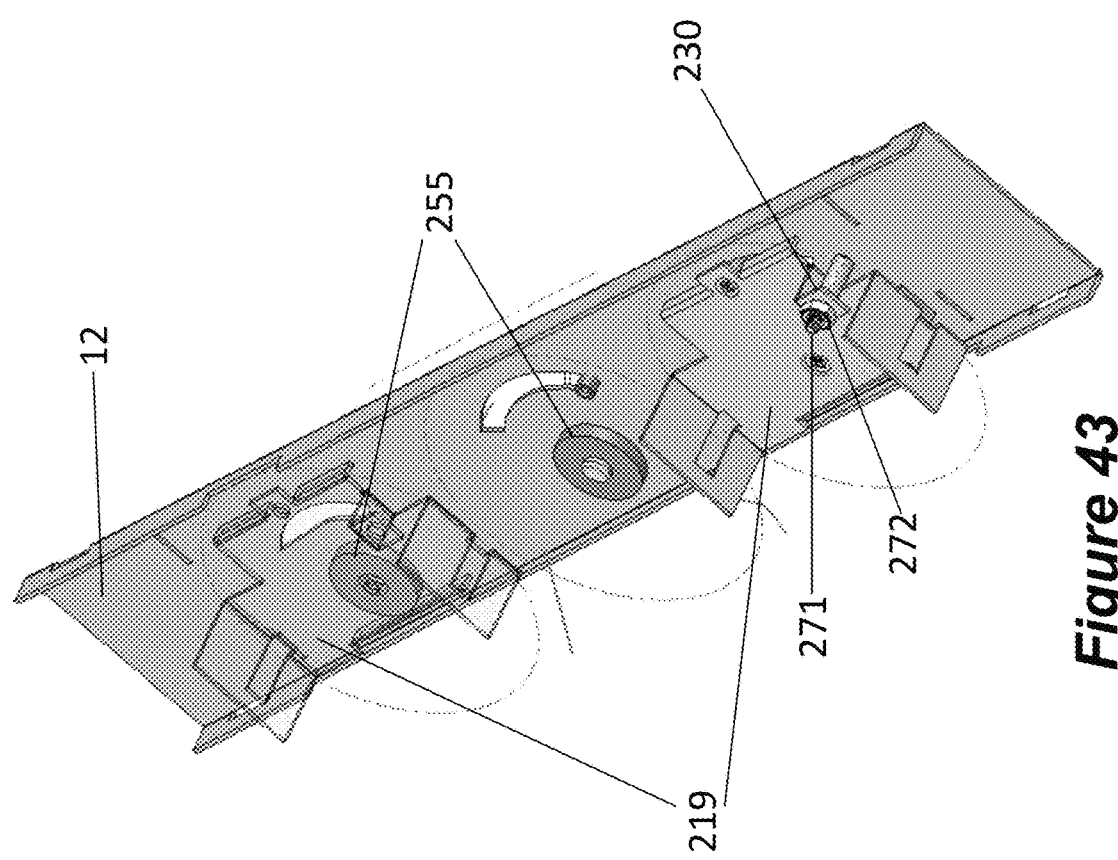

With reference to FIGS. 41 and 42 and according to one embodiment of the present invention, the first end plate 12 is shown interacting with the rotation plate 219 through the rotation mechanism. The lever 260 is position as to align with the Curved Slot 265 and the Axle Bore Chamber 270 on the back end of the first end plate 12. The lever 260 is not affixed to the first end plate 12 but is bolted to rotation plate 219. The Axle 250 and the rotation Limiter Bolt 245 pass through the first end plate 12 and link the lever 260 with the rotation plate 219. Thereby the lever 260 and the attached rotation plate 219 are free to rotate around the Axle 250 axis. The range of rotation is limited by the rotation Limiter Bolt's 245 degree of travel within the Curved Slot 265. The Pivot Lock 230 acts as a harness to lock the rotation plate 219 in the horizontal position. The locking mechanism of the Pivot Lock 230 can be seen in FIGS. 42 and 43 through the use of a bolt and nut positioned through the end plate 12 and plate 219. As clearly shown in FIG. 43, the Friction Gasket 255 is sandwiched between the first end plate 12 and the rotation plate 219 (shown in clear).

Figure 44:
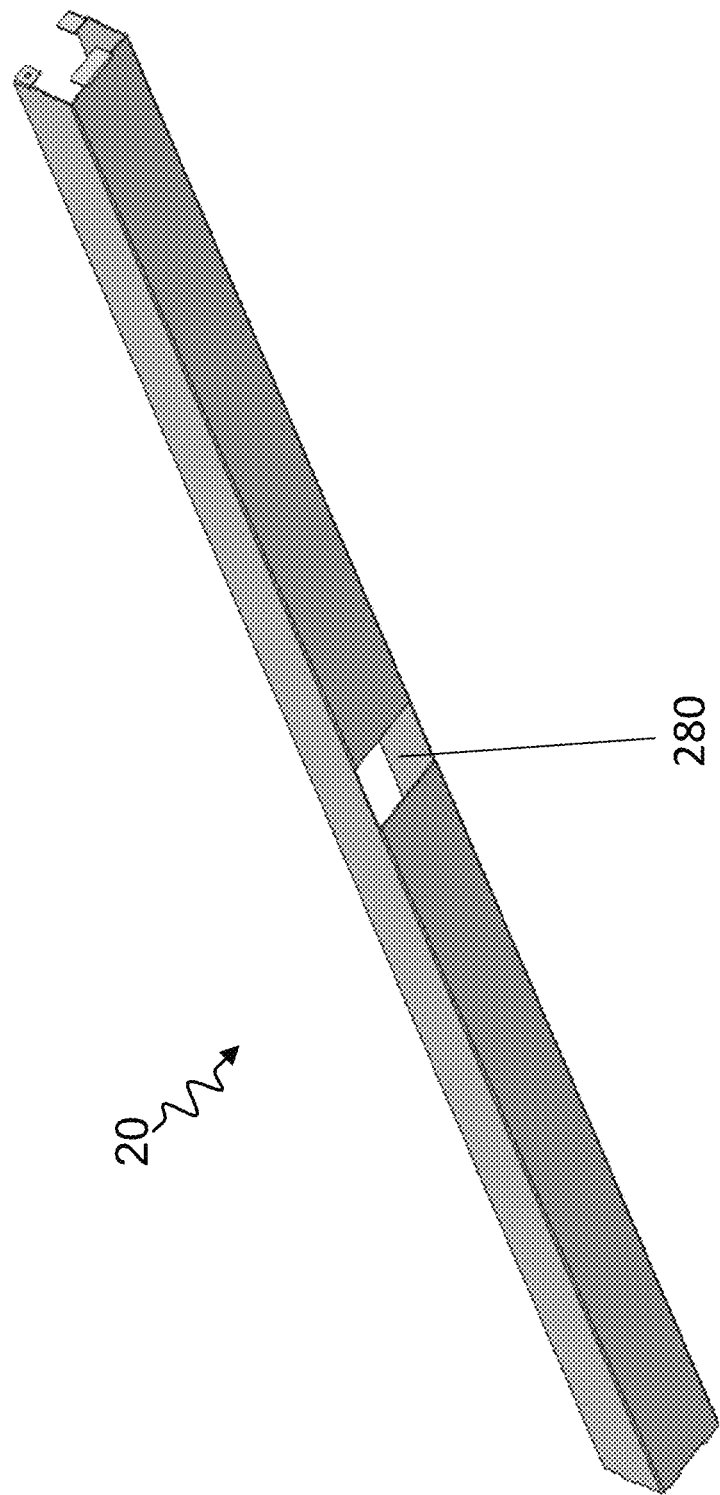
FIG. 44 is a perspective view of a driver channel for use in a Light Fixture or LED lighting system, according to one embodiment of the present invention.

With reference to FIG. 44 and according to one embodiment of the present invention, the driver channel 20 is shown in greater detail. The driver channel 20 is a three sided box with a Central Duct 280, and securing latches on the outer edges. A worker skilled in the relevant art would appreciate the variations in the length of the driver channel 20. A driver channel length can vary based on the amount of lamp assembly units required by the end user.

Figure 45:
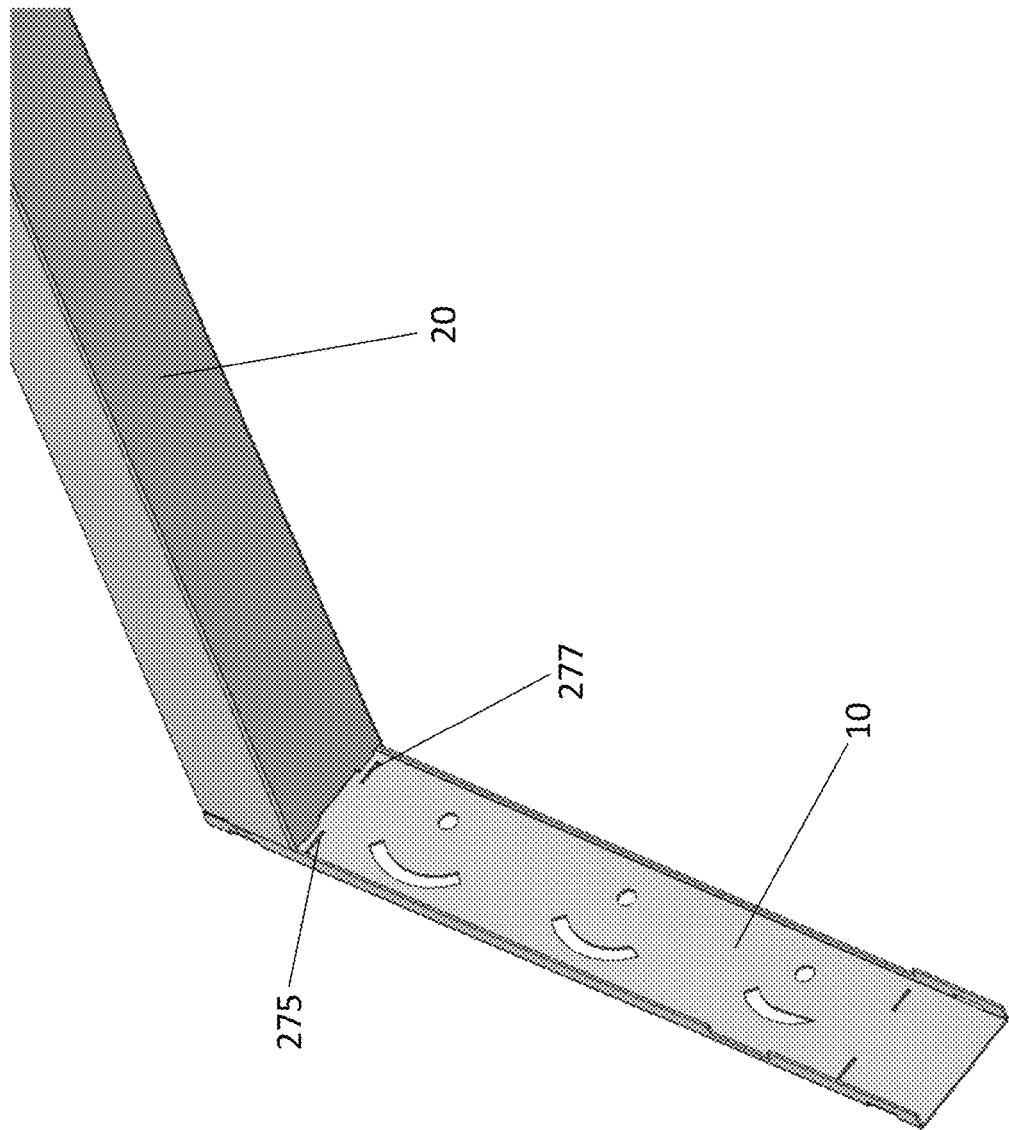
FIGS. 45 and 46 are perspective views of the driver channel fastened to the end plate, according to one embodiment of the present invention.
Figure 46:
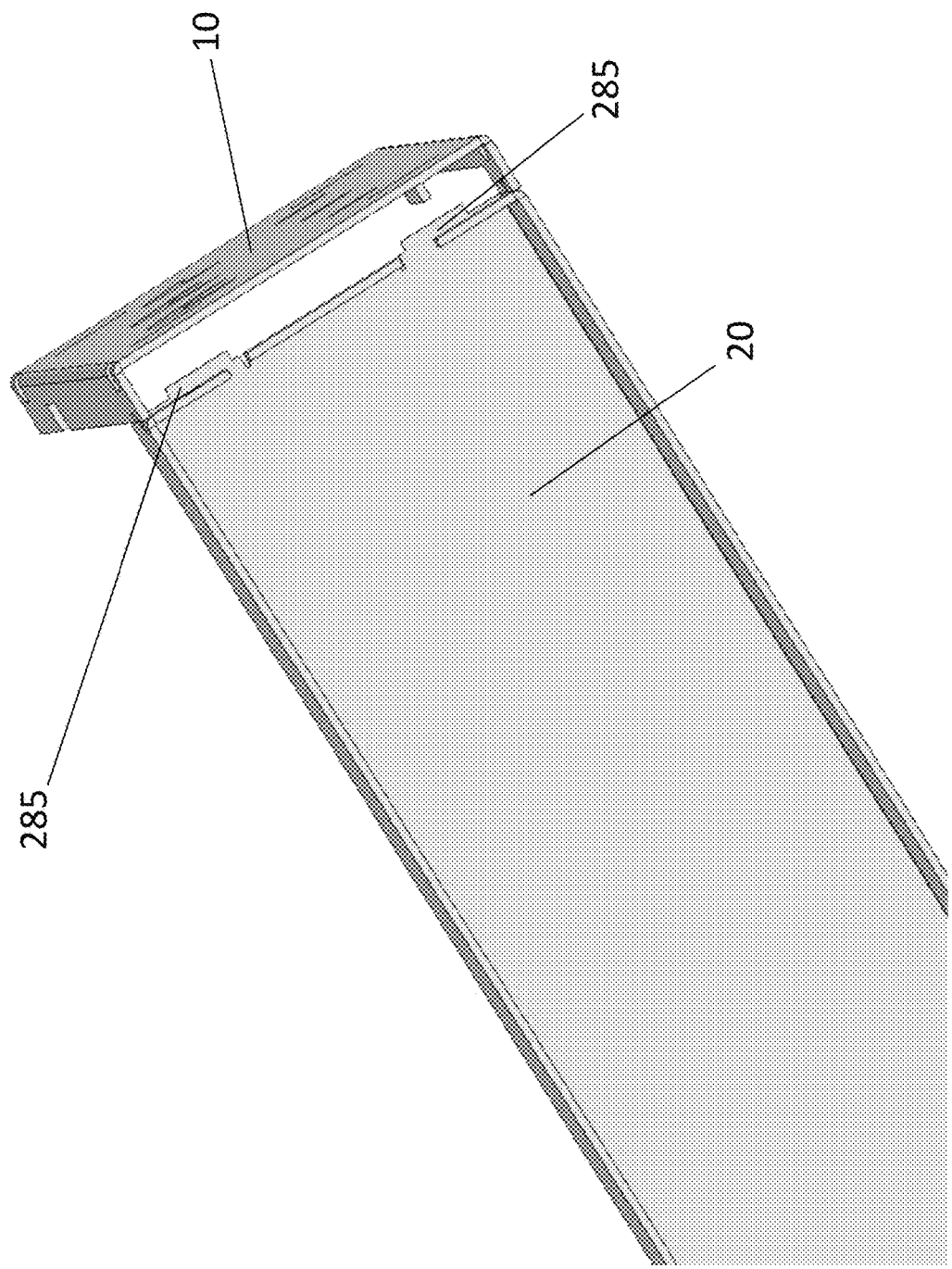

With reference to FIGS. 45 and 46 and according to one embodiment of the present invention, the driver channel 20 is shown to interact with the first end plate 10. The driver channel 20 attaches to the end of the first end plate 10 at a 90 degree angle. The driver channel 20 is locked into place through the interaction of the Securing Latches 285 with the upper and lower driver channel Slits 275, 277. A worker skilled in the relevant art would appreciate the various alternative locking mechanisms that can be employed attach the driver channel 20 to the first end plate 10. The interaction between the driver channel 20 and the second end plate 12 is identical to the interaction described above. As is the interaction between the second driver channel 22 with the first and second end plate 10, 12.

Figure 47:
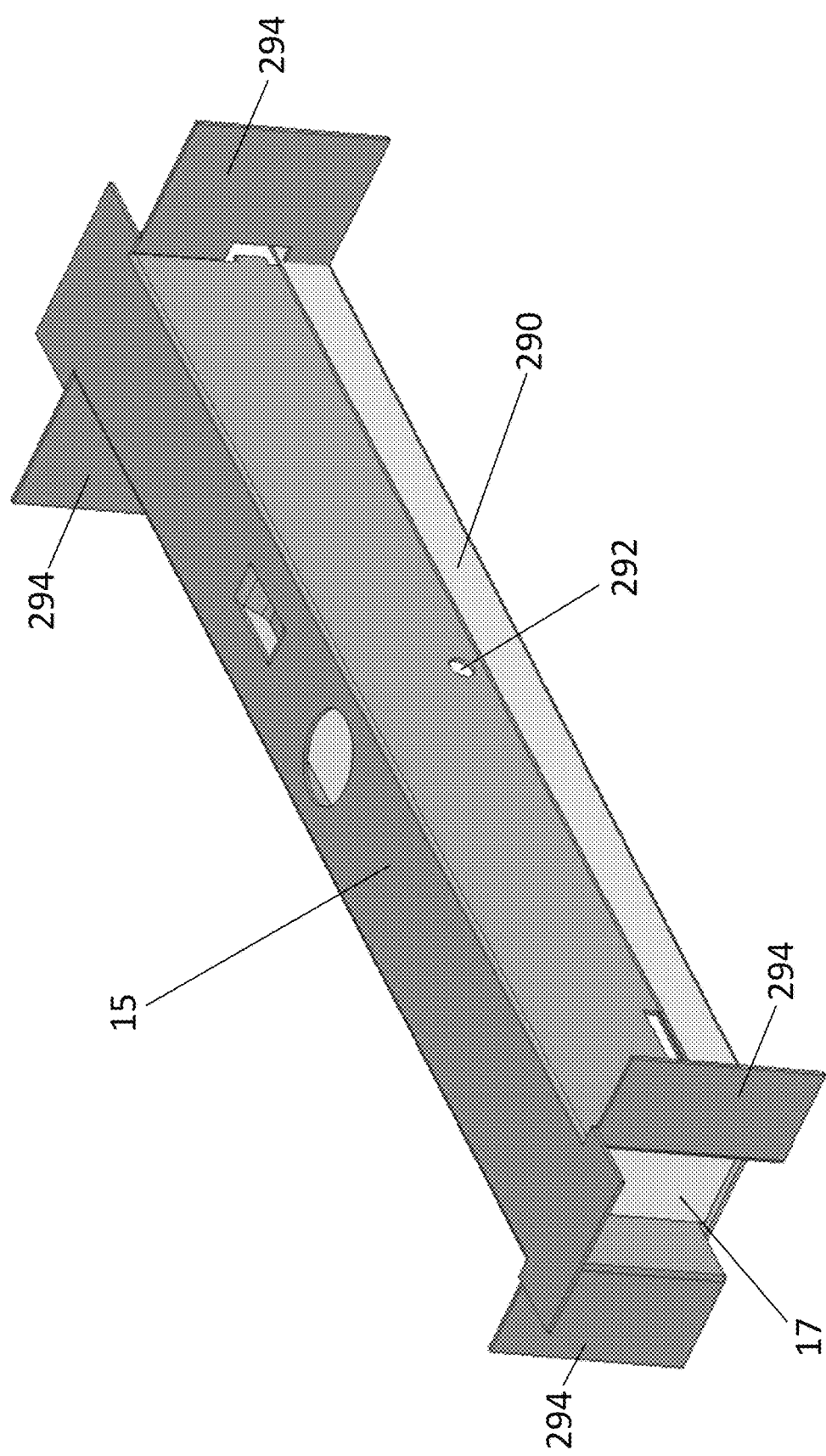
FIG. 47 is a perspective view of the hollow bridge encapsulating the Transformer, according to one embodiment of the present invention.
Figure 48:
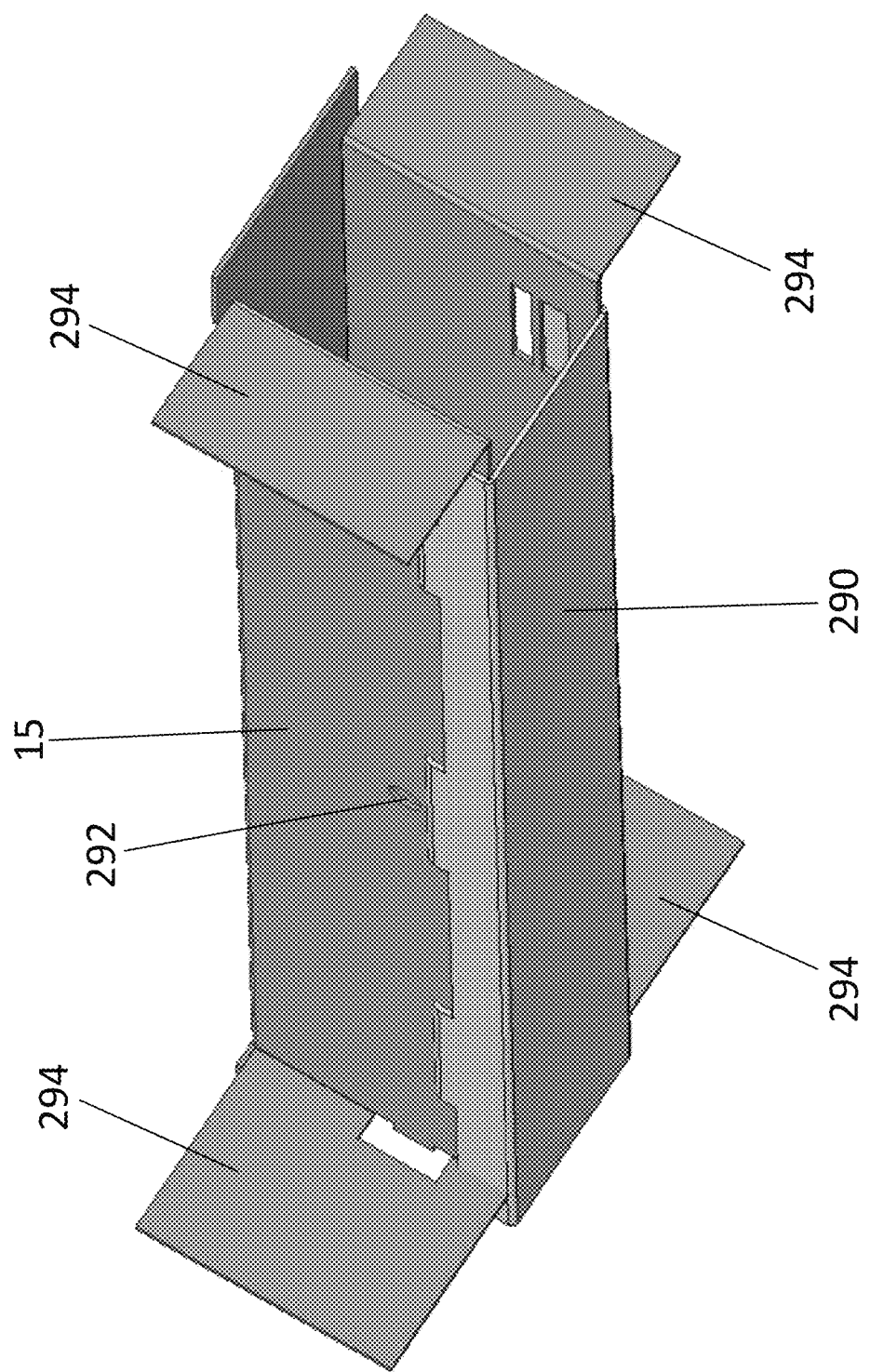
FIG. 48 is a perspective view of the of a capped hollow bridge, according to one embodiment of the present invention.

With reference to FIGS. 47 and 48 and according to one embodiment of the present invention, the hollow bridge 15 is shown in greater detail. The hollow bridge 15 is a three sided enclosure that encapsulates the Light Fixture Transformer 17. The overall shape of the hollow bridge 15 is dependent on: i) the size and shape of the Transformer 17 employed; and ii) the length of the first and second end plate 10, 12 (not shown). The area within hollow bridge 15 is encapsulated with the addition of hollow bridge Lid 290. A worker skilled in the relevant art would appreciate the various alternative fastening mechanisms that can be employed to enclose the Transformer 17 within the hollow bridge 15.

Figure 49:
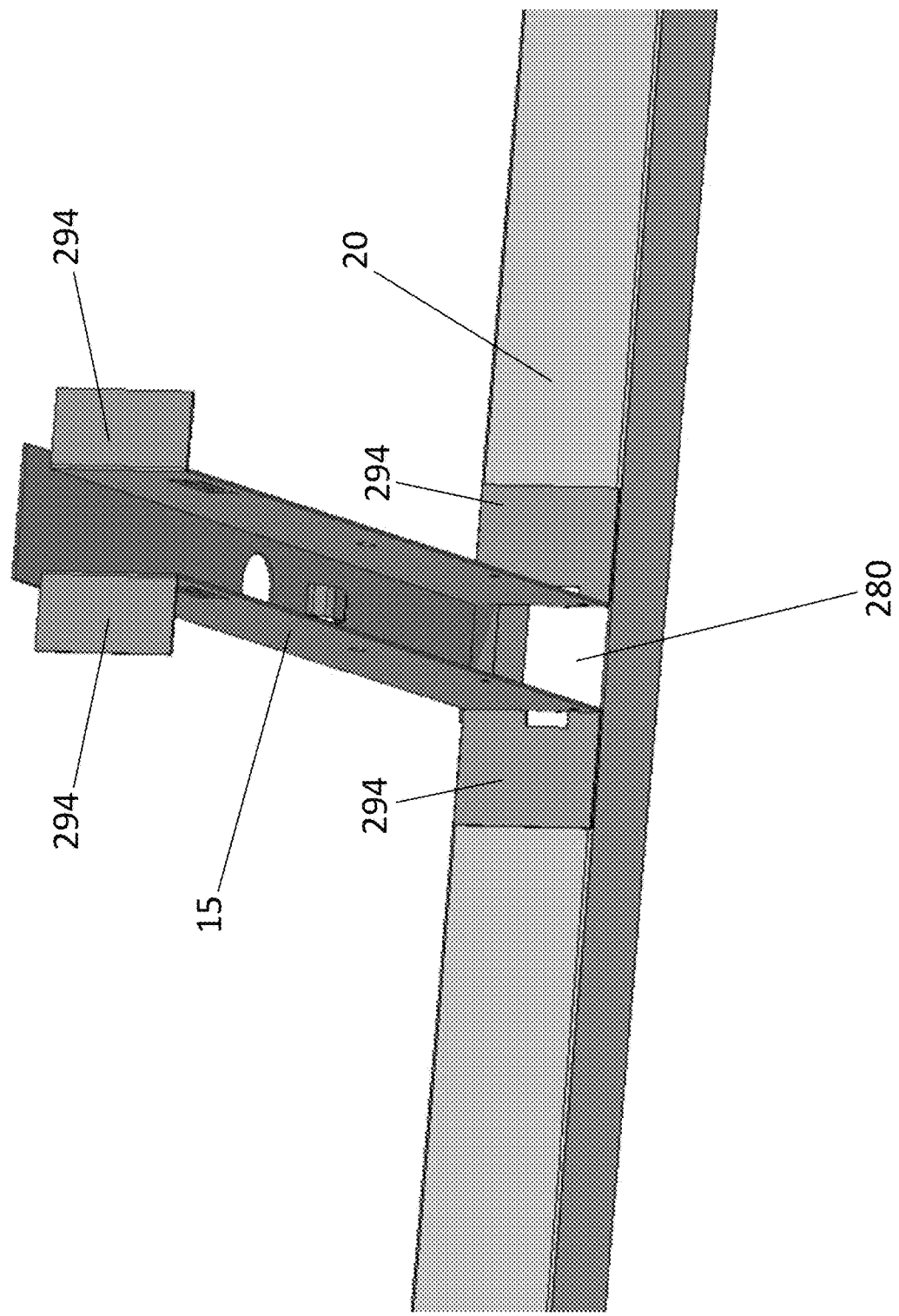
FIG. 49 is a perspective view of the driver channel interacting with the hollow bridge, according to one embodiment of the present invention.

With reference to FIG. 49 and according to one embodiment of the present invention, the driver channel 20 is shown interacting with the hollow bridge 15. The hollow bridge 15 sets on to the Central Duct 280 region of the driver channel 20 forming a truss. The hollow bridge 15 overhang rests on top of the driver channel 20, while the side protrusions brace against the wall of the driver channel. A worker skilled in the relevant art would appreciate the various alternative fastening mechanisms that can be employed to set the hollow bridge 15 onto the driver channel 20.

Figure 50:
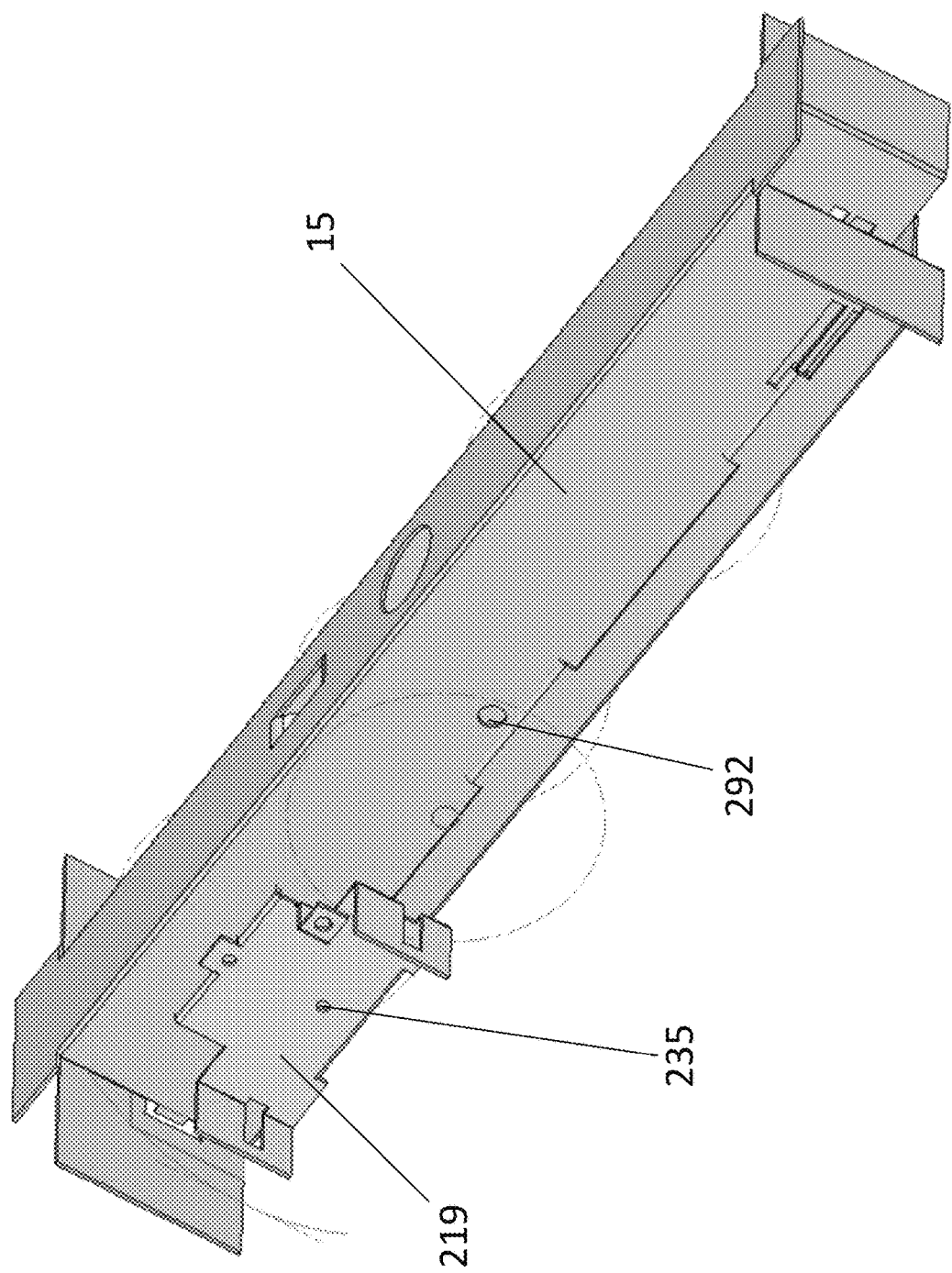
FIG. 50 is a perspective view of the rotation plate attached to the hollow bridge, according to one embodiment of the present invention.

With reference to FIG. 50 and according to one embodiment of the present invention, the rotation plate 219 is shown interacting with the hollow bridge 15. The rotation plate 219 is bolted onto the hollow bridge through the pivot point 235. The bolt gives the rotation plate 219 the ability to rotate freely on its axis. A worker skilled in the relevant art would appreciate the various alternative mounting mechanisms that can be employed to attach the rotation plate 219 onto the hollow bridge 15. The rotation plate 219 is positioned along the hollow bridge 15 in a manner that when attached within the Light Fixture 5 the rotation plate 219 will align horizontally and vertically with the corresponding rotation plate 219 on either first or second end plate (not shown).

Figure 51:
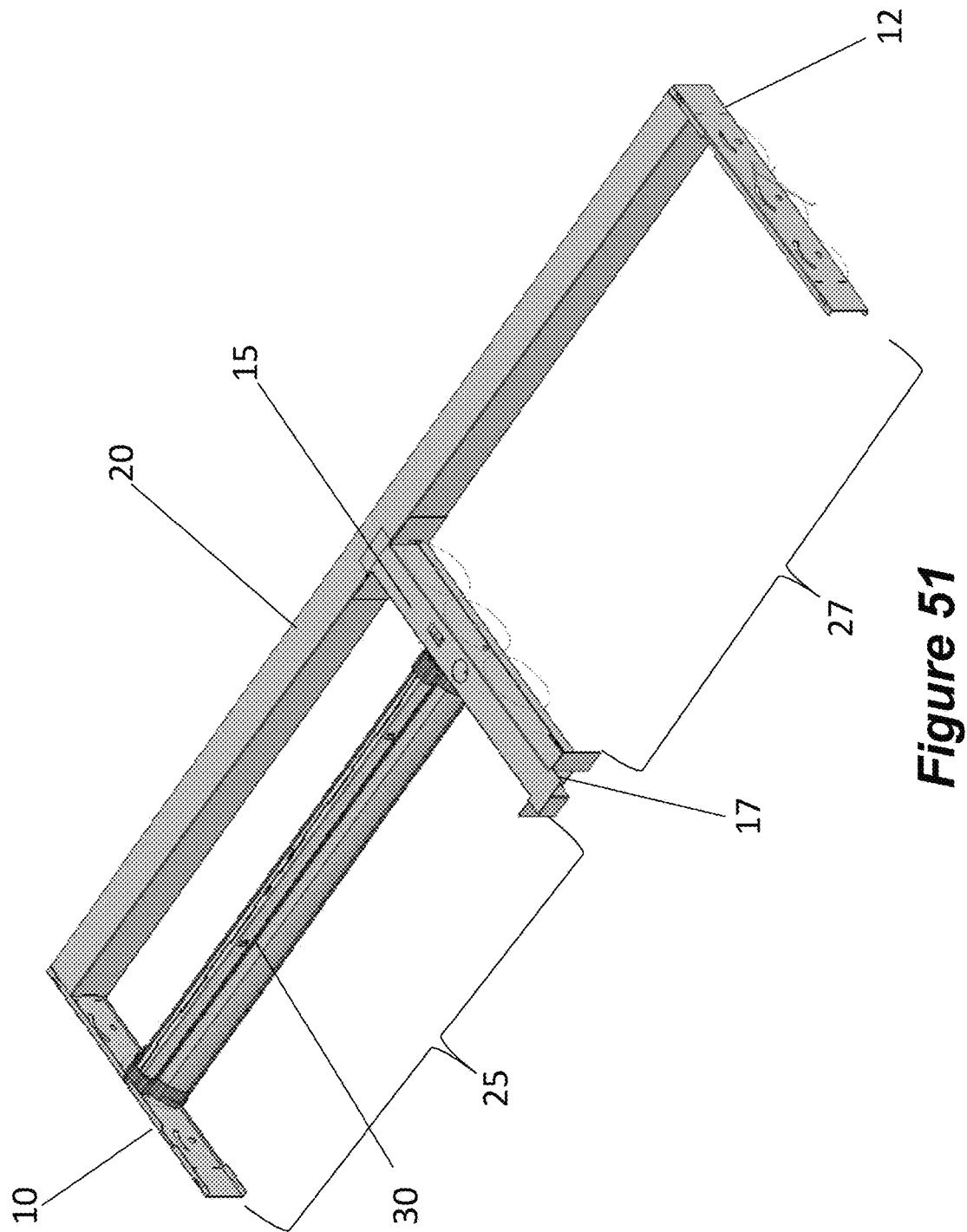
FIG. 51 is a perspective view of the Light Fixture containing a single Lamp Assembly unit, according to one embodiment of the present invention.

With Reference to FIG. 51 and according to one embodiment of the present invention, the complete High Bay Light Fixture is shown. The High Bay Light Fixture 5 is primarily comprised of first and second end plates 10, 12, a hollow bridge 15 containing the transformer 17, first and second driver channel 20, 22 (not shown), first and second opening 25, 27 each capable of housing multiple parallel lamp assembly units 30. Transformer 17 situated within the bridge 15 relays electrical input to individual lamp assembly units 30 attached within the High Bay Light Fixture 5.

4. Method for Controlling Light Intensity

Figure 52:
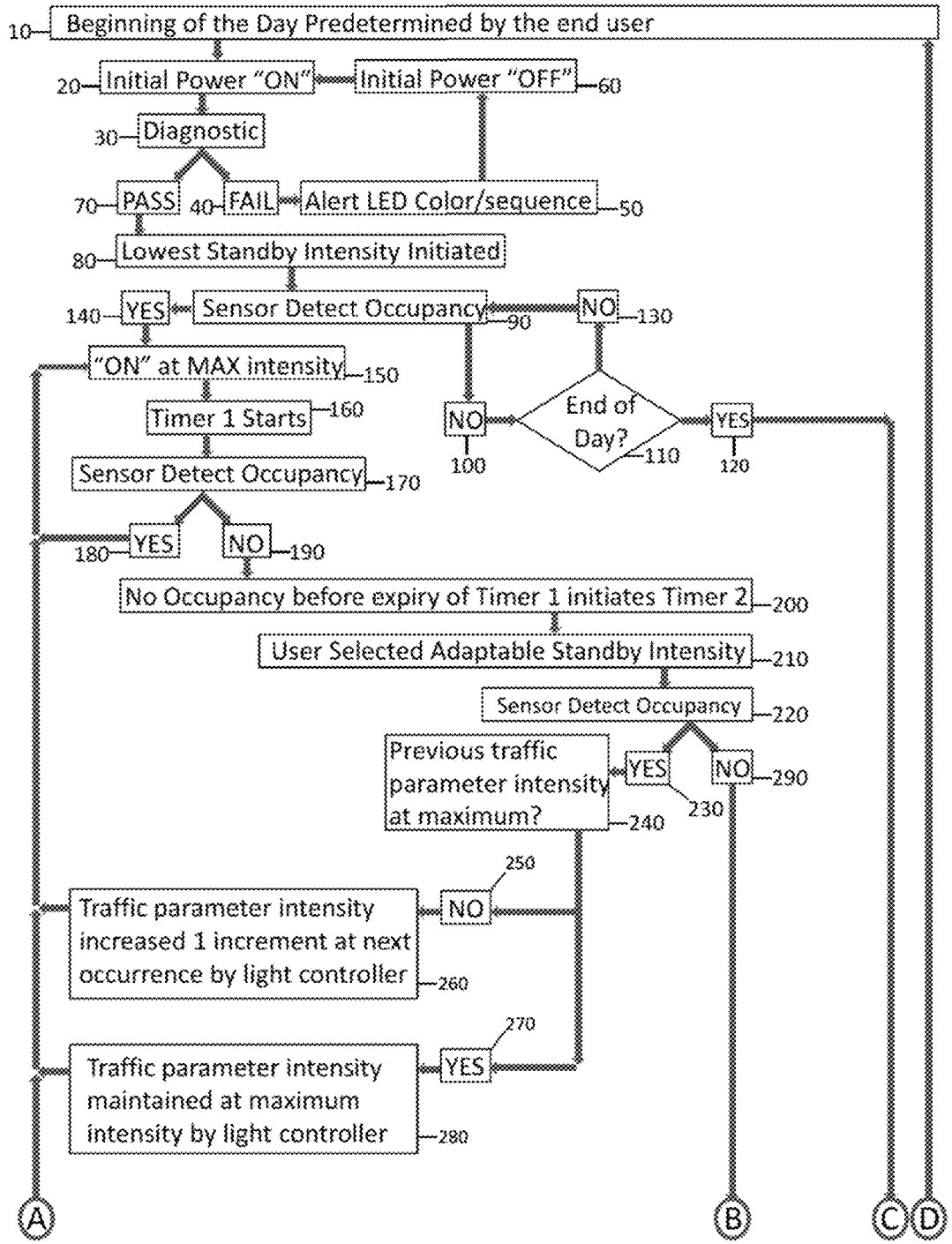
FIGS. 52 and 53 are perspective flow chart representing the method of controlling a lighting system, according to one embodiment of the present invention.
Figure 53:
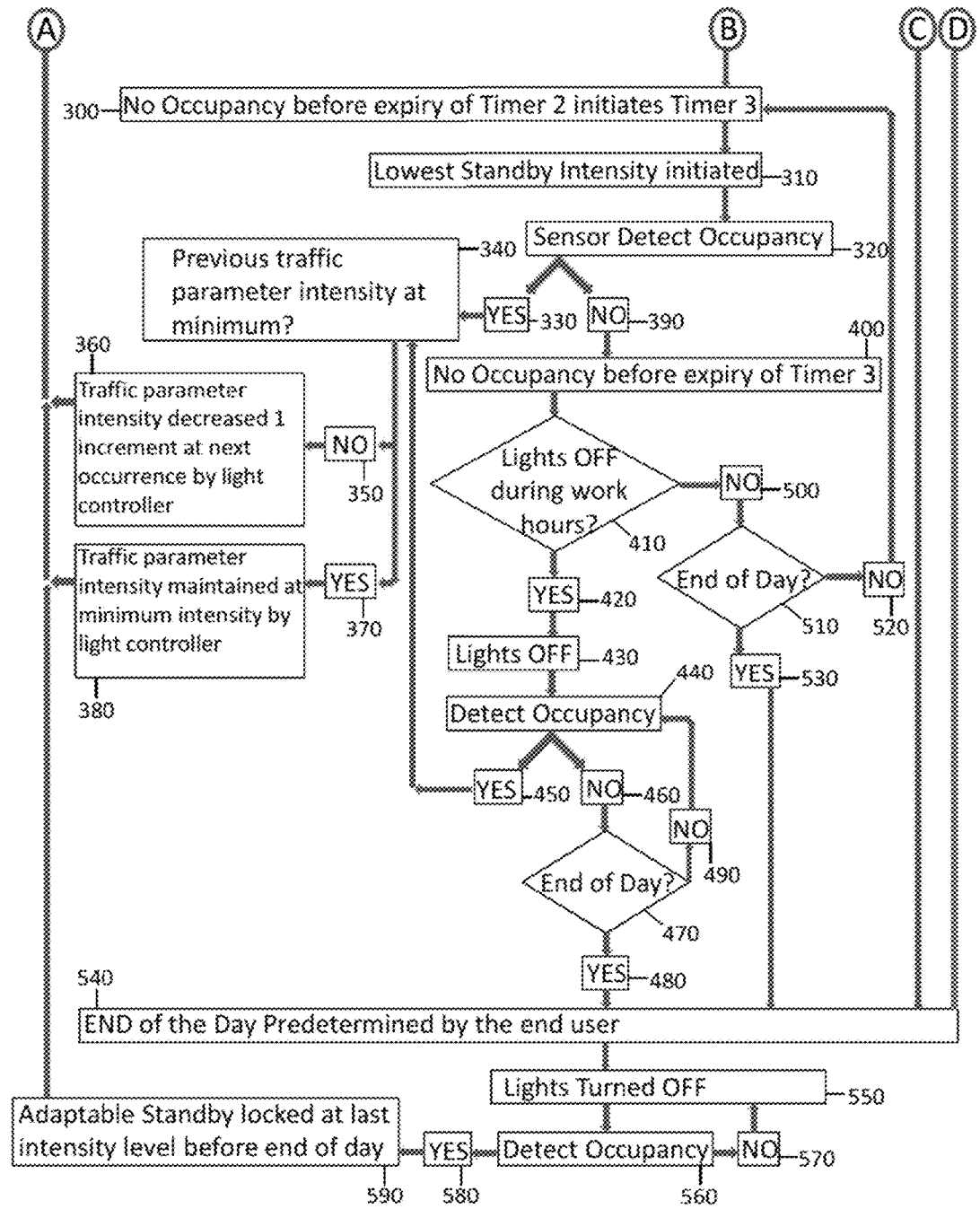

With reference to FIGS. 52 and 53, a method according to one embodiment of the present invention is described as follows:

With reference to step 10, the start of the day is initiated either by a user selected time, or by a detection of an occupant.

With reference to step 20, the system is activated.

With reference to step 30, the activated system runs a diagnostic to ensure that power is present, and the lights are functioning appropriately.

With reference to step 40, the diagnostic procedure has identified an error. The error can arise from a number of potential problems. A worker skilled in the relevant art would be able to identify the various issues that that can cause the system to fail.

With reference to step 50, the system alerts the occupier of the error with color sequence or a flashing sequence through the light. A worker skilled in the relevant art would appreciate the various methods and techniques potentially implemented to alert the occupant of an error.

With reference to step 60, the system attempts to resolve the issue by turning the initial power off and restarting the system from step 20. The system will continually cycle steps 20 through 60 until the error is fixed by the system or an individual. Alternatively, the system may shut down and give a failed signal after a set number of cycles.

With reference to step 70, the diagnostic procedure has not identified an error.

With reference to step 80, the lights are turned on. The lights are turned on to the user selected lowest standby intensity input.

With reference to step 90, the system scans for user occupancy. In one embodiment of the invention, the system detects occupancy through infrared motion sensor. In another embodiment of the invention, the system detects occupancy through ultrasonic sensors, alone or in combination with infrared sensors. A worker skilled in the relevant art would appreciate the various techniques and sensors that can be implemented to detect occupancy.

With reference to step 100, no occupancy is detected.

With reference to step 110, the system determines whether the current time is past the user selected end of day.

With reference to step 120, the system has determined that the current time is past the user selected end of day. Once the determination has been made, the cycle is pushed to step 540, end of day settings. The system will then proceed with end of day sequence.

With reference to step 130, the system has determined that the current time is earlier than the user selected end of day. Once the determination has been made, the system is returned to step 80, the lowest standby intensity until an occupant is detected.

With reference to step 140, the system has detected an occupant.

With reference to step 150, detection of an occupant increases light intensity to user selected maximum intensity level.

With reference to step 160, timer 1 is initiated. In one embodiment, timer 1 is defined as the initiating timer. The detection of an occupant initiates timer 1. The duration of timer 1 is selected by the user. Timer 1 continues to run as the system scans for continued occupancy.

With reference to step 170, the system continues to scan for repeated occupancy.

With reference to step 180, an occupant is detected before expiry of timer 1. The lights are maintained at user selected maximum intensity, and timer 1 will reset. Timer 1 will reset every instance an occupant is detected.

With reference to step 190, no occupant is detected before expiry of timer 1.

With reference to step 200, the expiry of timer 1 initiates timer 2.

With reference to step 210, the light intensity is decreased to user selected adaptable standby intensity level.

With reference to step 220, the system scans for occupancy.

With reference to step 230, an occupant is detected.

With reference to step 240, the system makes a determination whether the previous occupancy traffic parameter was at user selected maximum intensity.

With reference to step 250, the system has made a determination that the previous occupancy traffic parameter was not at user selected maximum intensity.

With reference to step 260 and on determination at step 250, the occupancy traffic parameter is incrementally increased in the next cycle. The increase in traffic parameter results in the increase in subsequent adaptable standby intensity. In the subsequent cycle, the system will also incrementally increase the duration of timers 1, 2, and 3. In addition, the system will increase the fade rate between light intensity changes. The system cycles back to step 150 and initiates maximum light intensity.

With reference to step 270, the system has made a determination that the previous occupancy traffic parameter was at user selected maximum intensity.

With reference to step 280, the subsequent occupancy traffic parameters will be maintained at user selected maximum intensity. As a result, the adaptable standby intensity duration of timer 1, 2, and 3, and fade rate speed will remain at maximum intensity. The system cycles back to step 150 and initiates maximum light intensity.

With reference to step 290, no occupant is detected before expiry of timer 2.

With reference to step 300, the expiry of timer 2 initiates timer 3.

With reference to step 310, the light intensity is decreased to user selected lowest standby intensity level.

With reference to step 320, they system scans for occupancy.

With reference to step 330, an occupant is detected.

With reference to step 340, the system makes a determination whether the previous occupancy traffic parameter was at user selected minimum intensity.

With reference to step 350, the system has made a determination that the previous occupancy traffic parameter was not at user selected minimum intensity.

With reference to step 360, the occupancy traffic parameter is incrementally decreased in the next cycle. The decrease in traffic parameter results in the decrease in subsequent adaptable standby intensity. In the subsequent cycle, the system will also incrementally decrease the duration of timers 1, 2, and 3. In addition, the system will decrease the fade rate between light intensity changes. The system cycles back to step 150 and initiates maximum light intensity.

With reference to step 370, the system has made a determination that the previous occupancy traffic parameter was at user selected minimum intensity.

With reference to step 380, the subsequent occupancy traffic parameters will be maintained at user selected minimum intensity. As a result, the adaptable standby intensity duration of timer 1, 2, and 3, and fade rate speed will remain at minimum intensity. The system cycles back to step 150 and initiates maximum light intensity.

With reference to step 390, no occupant is detected before expiry of timer 3.

With reference to step 400, timer 3 expires.

With reference to step 410, the system makes a determination based on parameters set by end user.

With reference to step 420, the end user has requested that the lights are to be turned off during work hours.

With reference to step 430, the lights are turned off.

With reference to step 440, they system scans for occupancy.

With reference to step 450, an occupant is detected. Upon detection of occupant at step 450, the system cycles back to step 340. The system then repeats all steps described above after step 340.

With reference to step 460, no occupant is detected.

With reference to step 470, a determination is made regarding user selected end of day parameter.

With reference to step 480, determination of end of day pushes the system to end of day sequence.

With reference to step 490, determination of user selected current work period cycles the system back to step 440, scanning for occupancy.

With reference to step 500, the end user has requested that the lights are to be kept on during work hours.

With reference to step 510, a determination is made regarding user selected end of day parameter.

With reference to step 520, determination of user selected current work period cycles the system back to step 300, resetting timer 3. The system then repeats all the steps described above after step 300.

With reference to step 530, determination of end of day pushes the cycle to end of day sequence.

With reference to step 540, user selected end of day has been reached.

With reference to step 550, the lights are turned off. User may select parameters that will keep certain or all lights maintained at emergency level intensity.

With reference to step 560, the system scans for occupancy.

With reference to step 570, no occupant is detected. The system cycles back to step 550, maintaining the lights off and continued scanning for occupancy.

With reference to step 580, an occupant is detected.

With reference to step 590, detection of occupant after end of day parameter cycles the system back to step 150, powering the lights to maximum intensity. The after-hours cycle is not adaptable, it is locked to the intensity level of the last working hours cycle.

Figure 54:
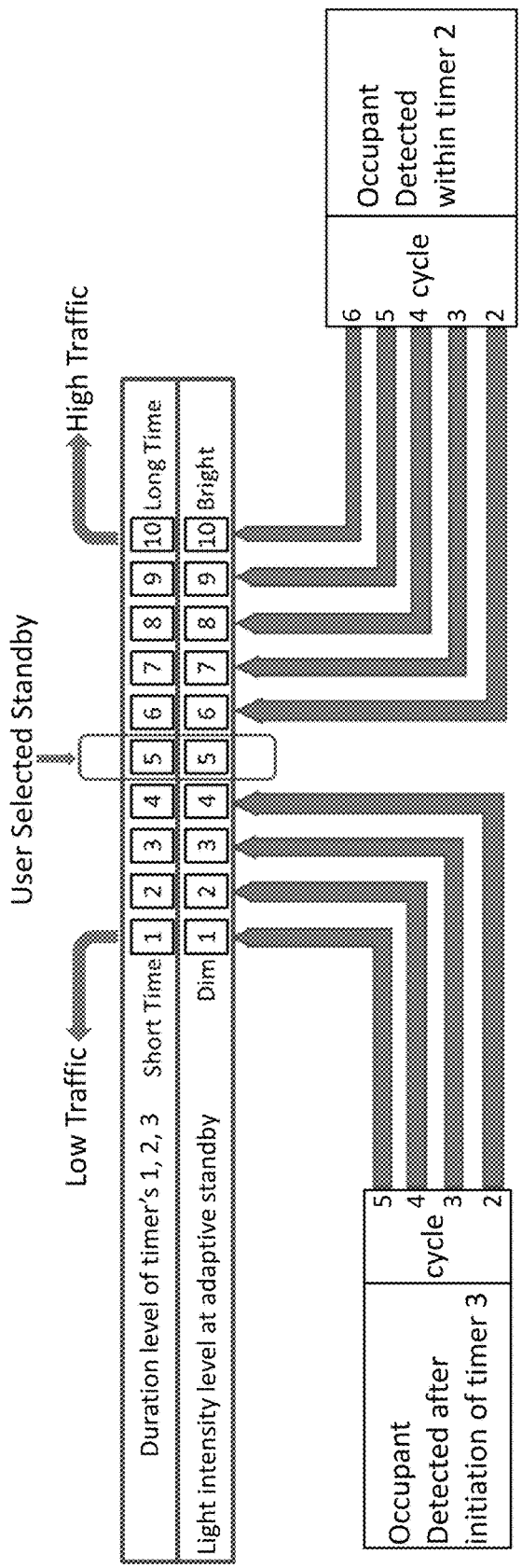
FIG. 54 is a perspective flow chart representing the cycling process employed by the method of controlling a lighting system, according to one embodiment of the present invention.

With reference to FIG. 54, the cycling of traffic parameters according to a method of the present invention is shown in greater detail. The system can detect high and low traffic areas and adjust the light intensity accordingly. Traffic flow is not static, it fluctuates and as such the lighting system needs to adapt to the change and alter light intensities. One embodiment according to a method of the present invention alters the light intensity and duration through 10 user selected increments. A worker skilled in the relevant art would appreciate the variations that can be used to modify the increments size or use of algorithms to modify incremental changes.

Upon initiation of the system the end user selects a user selected adaptable standby parameter. The standby parameter affects light intensities and light durations. For illustrative purposes, the selected standby for both duration and intensity is set at level 5. The user can vary the standby level to any one of the 10 preset levels and can choose intensity and duration independently. Factory settings attempt to minimize the nuisance of incessant light fluctuation by setting the standby parameter at level 10, the maximum traffic rate. Thereby, upon installation and initial traffic sampling period, the light intensity observed by the end user in high traffic areas is continuous. The light intensity in low traffic areas will fluctuate, but because of the low traffic rate the fluctuation will affect few users.

The end user also selects the maximum and minimum intensity levels which will correspond to high and low traffic areas, respectively. The low traffic level not only corresponds to the minimum adaptable intensity but also applies to the lowest standby intensity at step 310. Similarly, high traffic level corresponds to maximum adaptable standby intensity and operating intensity upon detection of occupant at step 150.

The system operates on a continuous cycle that modifies the user selected standby parameter incrementally upon the commencement of the next cycle. The incremental change occurs upon detection of an occupant, which is also responsible for the initiation of a new cycle. Depending on the point in the cycle that an occupant is detected affects the incremental change in the adaptable standby parameter. A change in the standby parameter will affect: the adaptable standby intensity; the duration of light at timers 1, 2, and 3; and the fade rate. A move towards high traffic will increase the light intensity at adaptable standby, increase duration of light at timers 1, 2, and 3, and increase the fade rate. A move towards low traffic will decrease the light intensity at adaptable standby, decrease the duration of light at timers 1, 2, and 3, and decrease the fade rate.

Incremental increase in the standby parameter occurs upon the detection of an occupant within timer 2, at step 230. The standby parameter will move from level 5, to level 6 upon the commencement of cycle 2. In the next cycle, cycle 2, occupant detection within timer 2, at step 230 will increase the standby parameter once again from its current position, at level 6, to level 7 in the next cycle. If at any point the maximum high traffic parameter is reached and an occupant is detected within timer 2, the standby level will stay at position 10 upon the commencement of the next cycle.

Similarly, the decrease in the standby parameter occurs upon the detection of an occupant at any point after the commencement of timer 3 at either step 330 or 450. The standby parameter will move from level 5, to level 4 upon the commencement of cycle 2. In the next cycle, cycle 2, occupant detection after the commencement of timer 3 at either step 330 or 450 will decrease the standby parameter once again from its current position, at level 4, to level 3 in the next cycle. If at any point the minimum low traffic parameter is reached and an occupant is detected after the commencement of timer 3, the standby level will stay at position 1 upon the commencement of the next cycle.

A worker skilled in the relevant art can appreciate that the starting user selected standby intensity can be set at any increment ranging from 0, the lowest intensity, to 10, the highest intensity. Factory settings attempt to minimize the nuisance of incessant light fluctuation by setting the standby adaptable intensity level at maximum high traffic rate. Thereby, upon installation and initial traffic sampling period, the light intensity observed by the end user in high traffic areas is maintained. While in low traffic areas the light intensity fluctuates, but because of the low traffic rate it affects few users and maximum power is saved.

A light controller detects the surrounding environment in a number of ways employing a number of mechanisms. Sensors embedded in the light controller are used in operation of the method program to sample the surround environment and adjust the light intensity accordingly. A passive infrared sensor (PIR) is employed to detect the presence of an occupant within the surrounding area. PIR sensor detects occupancy through body heat and the resultant abrupt change in surrounding temperature. In addition, a daylight sensor is employed in conjunction with the passive infrared sensor. The daylight sensor detects the illuminance of the surrounding area in order to maintain constant quantity of illumination. The intensity of the LED lighting is constantly adjusted to reflect the incoming natural luminous flux. A worker skilled in the relevant art would appreciate the various methods (OR devices) that can be employed to detect occupancy and sense the surrounding area.

Programming of the lighting system is executed through the utilization of commonly used chip boards. The chip boards serve two functions: 1. Cycling of the lighting system through the method program; 2. Analyzing the information obtained by the sensors and adjusting the method program incrementally upon the commencement of the next cycle. The chip board can be mounted as a single unit, or in conjunction with multiple chip boards. Chip board location can be within the sensor system or in any location along the light box that protects the chips from the elements and allows them to perform their function.

Programming the chip boards with the user selected adaptable standby parameter is accomplished through a remote control or through a USB cable (standard, mini or micro). The user programs the remote control with the selected adaptable standby parameter. Programming can be accomplished through a computer upload, or through manual input on the remote. A worker skilled in the relevant art would appreciate the various methods of downloading a cycle program onto a remote. The user selects the light boxes that will be programmed by pointing the remote control towards the light box. The information is relayed to the chip boards located within light box units by an infrared signal transmitted through the PIR. A worker skilled in the relevant art would appreciate the various methods for transferring data from the remote to the light box chip board.

5. Universal Mounting Bracket

Figure 55:
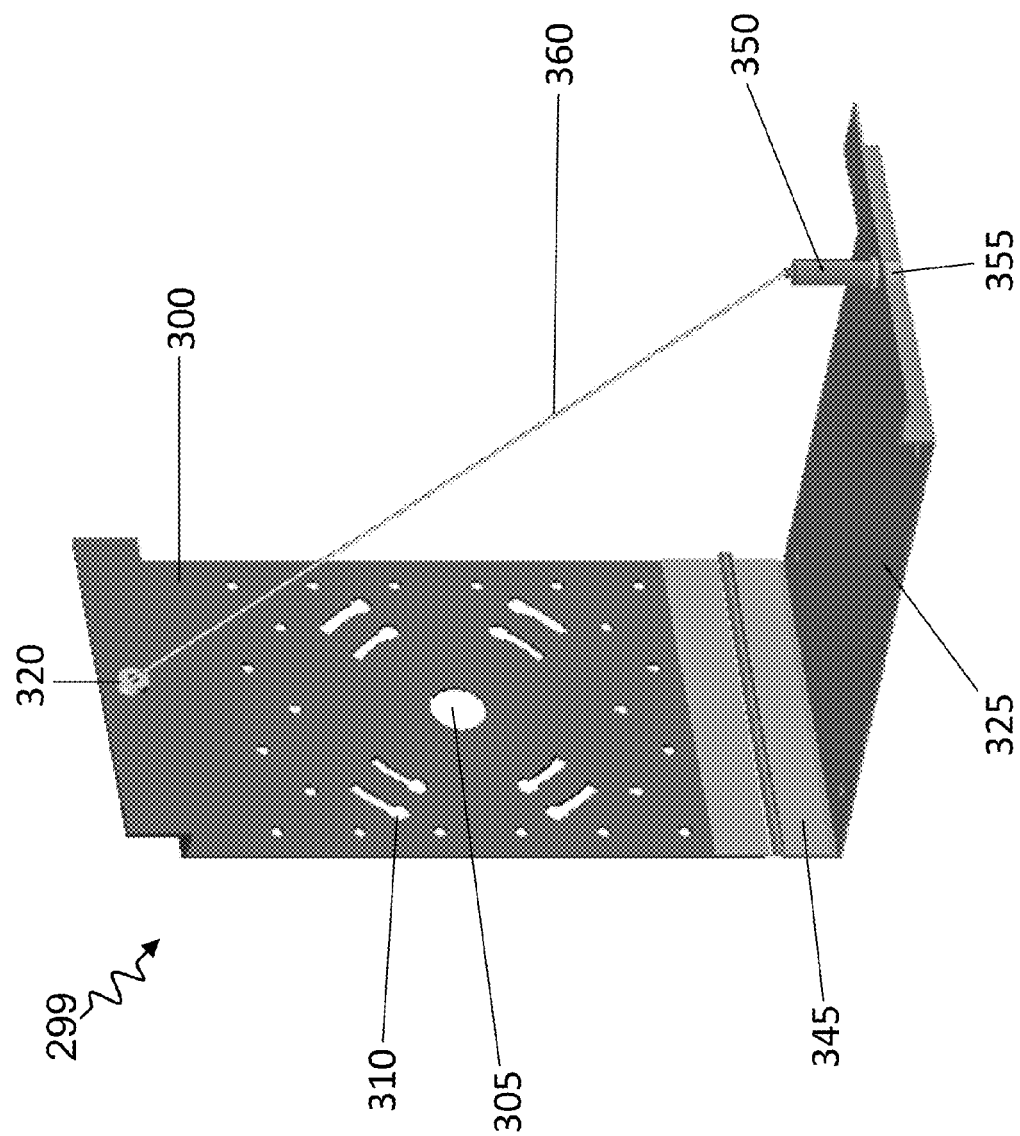
FIG. 55 is a perspective view of the Unimo™ universal mounting bracket, according to one embodiment of the present invention.

With reference to FIG. 55 and according to one embodiment of the present invention the Unimo™ universal mounting bracket 299 is shown. The Unimo™ universal mounting bracket 299 is primarily comprised of a mounting plate 300, a fixture plate 325, a linker hinge 345, a tool-less adjustable cable gripper 350, and an aircraft cable 360.

Figure 56:
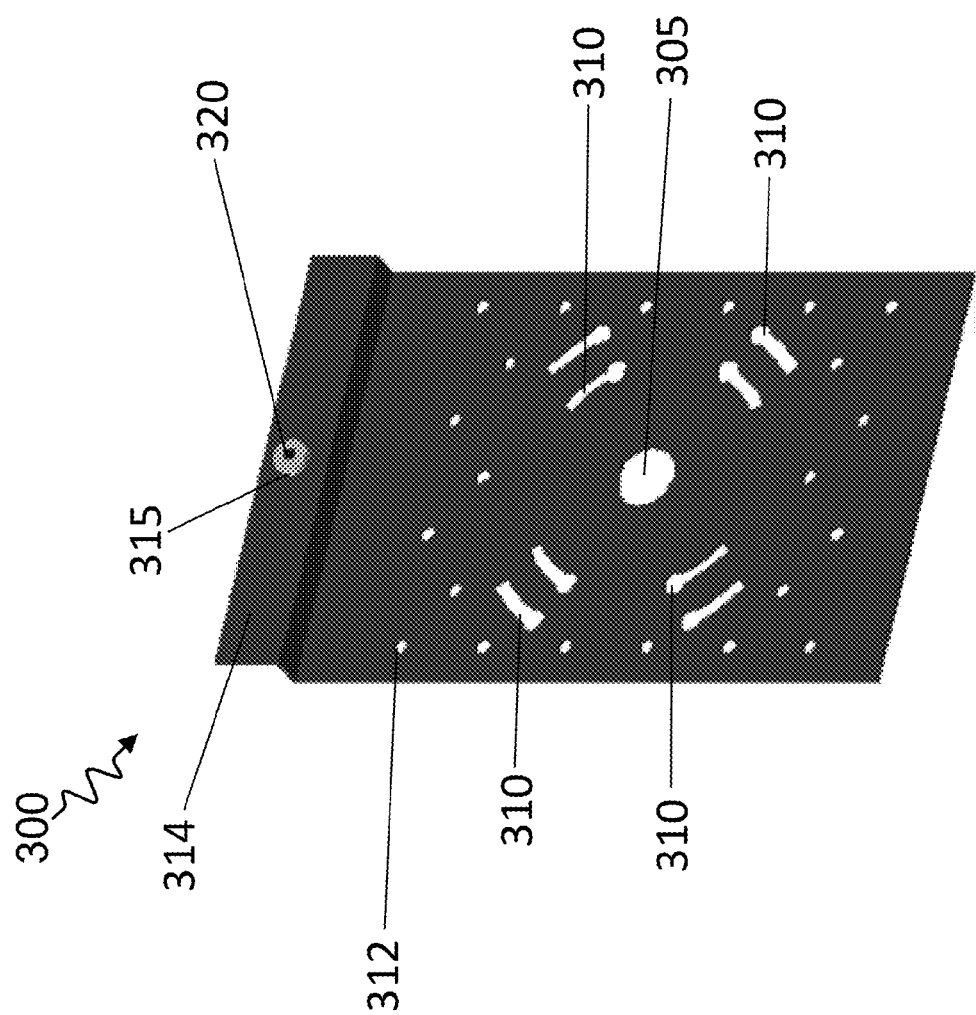
FIG. 56 is a perspective view of the mounting plate, according to one embodiment of the present invention.

With reference to FIG. 56, the mounting plate 300 is shown in greater detail. The upper edge of the mounting plate 300 extends out to form a platform shoulder 314. The platform shoulder 314 has a central hole 315. A threaded brass insert 320 is latched into the central hole 315. A punch out template adorns the central portion of the mounting plate 300. The punch out template is comprised of multiple locking holes 310, and a central electrical lead hole 305 which permits mating of the universal mounting bracket 299 with common electrical boxes. The flat surface of the mounting plate 300 also contains numerous evenly dispersed drill holes 312. The drill holes 312 permit fastening of mounting bracket 299 on surfaces lacking common electrical boxes. A worker skilled in the relevant art would appreciate the various methods of installing the mounting bracket directly to the wall or ceiling.

Figure 57:
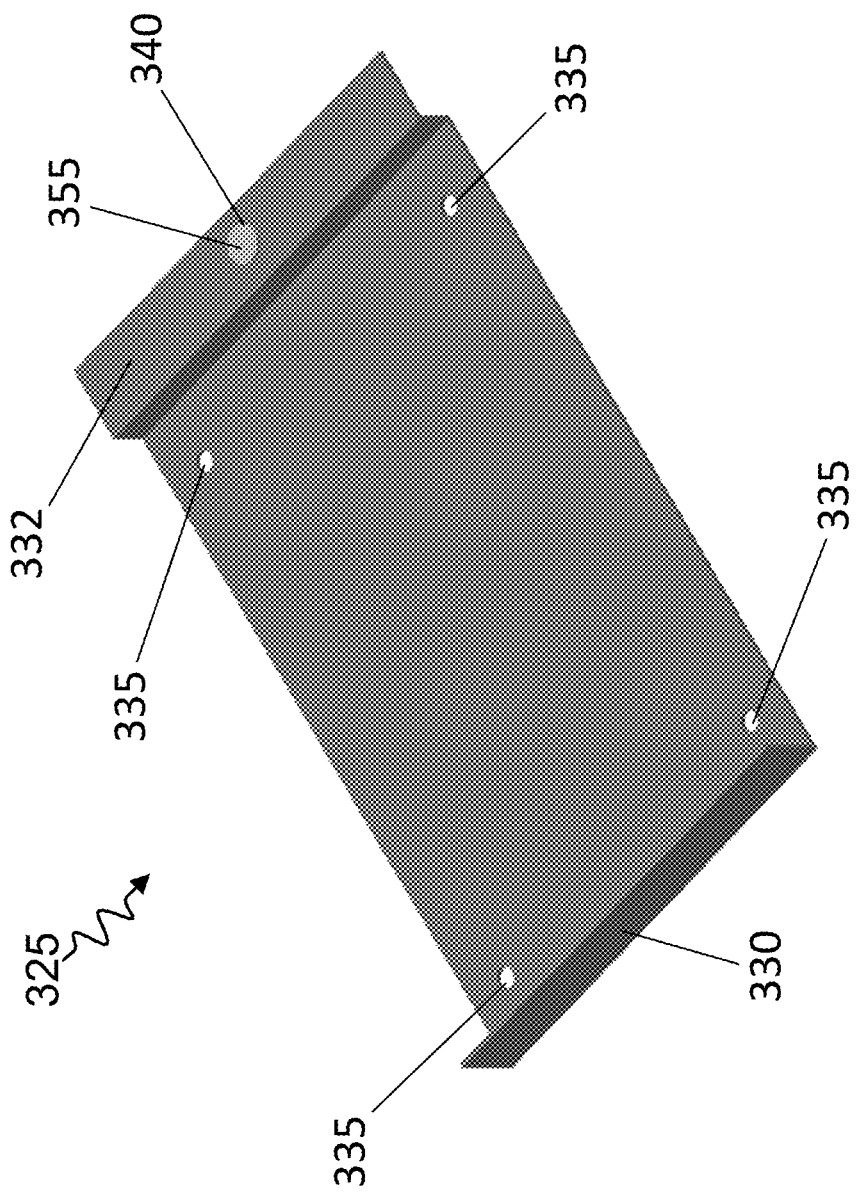
FIG. 57 is a perspective view of the fixture plate, according to one embodiment of the present invention.

With reference to FIG. 57, the fixture plate 325 is shown in greater detail. The upper edge of fixture plate 325 extends out to form a platform shoulder 332. The platform shoulder 332 contains a central hole 340. A threaded brass insert 355 is latched into the central hole 340. The lower edge of the fixture plate 325 extends out at a 90° angle to from protrusion 330. The flat surface of the fixture plate 325 contains 4 light fixture 5 attachment holes 335. The attachment holes are used to fasten the universal mounting bracket 299 to a light fixture 5 (not shown). A worker skilled in the relevant art would appreciate the various methods of attaching the mounting bracket to a light fixture 5, such as: screws; rivets; nuts and bolts; glue.

Figure 58:
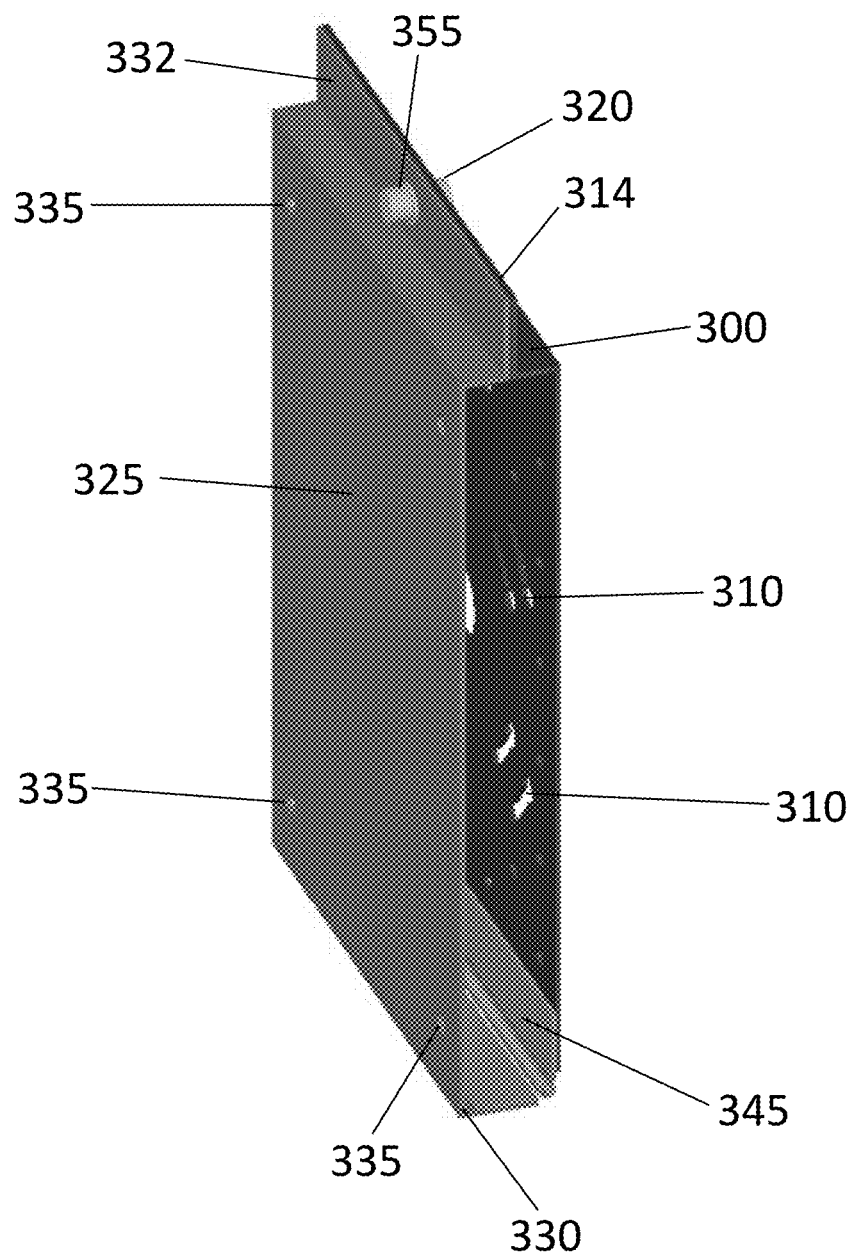
FIG. 58 is a perspective view of a closed Unimo™ universal mounting bracket, according to one embodiment of the present invention.

With reference to FIG. 58 the universal mounting bracket 299 is shown in its closed configuration. The mounting plate 300 and the fixture plate 325 are connected through use of a hinge 345, and platform shoulder extensions 314 and 332. The mounting plate 300 and the fixture plate 325 are locked together by placement of a threaded bolt (not shown) through latched brass inserts 320 and 355. A worker skilled in the relevant are would appreciate the various methods of locking the mounting plate 300 and fixture plate 325 together at the platform shoulders. The hinge 345 is secured to the lower portion of the mounting plate 300, and fixture plate 325 protrusion 330. A worker skilled in the relevant art would appreciate the various methods of securing the hinge 345 to the mounting 300 and fixture 325 plates, such as: screws; rivets; nuts and bolts; glue.

Figure 59:
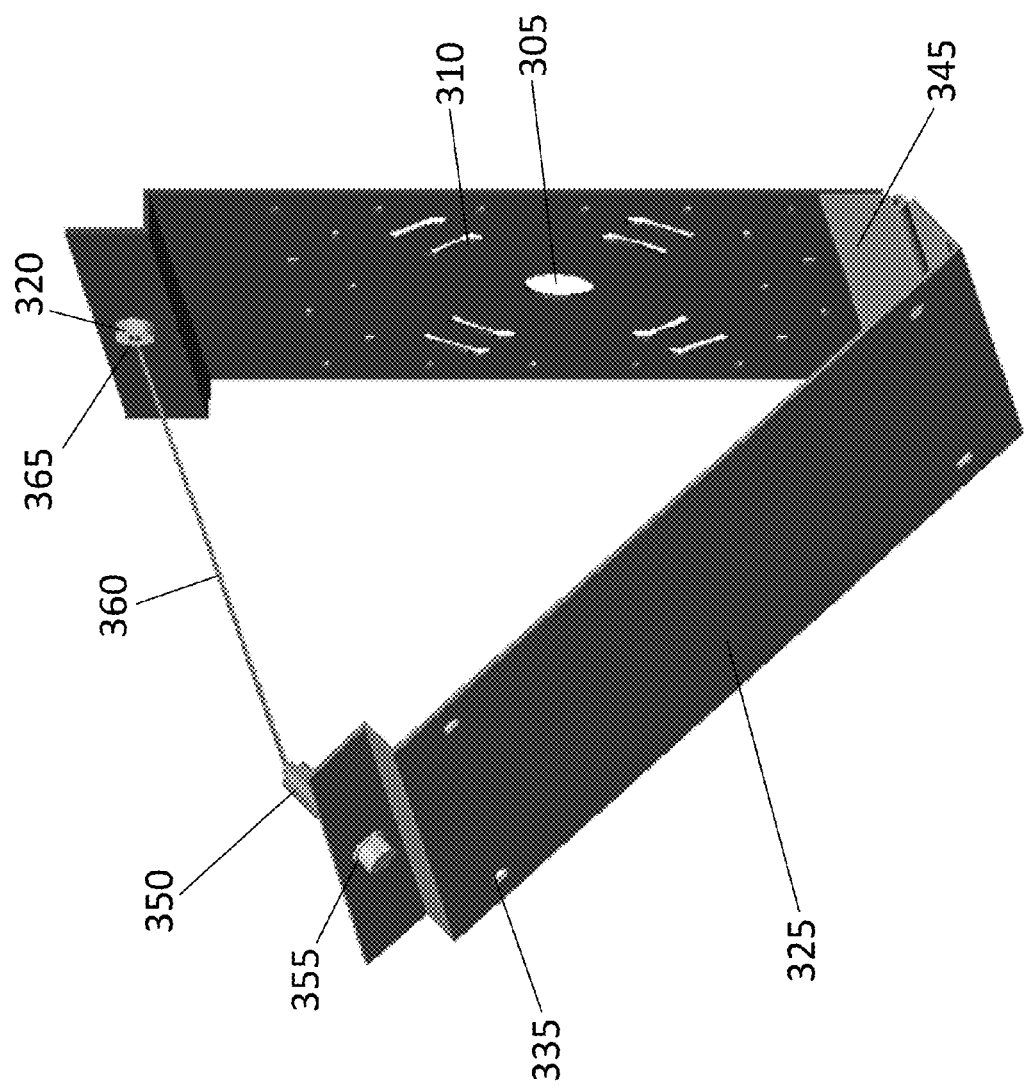
FIG. 59 is a perspective view of a partially open Unimo™ universal mounting bracket, according to one embodiment of the present invention.

With reference to FIG. 59 the universal mounting bracket 299 is shown in partially opened configuration. The hinge 345 allows the mounting plate 300 and the fixture plate 325 to separate at the upper region while maintaining a close interaction at the lower region. The hinge acts as a pivot point allowing the mounting plate 300 and the fixture plate 325 to separate producing an angle. Travel to open confirmation is accomplished by replacing the locking mechanism at the platform shoulders with a commercially available tool-less adjustable cable gripper 350 and cable coupler 365 which are defined as an adjustable means. The tool-less adjustable cable gripper 350 is fastened onto the fixture plate 325 by threading onto the latched brass insert 355. The cable coupler 365 is fastened onto the mounting plate 300 by threading onto the latched brass insert 320. The tool-less adjustable cable gripper 350 and the cable coupler 365 secure the aircraft cable 360 to universal mounting bracket 299. The mounting angle is determined by the length of the aircraft cable 360 located between the tool-less adjustable cable gripper 350 and the cable coupler 365. Altering the length of the interposed aircraft cable 360 is done by depressing the plunger of the tool-less cable gripper 350. Once depressed, the aircraft cable travels freely through the tool-less adjustable cable gripper 350, thereby allowing the end user to change the mounting angle. Excess aircraft cable 360 is driven through the tool-less adjustable cable gripper 350. Releasing the plunger locks the aircraft cable in place.

Figure 60:
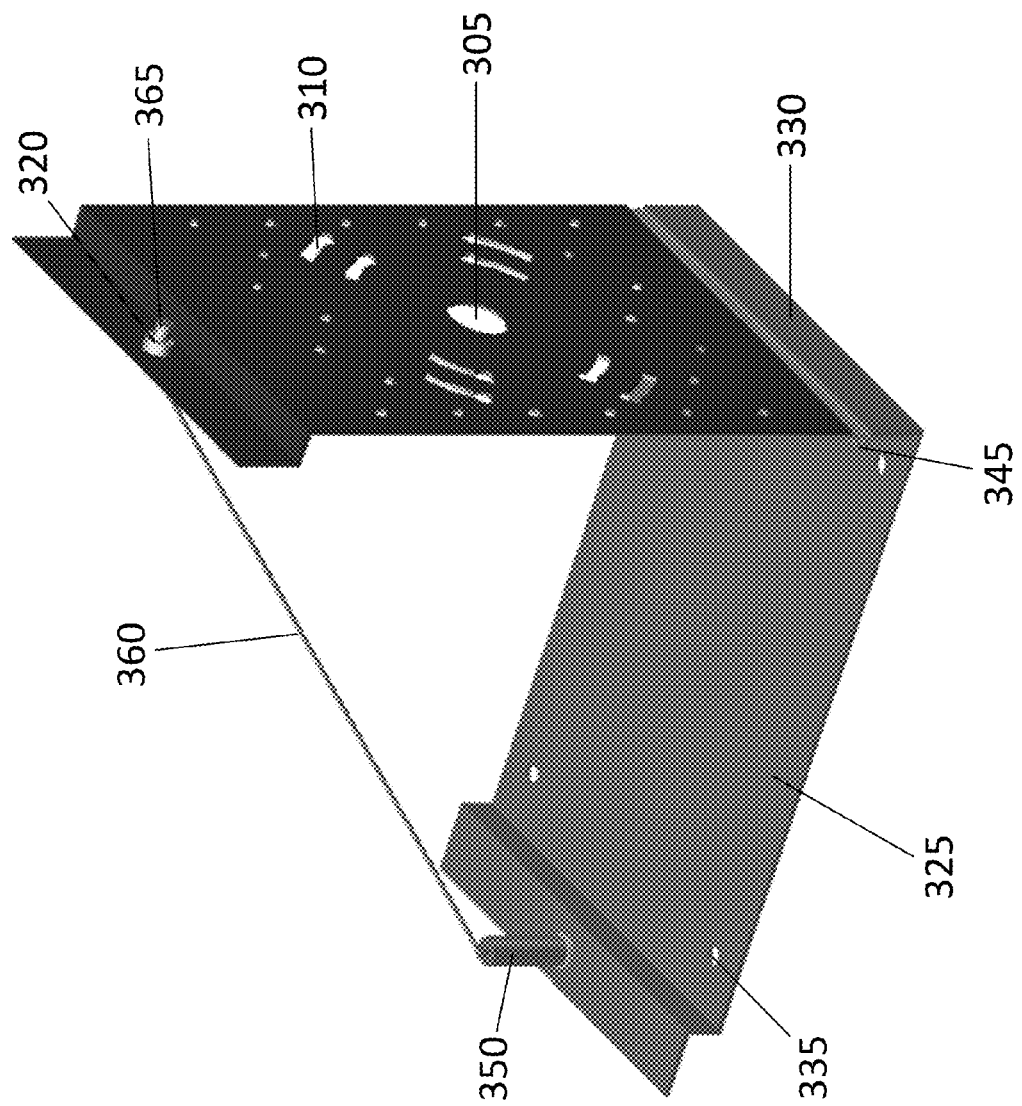
FIG. 60 is a perspective view of a fully open Unimo™ universal mounting bracket, according to one embodiment of the present invention.

With reference to FIG. 60 the universal mounting bracket 299 is shown in fully opened configuration. In this configuration, the mounting plate 300 and the fixture plate 325 are perpendicular and form an L shape at the pivot point. In fully open configuration, the fixture plate protrusion 330 aligns with the mounting plate 300. As a result, the hinge is fully extended and prevents further extension at the pivot point.

Figure 61:
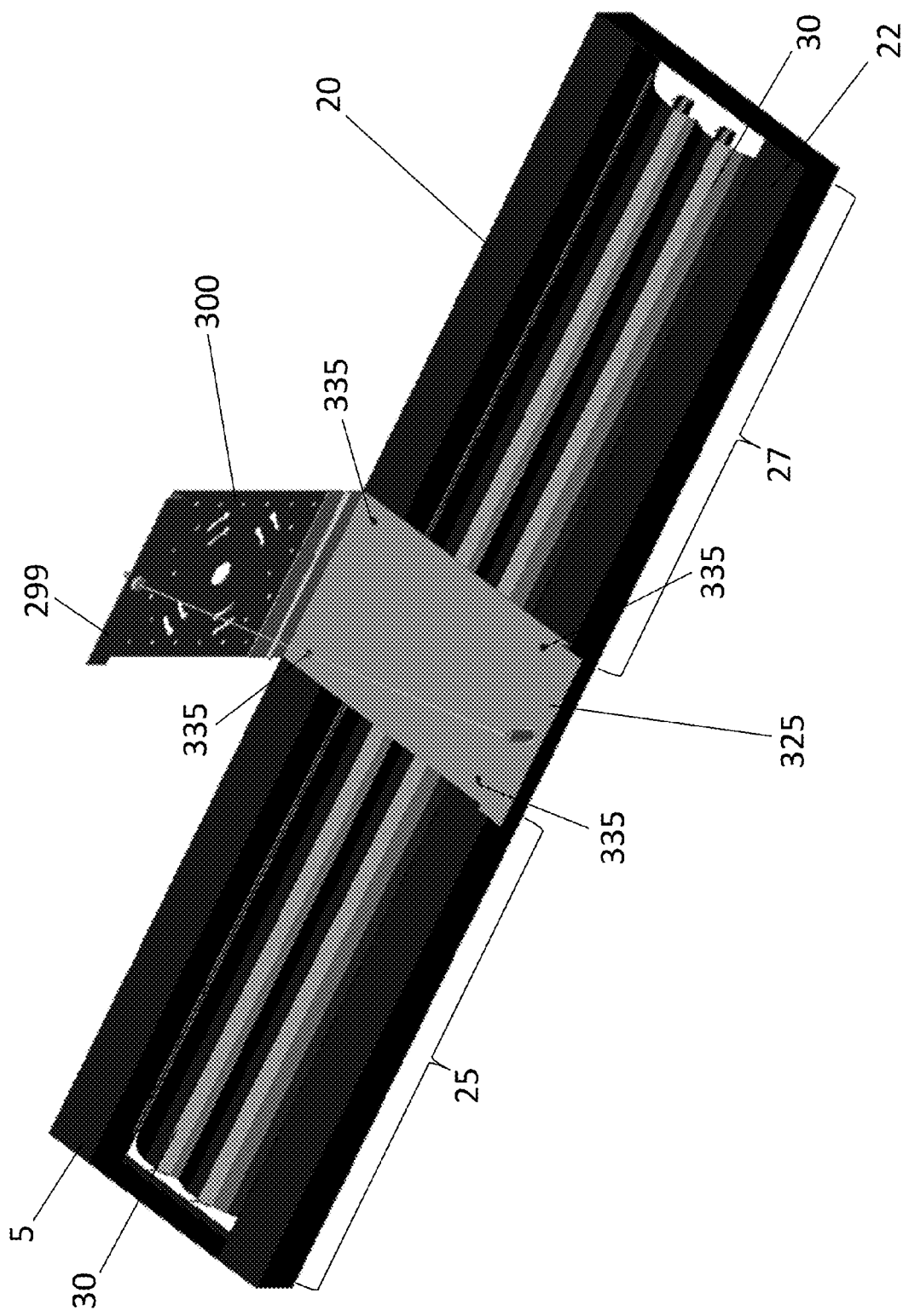
FIG. 61 is a perspective view of the Unimo™ universal mounting bracket attached to a light fixture, according to one embodiment of the present invention.

With reference to FIG. 61, a fully open universal mounting bracket 299 is shown attached to light fixture 5. The fixture plate 325 attaches to light fixture 5 through bolt linkers (not shown) penetrating the attachment holes 335. The bolts (not shown) pass through the attachment holes 335 and are fastened to the first and second driver channel 20, 22. The number of parallel lamp assembly units 30 housed within the first and second opening 25, 27 will vary the width of the light fixture. The width of the fixture may alter the method of fastening required to attach the mounting bracket 299 to light fixture 5. The fastening location may change from the first and second driver channels 20, 22, to a single channel or to the light fixture bridge 15 (not shown). A worker skilled in the relevant art would appreciate the different locations and different fastening methods required to attach the light fixture 5 to the mounting bracket 299, such as: screws; rivets; nuts and bolts; glue.

One or more of the components and functions illustrated in FIGS. 1-61 may be rearranged and/or combined into a single component or embodied in several components without departing from the invention. Additional elements or components may also be added without departing from the invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. Those skilled, in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A method for controlling a lighting system comprising:
powering ON a light source, the light source having a high intensity level, an adjustable standby intensity level, and an OFF intensity level, and wherein the adjustable standby intensity level is dimmer than the high intensity level but brighter than the OFF intensity level;
decreasing an intensity of the light source from the high intensity level to the adjustable standby intensity level when a sensor of the lighting system fails to detect a person's presence within a predetermined period of time; and
adjusting a light intensity setting of the adjustable standby intensity level based on an amount of human traffic detected by the sensor within one or more periods of time, the light intensity setting controlling a light intensity of the adjustable standby intensity level, wherein the light intensity setting of the adjustable standby intensity level is adjusted for a subsequent utilization of the adjustable standby intensity level.

2. The method of claim 1, further comprising:
incrementally increasing the light intensity setting of the adjustable standby intensity level when a person's presence is detected by the sensor before expiration of a timer; and
incrementally decreasing the light intensity setting of the adjustable standby intensity level when a person's presence is detected by the sensor after expiration of the timer.

3. The method of claim 1, further comprising:
increasing the intensity of the light source from an initial intensity level to the high intensity level after the sensor detects a person's presence; and
starting a first countdown timer after increasing the light source intensity from the initial intensity level to the high intensity level.

4. The method of claim 3, further comprising:
restarting the first countdown timer when the sensor detects a person's presence; and
maintaining the intensity at the high intensity level while the first countdown timer is running.

5. The method of claim 3, further comprising:
decreasing the intensity from the high intensity level to the adjustable standby intensity level when the first countdown timer expires without the sensor detecting a person's presence; and
starting a second countdown timer after the first countdown timer expires without the sensor detecting a person's presence.

6. The method of claim 5, further comprising:
incrementally increasing the light intensity setting of the adjustable standby intensity level when the sensor detects a person's presence before the second countdown timer expires.

7. The method of claim 6, further comprising:
increasing the intensity from the adjustable standby intensity level to the high intensity level when the sensor detects a person's presence before the second countdown timer expires; and
restarting the first countdown timer.

8. The method of claim 6, further comprising:
incrementally increasing a time duration setting of at least one of the first countdown timer and/or the second countdown timer when the sensor detects a person's presence before the second countdown timer expires.

9. The method of claim 5, further comprising:
maintaining the light intensity setting of the adjustable standby intensity level at a maximum value when the sensor detects a person's presence before the second countdown timer expires;
increasing the intensity from the adjustable standby intensity level to the maximum intensity level when the sensor detects a person's presence before the second countdown timer expires; and
restarting the first countdown timer.

10. The method of claim 5, further comprising:
decreasing the intensity from the adjustable standby intensity level to a low standby intensity level when the second countdown timer expires without the sensor detecting a person's presence; and
starting a third countdown timer after the second countdown timer expires without the sensor detecting a person's presence.

11. The method of claim 10, further comprising:
incrementally decreasing the light intensity setting of the adjustable standby intensity level when the sensor detects a person's presence before the third countdown timer expires.

12. The method of claim 11, further comprising:
increasing the intensity from the low standby intensity level to the high intensity level when the sensor detects a person's presence before the third countdown timer expires; and
restarting the first countdown timer.

13. The method of claim 11, further comprising:
incrementally decreasing a time duration setting of at least one of the first countdown timer, the second countdown timer, and/or the third countdown timer when the sensor detects a person's presence before the third countdown timer expires.

14. The method of claim 10, further comprising:
maintaining the light intensity setting of the adjustable standby intensity level at a minimum value when the sensor detects a person's presence before the third countdown timer expires;
increasing the intensity from the low standby intensity level to the high intensity level when the sensor detects a person's presence before the third countdown timer expires; and
restarting the first countdown timer.

15. The method of claim 10, further comprising:
decreasing the intensity from the low standby intensity level to the OFF intensity level when the third countdown timer expires without the sensor detecting a person's presence.

16. The method of claim 10, decreasing the intensity from the low standby intensity level to the OFF intensity level when (a) the third countdown timer expires without the sensor detecting a person's presence and (b) a determination is made that an end of time period is in effect.

17. A lighting system comprising:
a light source having a high intensity level, an adjustable standby intensity level, and an OFF intensity level, the adjustable standby intensity level being dimmer than the high intensity level and brighter than the OFF intensity level;
a sensor adapted to detect a person's presence; and
a light controller communicatively coupled to the light source and the sensor, the light controller adapted to decrease an intensity of the light source from the high intensity level to the adjustable standby intensity level when the sensor fails to detect a person's presence within a predetermined period of time, and adjust a light intensity setting of the adjustable standby intensity level based on an amount of human traffic detected by the sensor within one or more periods of time, the light intensity setting controlling a light intensity of the adjustable standby intensity level, wherein the light intensity setting of the adjustable standby intensity level is adjusted for a subsequent utilization of the adjustable standby intensity level.

18. The system of claim 17, wherein the light controller is further adapted to:
incrementally increase the light intensity setting of the adjustable standby intensity level when a person's presence is detected by the sensor before expiration of a timer; and incrementally decrease the light intensity setting of the adjustable standby intensity level when a person's presence is detected by the sensor after expiration of the timer.

19. The system of claim 18, wherein the light controller is further adapted to:
increase the intensity of the light source from an initial intensity level to the high intensity level after the sensor detects a person's presence; and
start a first countdown timer after increasing the light source intensity from the initial intensity level to the high intensity level.

20. The system of claim 19, wherein the light controller is further adapted to:
decrease the intensity from the high intensity level to the adjustable standby intensity level when the first countdown timer expires without the sensor detecting a person's presence; and
start a second countdown timer after the first countdown timer expires without the sensor detecting a person's presence.

* * * * *